(12) United States Patent
Yong et al.

(10) Patent No.: US 9,626,259 B2
(45) Date of Patent: *Apr. 18, 2017

(54) AUXILIARY POWER SUPPLY AND USER DEVICE INCLUDING THE SAME

(71) Applicant: Samsung Electronics Co., Ltd., Suwon-Si, Gyeonggi-Do (KR)

(72) Inventors: Hwan-Jin Yong, Seoul (KR); Donghyun Song, Hwaseong-si (KR); Janghwan Kim, Suwon-si (KR); Young-Goo Ko, Anyang-si (KR); Hyuck-Sun Kwon, Seoul (KR); Taek-Sung Kim, Yongin-si (KR); Kwang-Ho Kim, Hwaseong-si (KR); Byungjin Ahn, Seoul (KR); Dongjin Lee, Seoul (KR); Byungse So, Seongnam-si (KR); Jong-Gyu Park, Hwaseong-si (KR); Kyoungsub Oh, Hwaseong-si (KR); Kwan-Jong Park, Hwaseong-si (KR); Jong-Soo Seo, Hwaseong-si (KR); Tae-Hwa Yoo, Hwaseong-si (KR); Min-Ho Kim, Hamyang-gun (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,882

(22) Filed: Jul. 22, 2014

(65) Prior Publication Data

US 2015/0026516 A1    Jan. 22, 2015

Related U.S. Application Data

(63) Continuation of application No. 12/654,035, filed on Dec. 8, 2009, now Pat. No. 8,806,271.

(Continued)

(30) Foreign Application Priority Data

Dec. 9, 2008  (KR) .................. 10-2008-0124615
Dec. 9, 2008  (KR) .................. 10-2008-0124616

(Continued)

(51) Int. Cl.
*G06F 11/20*  (2006.01)
*G06F 1/30*  (2006.01)
(Continued)

(52) U.S. Cl.
CPC ............ *G06F 11/2015* (2013.01); *G06F 1/28* (2013.01); *G06F 1/305* (2013.01); *G06F 11/1441* (2013.01); *G06F 2201/85* (2013.01)

(58) Field of Classification Search
CPC ...... G06F 1/30; G06F 11/2015; H02J 7/0024; H02J 7/0068; Y02E 10/566; Y10T 307/50; Y10T 307/625

(Continued)

(56) References Cited

U.S. PATENT DOCUMENTS 3,624,617 A    11/1971  Putterman et al.
3,908,159 A *  9/1975  Griffey .................. G05F 1/613
                                        323/901

(Continued)

FOREIGN PATENT DOCUMENTS

JP    0624390 A    3/1994
JP    07160375     6/1995
(Continued)

*Primary Examiner* — Loan L. T. Truong
(74) *Attorney, Agent, or Firm* — Harness, Dickey & Pierce

(57) ABSTRACT

A user device is provided. The device includes a main power supply, and an auxiliary power supply. The main power supply provides a main power. The auxiliary power supply cuts off the main power according to a power level of the (Continued)

main power supply and provides an auxiliary power upon Sudden Power-Off (SPO).

19 Claims, 46 Drawing Sheets

Related U.S. Application Data

(60) Provisional application No. 61/213,271, filed on May 22, 2009.

(30) Foreign Application Priority Data

| Mar. 30, 2009 | (KR) | ........................ 10-2009-0027055 |
| Apr. 23, 2009 | (KR) | ........................ 10-2009-0035617 |

(51) Int. Cl.
  *G06F 11/14* (2006.01)
  *G06F 1/28* (2006.01)

(58) Field of Classification Search
  USPC ................. 714/14; 320/116, 166; 365/229
  See application file for complete search history.

(56) References Cited

U.S. PATENT DOCUMENTS

| | | | |
|---|---|---|---|
| 4,096,560 A | 6/1978 | Footh | |
| 4,109,161 A | 8/1978 | Iijima | |
| 4,168,459 A | 9/1979 | Roesel, Jr. | |
| 4,234,920 A | 11/1980 | Van Ness et al. | |
| 4,361,796 A * | 11/1982 | Akita | H02J 7/166 320/136 |
| 4,587,640 A * | 5/1986 | Saitoh | G11C 7/24 273/148 B |
| 4,661,758 A * | 4/1987 | Whittaker | H02J 7/35 136/293 |
| 4,791,443 A * | 12/1988 | Foley | G03D 13/00 307/64 |
| 5,047,987 A | 9/1991 | Kosuge | |
| 5,349,669 A | 9/1994 | Arai et al. | |
| 5,428,252 A | 6/1995 | Walker et al. | |
| 5,473,496 A | 12/1995 | Rouy | |
| 5,677,077 A * | 10/1997 | Faulk | H02J 7/0021 324/433 |
| 5,687,129 A | 11/1997 | Kim | |
| 5,710,931 A | 1/1998 | Nakamura et al. | |
| 5,723,970 A * | 3/1998 | Bell | H02J 7/045 320/140 |
| 5,784,626 A * | 7/1998 | Odaohara | H02J 1/10 307/66 |
| 5,978,235 A | 11/1999 | Lampinen | |
| 6,021,332 A * | 2/2000 | Alberth, Jr. | H02J 7/0024 320/111 |
| 6,057,609 A | 5/2000 | Nagai et al. | |
| 6,081,104 A * | 6/2000 | Kern | H02J 9/065 320/101 |
| 6,087,817 A * | 7/2000 | Varga | H02M 3/1588 323/266 |
| 6,105,138 A * | 8/2000 | Arakawa et al. | 713/300 |
| 6,158,000 A | 12/2000 | Collins | |
| 6,243,831 B1 * | 6/2001 | Mustafa et al. | 714/24 |
| 6,459,175 B1 | 10/2002 | Potega | |
| 6,496,939 B2 | 12/2002 | Portman et al. | |
| 6,687,839 B1 * | 2/2004 | Tate et al. | 713/324 |
| 6,777,916 B2 | 8/2004 | Yang | |
| 6,854,657 B2 * | 2/2005 | Johnson | 235/492 |
| 7,003,655 B2 | 2/2006 | Wang et al. | |
| 7,042,740 B2 | 5/2006 | Morimoto et al. | |
| 7,107,480 B1 * | 9/2006 | Moshayedi et al. | 714/2 |
| 7,155,625 B2 * | 12/2006 | Cohen et al. | 713/340 |
| 7,478,252 B2 | 1/2009 | Yoon | |
| 7,634,688 B2 | 12/2009 | Madter et al. | |
| 7,800,512 B1 | 9/2010 | Czarnecki | |
| 7,802,121 B1 | 9/2010 | Zansky et al. | |
| 7,831,860 B2 | 11/2010 | Hsieh et al. | |
| 7,840,840 B2 | 11/2010 | Takahashi et al. | |
| 7,861,112 B2 | 12/2010 | Nakayama et al. | |
| 7,923,966 B2 * | 4/2011 | Fukuda | G01R 31/3662 320/132 |
| 7,952,231 B1 * | 5/2011 | Zansky et al. | 307/59 |
| 7,962,787 B2 * | 6/2011 | Camilleri et al. | 714/24 |
| 8,250,406 B2 * | 8/2012 | Dunstan | 714/14 |
| 8,264,208 B2 | 9/2012 | Wardensky | |
| 9,099,881 B2 * | 8/2015 | Kim et al. | |
| 9,379,558 B2 * | 6/2016 | Seethaler | H02J 7/0021 |
| 2001/0005125 A1 | 6/2001 | Nagai et al. | |
| 2002/0050936 A1 | 5/2002 | Kato et al. | |
| 2002/0054499 A1 * | 5/2002 | Tanaka | H02M 1/12 363/132 |
| 2002/0101772 A1 | 8/2002 | Denda et al. | |
| 2003/0070103 A1 | 4/2003 | Kim | |
| 2003/0107270 A1 * | 6/2003 | Soto | H02J 7/0034 307/43 |
| 2003/0237009 A1 | 12/2003 | Hwang | |
| 2004/0042237 A1 * | 3/2004 | Hsieh | H02M 3/33569 363/21.08 |
| 2005/0114721 A1 | 5/2005 | Azadet et al. | |
| 2005/0162129 A1 | 7/2005 | Mutabdzija et al. | |
| 2005/0242772 A1 * | 11/2005 | Cha | H02J 7/34 320/115 |
| 2005/0264262 A1 | 12/2005 | Kang et al. | |
| 2005/0283648 A1 | 12/2005 | Ashmore | |
| 2006/0126249 A1 | 6/2006 | Boling | |
| 2006/0164749 A1 | 7/2006 | Yamamoto | |
| 2006/0269805 A1 | 11/2006 | Sakai et al. | |
| 2007/0103135 A1 | 5/2007 | Ito | |
| 2007/0121536 A1 | 5/2007 | Aihara | |
| 2007/0123189 A1 | 5/2007 | Saito et al. | |
| 2007/0132412 A1 | 6/2007 | Chiu et al. | |
| 2007/0139301 A1 * | 6/2007 | Fryer | G09G 3/30 345/3.4 |
| 2007/0222297 A1 | 9/2007 | Hung | |
| 2008/0010514 A1 * | 1/2008 | Liu | 714/14 |
| 2008/0025126 A1 | 1/2008 | Jewell et al. | |
| 2008/0037296 A1 * | 2/2008 | Hsu | H02M 1/08 363/41 |
| 2008/0079368 A1 * | 4/2008 | Kennedy et al. | 315/158 |
| 2008/0094038 A1 | 4/2008 | Okada | |
| 2008/0180230 A1 | 7/2008 | Zimmermann | |
| 2008/0222436 A1 | 9/2008 | Matsui | |
| 2009/0013198 A1 * | 1/2009 | Tanaka et al. | 713/300 |
| 2009/0033283 A1 * | 2/2009 | Beg et al. | 320/128 |
| 2010/0052424 A1 * | 3/2010 | Taylor et al. | 307/45 |
| 2010/0095143 A1 | 4/2010 | Yamaji | |
| 2010/0133908 A1 * | 6/2010 | Weng | 307/48 |
| 2010/0141213 A1 * | 6/2010 | Iida | B60L 1/00 320/134 |

FOREIGN PATENT DOCUMENTS

| | | |
|---|---|---|
| JP | H07-191780 A | 7/1995 |
| JP | H08-241104 A | 9/1996 |
| JP | 09093831 | 4/1997 |
| JP | 10322934 | 12/1998 |
| JP | H11-149419 A | 6/1999 |
| JP | 2000-089840 A | 3/2000 |
| JP | 2002-042479 A | 2/2002 |
| JP | 2003309936 A | 10/2003 |
| JP | 2004-030662 A | 1/2004 |
| JP | 2004266948 A | 9/2004 |
| JP | 2005-149451 A | 6/2005 |
| JP | 2005243125 A | 9/2005 |
| JP | 2005-327210 A | 11/2005 |
| JP | 3892812 B2 | 3/2007 |
| JP | 2007-128380 A | 5/2007 |
| JP | 2007318971 A | 12/2007 |
| JP | 2008-257702 A | 10/2008 |
| JP | 05342115 B2 | 11/2013 |
| KR | 19960015777 B1 | 11/1996 |
| KR | 0147199 | 9/1998 |

(56) References Cited

FOREIGN PATENT DOCUMENTS

| | | |
|---|---|---|
| KR | 1998-073164 | 11/1998 |
| KR | 10-1999-051935 | 7/1999 |
| KR | 1999-0083436 | 11/1999 |
| KR | 100235567 B1 | 12/1999 |
| KR | 0606529 | 4/2000 |
| KR | 2002-0033496 A | 5/2002 |
| KR | 20030010282 A | 2/2003 |
| KR | 20030024068 A | 3/2003 |
| KR | 20050112539 A | 12/2005 |

* cited by examiner

Fig. 33A

| Q < pF | Q ≥ pF |
|---|---|
| Protection mode | Non-protection mode /Normal mode |

Fig. 33B

| S \ Q | Q < TH1 | TH1 ≤ Q < TH2 | Q ≥ TH2 |
|---|---|---|---|
| Small | Protection mode | Success mode | Extra support mode |
| Large | Protection mode | Fail mode | Success mode |

AUXILIARY POWER SUPPLY AND USER DEVICE INCLUDING THE SAME

CROSS-REFERENCE TO RELATED APPLICATIONS

This application is a continuation under 35 U.S.C. §120 of U.S. application Ser. No. 12/654,035, filed on Dec. 8, 2009, which claims priority under 35 U.S.C. §119 to Korean Patent Application No. 10-2008-0124615, filed on Dec. 9, 2008, Korean Patent Application No. 10-2008-0124616, filed on Dec. 9, 2008, Korean Patent Application No. 10-2009-0027055, filed on Mar. 30, 2009, Korean Patent Application No. 10-2009-0035617, filed on Apr. 23, 2009, and U.S. Provisional Application No. 61/213,271 filed May 22, 2009, the entire contents of each of which are hereby incorporated by reference.

BACKGROUND OF THE INVENTION

The present invention disclosed herein relates to a user device, and more particularly, to a user device including an auxiliary power supply.

User devices include electronic devices such as personal computers, digital cameras, camcorders, mobile phones, MP3s, PMPs, and PDAs, and storage devices such as memory cards, USB memories, and Solid State Drives (SSD). Most user devices include memory devices for storing data. A high capacity storage device such as a flash memory card or a solid state disk (SSD) has a typical structure including a plurality of memory devices. In general, the SSD is designed to replace a hard disk drive, and therefore, has a significantly larger capacity than a memory card. For example, the SSD may have one or two orders of magnitude greater storage space. Accordingly, the SSD includes many more memory devices than a memory card. Memory devices include volatile memories such as DRAM and SRAM, and non-volatile memories such as EEPROM, FRAM, PRAM, MRAM, and flash memory. Volatile memories lose stored data when supply of power is disrupted. However, non-volatile memories retain data when supply of power is disrupted.

User devices receive power from an internal or external power supply. Here, the power supply may be a household power supply such as 110V or 220V, an industrial power supply, or may be a charger built in the user device. The user device may suffer data loss or other serious damage due to a Sudden Power Off (SPO) of its power supply.

SUMMARY OF THE INVENTION

The present invention is related to a solid state drive (SSD), an auxiliary power system for memory systems such as an SSD, and/or methods of operating a solid state drive and/or an auxiliary power system for a memory system.

In one embodiment, the solid state drive includes a memory system, a controller and an auxiliary power system. The memory system includes at least one memory, and the controller is configured to control the memory system. The auxiliary power system is configured to provide auxiliary power to at least the memory system of the solid state drive. The auxiliary power system includes a first one directional device, an auxiliary power source and a second one directional device. The first one directional device is configured to only permit current to flow there through in a first direction. The first direction is from a main power supply to the memory system. The second one directional device is configured to only permit current to flow there though in a second direction. The second direction is from the auxiliary power source to the memory system.

In one embodiment, the solid state drive includes a memory system, a controller and an auxiliary power system. The memory system includes at least one memory, and the controller is configured to control the memory system. The auxiliary power system is configured to provide auxiliary power to at least the memory system of the solid state drive. The auxiliary power system includes a first detector configured to detect a sudden main power off of a main power supply, an auxiliary power source configured to provide auxiliary power, a second detector configured to detect a power level of the auxiliary power source, and a second controller configured to perform at least one memory protection operation using power from the auxiliary power source if the first detector detects the sudden main power off. The second controller is configured to perform the memory protection operation until the second detector indicates the power level of the auxiliary power source drops below a threshold.

In one embodiment, an auxiliary power system associated with a memory system includes a first one directional device configured to only permit current to flow there through in a first direction. The first direction is from a main power supply to the memory system. The auxiliary power system also includes an auxiliary power source, and a second one directional device configured to only permit current to flow there though in a second direction. The second direction is from the auxiliary power source to the memory system.

In one embodiment, the first one directional device and the second one directional device are diodes.

In one embodiment, the auxiliary power source includes at least one super capacitor. The super capacitor may be one of a planar type, a can type, a coil type and a slot type.

At least one embodiment of the auxiliary power system further includes a controller configured to supply main power output from the first one directional device and configured to supply auxiliary power output from the second directional device.

A further embodiment includes a sensor configured to sense a power level of the auxiliary power source, and a controller. The controller is configured to perform a memory protection operation based on power from the auxiliary power source during a sudden power off of a main power supply, and is configured to indicate a power level of the auxiliary power source based on output from the sensor.

Yet another embodiment further includes a regulator configured to regulate output from the auxiliary power source.

A still further embodiment of the auxiliary power system further includes a first detector configured to detect a sudden power off of the main power supply, a second detector configured to detect a power level of the auxiliary power source, and a controller. The controller is configured to perform at least one memory protection operation using power from the auxiliary power source if the first detector detects the sudden power off, and is configured to perform the memory protection operation until the second detector indicates the power level of the auxiliary power source drops below a threshold.

Another embodiment of an auxiliary power system includes a first power supply line, a second power supply line, and a first one directional device connected between the first and second power supply lines. The first one directional device is configured to prevent current from flowing from the second power supply line to the first power supply line.

The auxiliary power system further includes an auxiliary power source and a second one directional device connected between the second power supply line and the auxiliary power. The second one directional device is configured to prevent current from flowing from the second power supply line to the auxiliary power source.

Another embodiment of an auxiliary power system associated with a memory system includes a first detector configured to detect a sudden power off of a main power supply, an auxiliary power source, and a second detector configured to detect a power level of the auxiliary power source. A controller is configured to perform at least one memory protection operation using power from the auxiliary power source if the first detector detects the sudden power off, and is configured to perform the memory protection operation until the second detector indicates the power level of the auxiliary power source drops below a first threshold.

In one embodiment, the first detector is configured to determine the sudden power off if a power level of the main power supply drops below a second threshold.

In another embodiment, the first detector is configured to detect if the power level of the main power supply drops below a second threshold, and to output a first control signal based on the detection result. The second detector is configured to detect if the power level of the auxiliary power source drops below the first threshold and to output a second control signal based on the detection result. The controller is configured to receive the first and second control signals, to determine the sudden power off if the first control signal indicates the power level of the main power supply has dropped below the second threshold, and to stop the memory protection operation if the second control signal indicates the power level of the auxiliary power source drops below the first threshold.

Another embodiment further includes third to nth detectors, each having an associated threshold and configured to output a control signal indicating the power level of the auxiliary power source has dropped below the associated threshold. Here, the controller is configured to control the memory protection operation based on output from the second to nth detectors.

Another embodiment further includes a sensor configured to sense a power level of the auxiliary power source, and the controller is configured to indicate the power level of the auxiliary power source output by the sensor.

Yet another embodiment includes a regulator configured to regulate output from the auxiliary power source.

An additional embodiment of an auxiliary power system associated with a memory system includes a first detector configured to detect a power level of a main power supply, an auxiliary power source, and a second detector configured to detect a power level of the auxiliary power source. A controller is configured to receive output of the first and second detectors, configured to determine a sudden power off of the main power supply based on the output from the first detector, configured to perform a memory protection operation on the memory system using power from the auxiliary power source if the sudden power off is determined, and configured to stop the memory protection operation based on the output from the second detector.

In one embodiment, the first detector is configured to detect if the power level of the main power supply drops below a first threshold, and to output a first control signal based on the detection result. The second detector is configured to detect if the power level of the auxiliary power source drops below a second threshold, and to output a second control signal based on the detection result. The controller is configured to receive the first and second control signals, to determine the sudden power off if the first control signal indicates the power level of the main power supply has dropped below the first threshold, and to stop the memory protection operation if the second control signal indicates the power level of the auxiliary power source drops below the second threshold.

One embodiment further includes third to nth detectors, each having an associated threshold and configured to output a control signal indicating the power level of the auxiliary power source has dropped below the associated threshold. Here, the controller is configured to control the memory protection operation based on output from the second to nth detectors.

A further embodiment of an auxiliary power system associated with a memory system includes an auxiliary power source, a sensor configured to sense a power level of the auxiliary power source, and a controller configured to perform a memory protection operation based on power from the auxiliary power source during a sudden power off of a main power supply. The controller is also configured to indicate a power level of the auxiliary power source based on output from the sensor.

A still further embodiment of an auxiliary power system associated with a memory system includes an auxiliary power source, and a charge sensor detecting a charge of the auxiliary power source. A controller is configured to receive output of the charge sensor, and is configured to set an operating mode of the memory system based on the output of the charge sensor.

In one embodiment, the controller is configured to set a protection mode as the operating mode if the output of the charge sensor indicates the charge of the auxiliary power source is below a threshold amount. Here, the memory system includes a cache memory and a main memory, and the controller is configured to control the memory system in the protection mode such that data stored in the cache memory is mirrored in the main memory.

The threshold amount may be based on a full charge amount of the auxiliary power source.

In one embodiment, the controller is configured to set a normal mode as the operating mode if the output from the charge sensor indicates the charge of the auxiliary power source is greater than the threshold amount, and the controller is configured to control the memory system in the normal mode such that at least some data is buffered in the cache memory for an amount of time prior to being stored in the main memory.

In a further embodiment, the controller is configured to determine a size of data buffered in the cache memory and to set a sudden power off operating mode based on the determined size and the output of the charger sensor in the normal mode. The sudden power off operating mode indicates memory operations that are permissible using auxiliary power from the auxiliary power source if sudden power off of a main power supply occurs during the normal mode. The controller may be configured to select the sudden power off operating mode from a set of possible modes, the set of possible modes including at least a success mode in which data is copied from the cache memory to the main memory if sudden power off of the main power supply occurs. The set of possible modes may include an extra support mode in which data and meta data are copied from the cache memory to the main memory if sudden power off of the main power supply occurs. The set of possible modes may include a fail mode in which meta data is periodically copied from the cache memory to the main memory during the normal operating mode while power is supplied by the main power supply, and data is copied from the cache memory to the main memory if sudden power off of the main power supply occurs. The set of possible modes may includes a protection mode in which meta data and data are periodically copied from the cache memory to the main memory while power is supplied by the main power supply, and uncopied data is copied from the cache memory to the main memory if sudden power off of the main power supply occurs.

Another embodiment of an auxiliary power system associated with a memory system includes a first auxiliary power source configured to provide first auxiliary power to an output during sudden power off of a main power supplied to the output, a second auxiliary power source configured to provide second auxiliary power, and a control circuit configured to selectively provide the second auxiliary power to the output.

In one embodiment, the control circuit includes a switch configured to selectively provide the second auxiliary power to the output based on a control signal, and a timer configured to generate the control signal after a period of time measured by the timer. The timer may be configured to measure a length of time the system has been in operation, and to generate the control signal if the length of time excess a threshold. Alternatively, the timer may be configured to measure a length of time the first auxiliary power source has supplied the first auxiliary power during sudden power off, and to generate the control signal if the length of time excess a threshold.

In one embodiment, the timer may be configured to receive a job finished signal indicating operation requiring auxiliary power is complete, and may be configured to prohibit generating the control signal if the job finished signal is received.

In another embodiment, the timer may be configured to receive a job continuing signal indicating operation requiring auxiliary power is not complete, and may be configured to prohibit generating the control signal if the job continuing signal is no longer received.

In another embodiment, the control circuit includes a switch configured to selectively provide the second auxiliary power to the output based on a control signal, and a detector configured to detect voltage level of the first auxiliary power source. The detector is configured generate the control signal based on the detected voltage level. For example, the detector may be configured to generate the control signal if the detected voltage level falls below a threshold voltage.

In one embodiment, the detector may be configured to receive a job finished signal indicating operation requiring auxiliary power is complete, and may be configured to prohibit generating the control signal if the job finished signal is received.

In another embodiment, the detector may be configured to receive a job continuing signal indicating operation requiring auxiliary power is not complete, and may be configured to prohibit generating the control signal if the job continuing signal is no longer received.

A still further embodiment of an auxiliary power system associated with a memory system includes a primary auxiliary power source configured to provide first auxiliary power to an output during sudden power off of a main power supplied to the output, a plurality of secondary auxiliary power sources configured to provide secondary auxiliary powers, and a control circuit configured to selectively provide one of the secondary auxiliary powers to the output.

In one embodiment, the control circuit is configured to provide one of the secondary auxiliary powers to the output when a useful lifetime of the primary auxiliary power source has expired.

In another embodiment, the control circuit is configured to monitor the useful lifetime of the plurality of secondary auxiliary power sources and to selectively provide the secondary auxiliary power from one the secondary auxiliary power sources having an unexpired useful lifetime.

A further embodiment of an auxiliary power system associated with a memory system includes an auxiliary power supply configured to supply power to the memory system during a sudden power off of a main power supply, and a power management circuit configured to charge the auxiliary power supply using the main power supply based on an operating mode of a user device associated with the memory system.

In one embodiment, the auxiliary power supply includes at least one super capacitor and a variable resistance circuit. The variable resistance circuit supplies the main power supply to the super capacitor, and the variable resistance circuit is configured to vary resistance based on a control signal received from the power management circuit.

In one embodiment, the power management circuit is configured to fully charge the auxiliary power supply during a working state of the user device.

In another embodiment, the power management circuit is configured to charge the auxiliary power supply to a level less than a fully charged state during an idle state of the user device.

In a further embodiment, the power management circuit is configured to charge the auxiliary power supply based on an operating level of the user device. For example, the power management circuit is configured to charge the auxiliary power supply such that a greater the operating level of the user device, a greater the auxiliary power supply is charged.

An additional embodiment of an auxiliary power system associated with a memory system includes a power supply line, at least one super capacitor, and a current limiting circuit coupling the super capacitor to the power supply line. The current limiting circuit is configured to control an amount of current supplied to the super capacitor from the power supply line. A supply circuit is configured to selectively supply power stored by the super capacitor to the power supply line.

The present invention is also related to various applications and implementations of the auxiliary power system. While an SSD was mentioned above, other applications include a portable storage device such as a memory card, etc., and other electronic devices such as cell phones, PDAs, etc.

Still further, the embodiments may be combined in any applicable manner, and the resulting combination may be used in any of the various applications and implementations.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIGS. 33A and 33B are tables illustrating mode configuration methods of a controller in FIG. 30;

DETAILED DESCRIPTION OF EXAMPLE EMBODIMENTS

Figure 1:
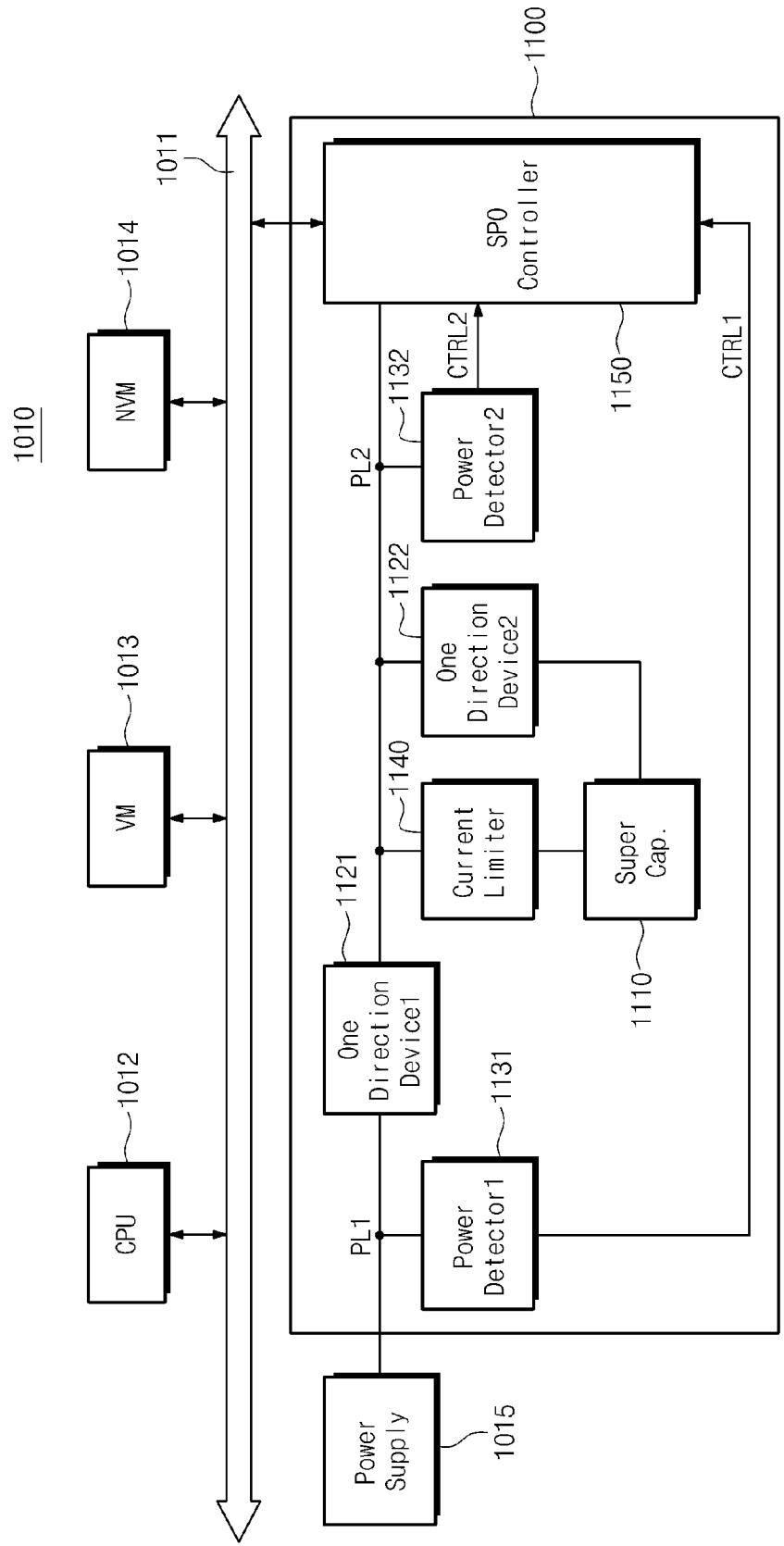
FIG. 1 is a block diagram illustrating a user device having a plurality of one-direction devices according to an embodiment.

Various example embodiments will now be described more fully with reference to the accompanying drawings in which some example embodiments of the invention are shown. In the drawings, the thicknesses of layers and regions are exaggerated for clarity.

Specific structural and functional details disclosed herein are merely representative for purposes of describing example. This invention may be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Most user devices receive a power necessary for operation from an internal or external power supply. However, a power supply may be stopped due to an unexpected situation such as user carelessness or device defects.

If the power supply is suddenly powered off, a user device may not operate any longer. The user device may be severely damaged by a Sudden Power-Off (SPO). If the user device is an electronic device, the user device may lose ongoing data. If the user device is a calculation device, the user device may lose a calculation result.

Besides a power supply, a user device according to an embodiment may further include an auxiliary power supply to provide protection in the event of a SPO. The auxiliary power supply includes a power storage device that can store an auxiliary power. Examples of the power storage devices include a condenser or a capacitor that can be charged or discharged. Hereinafter, a capacitor will be described as an example of a power storage device that can be charged with high-capacity electrical charges.

A user device according to an embodiment may stably perform a SPO protection operation using a super capacitor. Here, the SPO protection operation refers to a finishing job to prevent data or calculation loss upon SPO. Hereinafter, various user devices capable of stably performing a SPO protection operation using a super capacitor will be described.

1. A user device having a one-direction device.

FIG. 1 is a block diagram illustrating a user device having a plurality of one-direction devices according to a first embodiment. Referring to FIG. 1, a user device 1010 includes a data bus and power line 1011, a CPU 1012, storage devices 1013 and 1014, a power supply 1015, and an auxiliary power supply 1100.

The power supply 1015 provides an operating power to the user device 1010. Examples of the power supply may include various power supplies such as a DC power supply, an AC power supply, and a rechargeable battery. The power supply 1015 may be located inside or outside the user device 1010. Hereinafter, the power supply 1015 will be expressed as a main power supply to discriminate from the auxiliary power supply 1100.

A volatile memory (VM) 1013 and a non-volatile memory (NVM) 1014 are described as storage devices in FIG. 1. The volatile memory 1013 and the non-volatile memory 1014 transmit and receive data using the data bus and power line 1011, and receive power from the main power supply 1015 or the auxiliary power supply 1100. The volatile memory 1013 and the non-volatile memory 1014 may be part of a memory system. For example, the memory system may be a solid state device (SSD).

The main power supply 1015 provides a power for the operation of the volatile memory 1013 or the non-volatile memory 1014. That is, the main power supply 1015 provides a power for the write/read/delete operations of the volatile memory 1013 or the non-volatile memory 1014, or for a data backup operation from the volatile memory 1013 to the non-volatile memory 1014.

The user device described in FIG. 1 includes the auxiliary power supply 1100 to reduce a loss due to a SPO of the main power supply 1015. Upon SPO of the main power supply 1015, the auxiliary power supply 1100 automatically cuts off a power from the main power supply, and simultaneously supplies an auxiliary power stored therein.

Referring to FIG. 1, the volatile memory 1013, which is a storage device that may lose data when being powered off, includes DRAM or SRAM. The non-volatile memory, which is a storage device that may preserve data when being powered off, includes EEPROM, FRAM, PRAM, MRAM, and Flash Memory. The volatile memory device 1013 and the non-volatile memory device 1014 transmit and receive data using a data bus and power line, and receive a power from the main power supply 1015 or the auxiliary power supply 1100. Generally, non-volatile memories can preserve data when being powered off, but have a limitation of slow data processing speed. To complement the limitation, a user device moves data from a non-volatile memory to a volatile memory, and processes the data using the volatile memory. Then, the user device backs up data processed in the volatile memory to the non-volatile memory. The data may be meta data and non-meta data referred to as regular data. The regular data may also be referred to as cache data in this and other embodiments.

The main power device provides a power for the operation of the volatile memory and the non-volatile memory. That is, the main power device provides a power for write/read/delete operations of the volatile memory or the non-volatile memory, or for a data backup operation from the volatile memory to the non-volatile memory.

On the other hand, the main power supply may suffer SPO due to user carelessness or device defects. When the main power supply is suddenly powered off, data processed in a volatile memory may be lost. Particularly, when the data processed in a volatile memory is important data such as cache data or meta data, the user device may be severely damaged by the SPO.

The user device described in FIG. 1 includes the auxiliary power supply 1100 to reduce a loss due to SPO. The auxiliary power supply automatically cuts a power from the main power supply, and simultaneously supplies an auxiliary power stored therein. When using the auxiliary power supply 1100 in FIG. 1, an error due to a power ripple or a switching delay that may occur immediately after SPO can be reduced. The user device according to this embodiment can stably perform a power-off operation by reducing an error due to a power ripple and the like.

Referring to FIG. 1, the auxiliary power supply 1100 includes a super capacitor 1110, one-direction devices 1121 and 1122, power detectors 1131 and 1132, a current limiter 1140, and a SPO controller 1150.

The super capacitor 1110 in this or any embodiment of the present invention may be a single capacitor or an array (parallel and/or serial) of super capacitors. The super capacitor may be any well-known super capacitor or capacitor array (parallel and/or serial).

The one-direction devices 1121 and 1122 are a power control device that, upon SPO, automatically cuts off a main power according to a power level of the main power supply, and supplies an auxiliary power of the super capacitor 1110. The one-direction devices 1121 and 1122 are a device such as a diode that allows a current to flow in only one direction.

The first one-direction device 1121 is connected to the main power supply 1015 through a first power line PL1, and to the SPO controller 1150 through a second power line PL2. Upon SPO of the main power supply 1015, the first one-direction device 1121 cuts off a current pathway when a power level of the first power line PL1 drops to a certain voltage or less. The first one-direction device 1121 may automatically cut off the main power according to the power level of the main power supply 1015 immediately after SPO to reduce detrimental effects due to a power ripple. The first one-direction device 1121 may be implemented by a diode.

The second one-direction device 1122 is connected between the super capacitor 1110 and the second power line PL2. Upon SPO of the main power supply 1015, the second one-direction device 1122 forms a current pathway according to the power level of the super capacitor 1110 when a power level of the second power line PL2 drops to a certain voltage or less. That is, upon SPO, the second one-direction device 1122 can automatically provide an auxiliary power according to the power level of the super capacitor 1110 to reduce limitations due to a switching delay. The second one-direction device 1122 may be implemented by a diode.

The first power detector 1131 is connected to the first power line PL1, and detects a power level of the main power supply. That is, upon SPO of the main power supply 1015, the first power detector 1131 detects if the power level of the first power line PL1 is dropped to a certain level (Va in FIG. 4) or less. The first power detector 1131 generates a first control signal CTRL1 as a detection result. The SPO controller 1150 performs a data backup operation from the volatile memory 1013 to the non-volatile memory 1014 in response to the first control signal CTRL1.

The second power detector 1132 is connected to the second power line PL2, and detects a power level of the super capacitor 1110. That is, upon SPO, the second power detector 1132 detects if the power level of the second power line PL2 is dropped to a certain level (Vb in FIG. 4) or less. The second power detector 1132 generates a second control signal CTRL2 as a detection result. The SPO controller 1150 stops the operation of the user device 1010 in response to the second control signal CTRL2.

Figure 11:
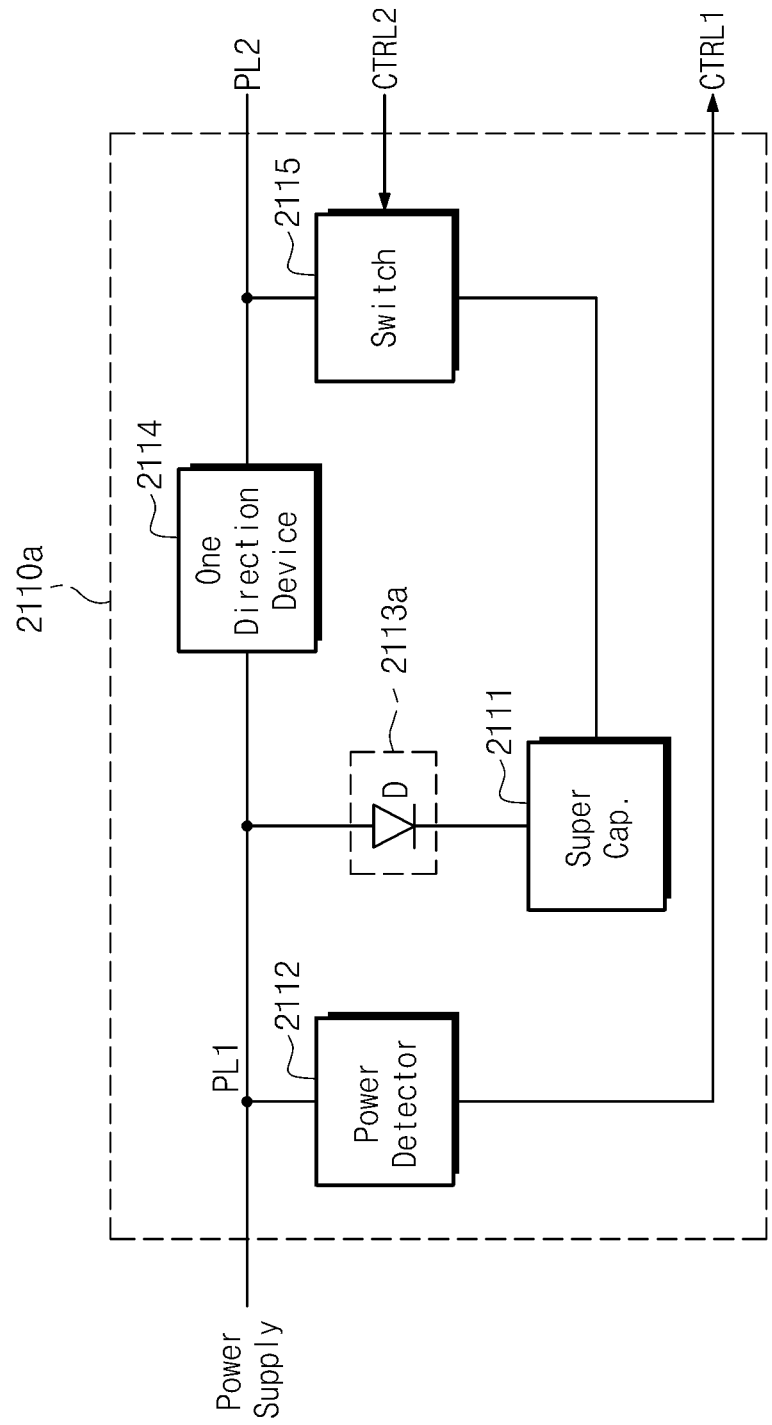
FIGS. 11 and 12 are block diagrams illustrating a current limiter in FIG. 10.
Figure 12:
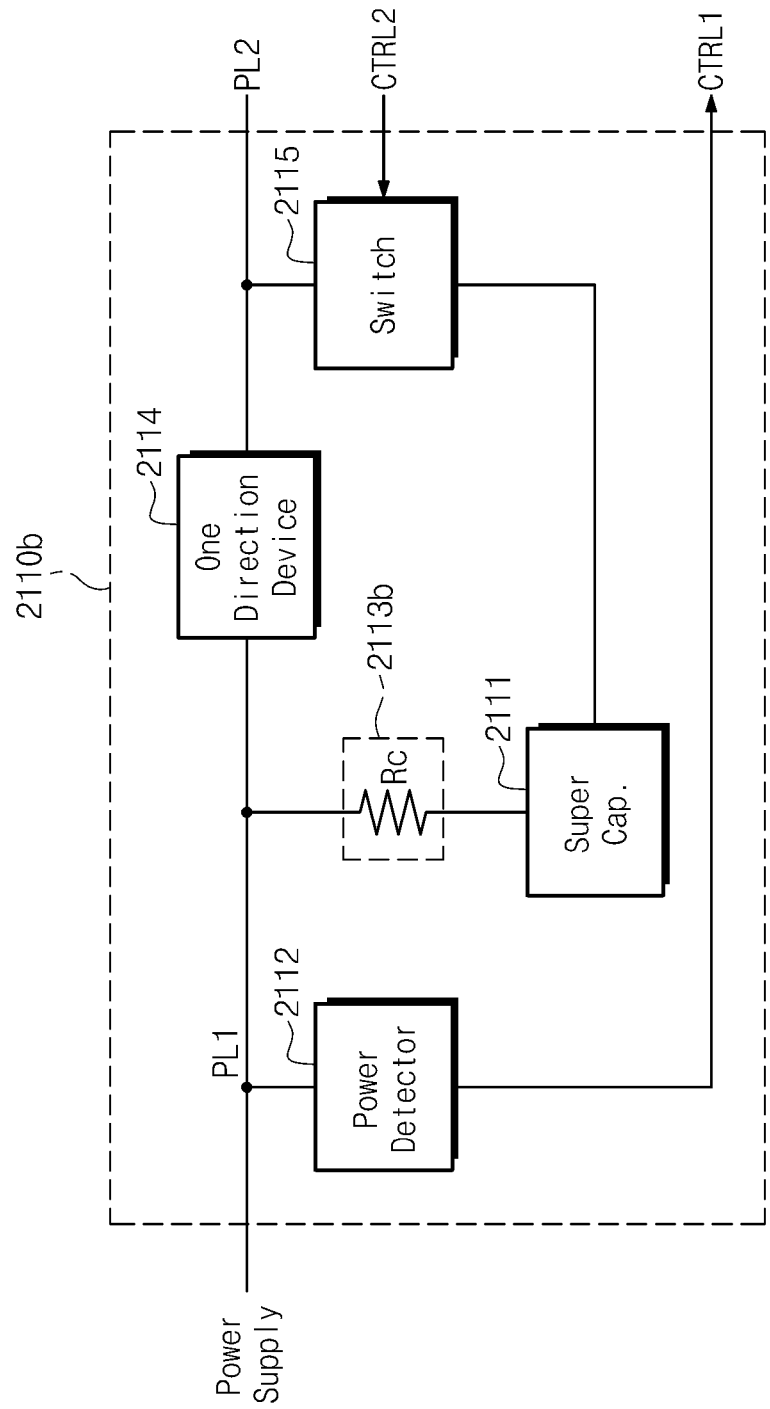

The current limiter 1140 is connected between the super capacitor 1110 and the second power line PL2. The current limiter 1140 is a protection device to protect the super capacitor 1110. The current limiter 1140 can reduce an overcurrent flowing into the super capacitor 1110. Besides the current limiter 1140, a voltage clamp may be used as a protection device of the super capacitor 1110. The voltage clamp can prevent damage due to an overvoltage when the super capacitor 1110 is charged. FIGS. 11 and 12 illustrate examples of a current limiter with respect to another embodiment, but those examples are applicable to this embodiment.

The SPO controller 1150 is connected to the second power line PL2, and operates in response to the first and the second control signals CTRL1 and CTRL2. The SPO controller 1150 provides an auxiliary power from the super capacitor 1110 to the volatile memory 1013 or the non-volatile memory 1014 upon SPO. On the other hand, the SPO controller 1150 performs an operation of the user device 1010 such as a data backup operation in response to the first control signal CTRL1, and stops the operation of the user device 1010 in response to the second control signal CTRL2.

Figure 2:
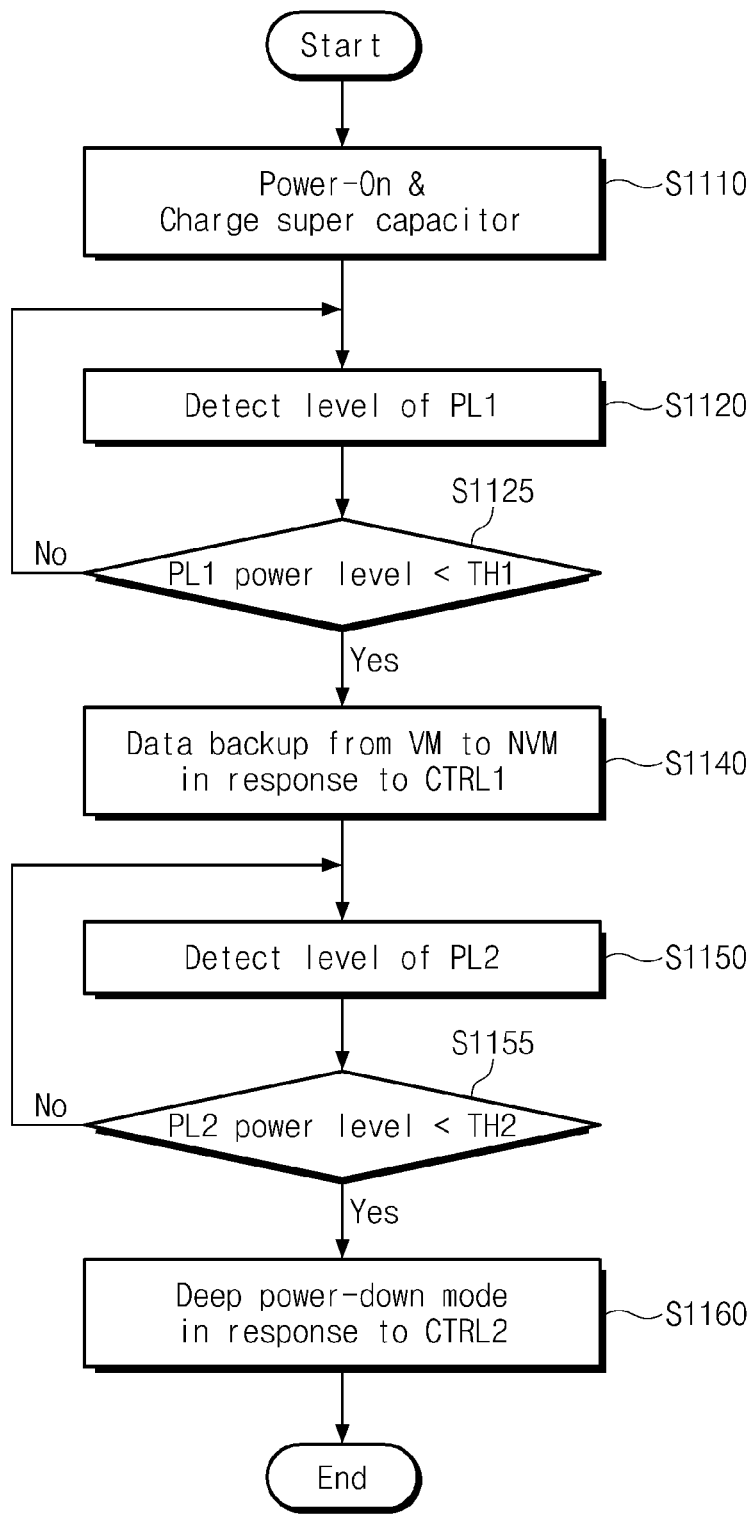
FIG. 2 is a flowchart illustrating operation of a user device in FIG. 1.

FIG. 2 is a flowchart illustrating an operation of a user device in FIG. 1. Hereinafter, the operation of the user device 1010 upon SPO will be described in detail with reference to FIGS. 1 and 2.

In operation S1110, if the user device 1010 is powered off, the user device 1010 receives a power from the main power supply 1015. The user device 1015 performs a normal operation according to a control of a central processing unit (CPU) 1012. On the other hand, in operation S1110, the auxiliary power supply 1100 charges the super capacitor 1110 by receiving a power from the main power supply 1015 during the power-up operation or the normal operation.

In operation S1120, the first power detector 1131 detects a power level of the first power line PL1. In operation S1125, the first power detector 1131 determines if the detected power level is less than a first threshold. If so, the first power detector 1131 generates the first control signal CTRL1 indicating sudden poweroff (SPO), in operation S1140, and a SPO controller 1150 performs a data backup operation from the volatile memory 1013 to the non-volatile memory 1014 in response to the first control signal CTRL1. If no SPO is determined, processing returns to step S1120.

In operation S1150, the second power detector 1132 detects a power level of the second power line PL2 . In operation S1155, the second power detector 1132 determines if the detected power level is less than a second threshold. If so, the second power detector 1132 generates a second control signal CTRL2 as the determination result, in operation S1160, and the SPO controller 1150 stops the data backup operation and the like in response to the second control signal CTRL2. Namely, the user device 1010 is set to a power-down mode. If the determination in step S1155 is negative, then processing returns to step S1150.

Referring again to FIG. 1, upon SPO, the user device 1010 in FIG. 1 may automatically cut off the main power supply 1015, and provide an auxiliary power by using the one-direction devices 1121 and 1122. The user device 1010 according to this embodiment can mitigate problems due to power ripple or switching delay upon SPO.

Figure 3:
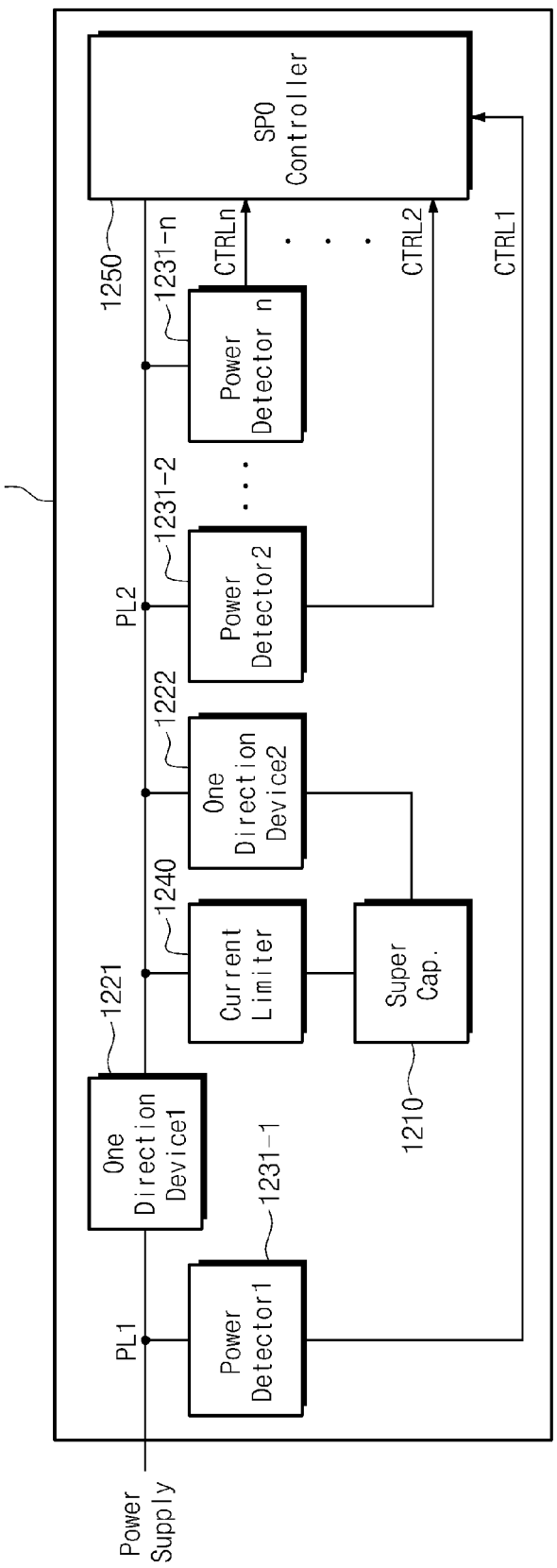
FIG. 3 is a block diagram illustrating an auxiliary power supply of FIG. 1 according to another embodiment.

FIG. 3 is a block diagram illustrating a user device having a plurality of one-direction devices according to a second embodiment. FIG. 3 shows another example of the auxiliary power supply in FIG. 1. Referring to FIG. 3, an auxiliary power supply 1200 includes a super capacitor 1210, one-direction devices 1221 and 1222, a plurality of power detectors 1231-1 to 1231-*n*, a current limiter 1240, and a controller 1250. Descriptions of the super capacitor 1210, the one-direction devices 1221 and 1222, and the current limiter 1240 are identical to those described in FIG. 1.

The auxiliary power supply 1200 described in FIG. 3 includes a first power detector 1231-1, and a second power detector 1231-2, and further include one or more power detectors 1231-3 to 1231-*n*. The first power detector 1231 detects a power level of the main power supply (1015 in FIG. 1), and generates a first control signal CTRL1 as a detection result. The second to n-th power detectors 1231-2 to 1231-*n* detect a power level of the super capacitor 1210, and generate second to n-th control signals CTRL2 to CTRLn. Here, the second to n-th power detectors 1231-2 to 1231-*n* detect different power levels.

The auxiliary power supply 1200 may selectively control a backup range, a backup time, or a backup data, by beginning operations on output from the second to n-th power detectors 1231-2 to 1231-*n*, which detect different power levels.

Figure 4:
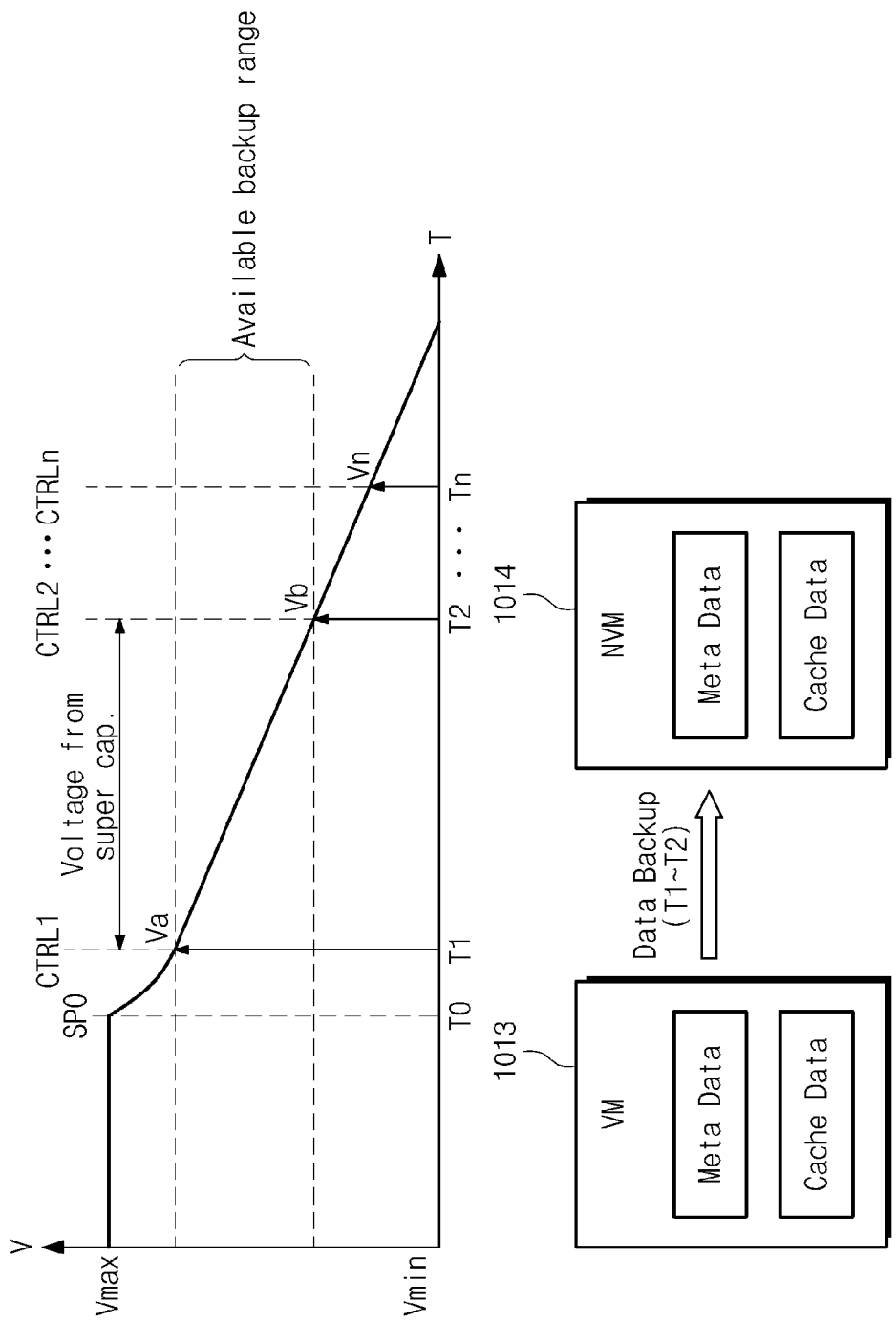
FIG. 4 is a graph and a diagram illustrating a backup range, and a backup time of an auxiliary power supply of FIG. 3, and a backup operation on cache data.

For example, referring to FIG. 4, the auxiliary power supply (1100 in FIG. 1) may perform a backup operation when the power supply falls in the range from Va to Vb for a backup time from T1 to T2, and the backup operation may be for cache data. On the other hand, the auxiliary power supply 1200 in FIG. 3 may perform a backup operation when the power supply falls in the range from Va to Vn for a backup time from T1 to Tn, and the backup operation may be on cache and meta data. That is, the auxiliary power supply 1200 in FIG. 3 may freely control the available backup range or time using the n power detectors 1231-1 to 1231-*n*. FIG. 4 assumes that a SPO occurs at time T0.

Figure 5:
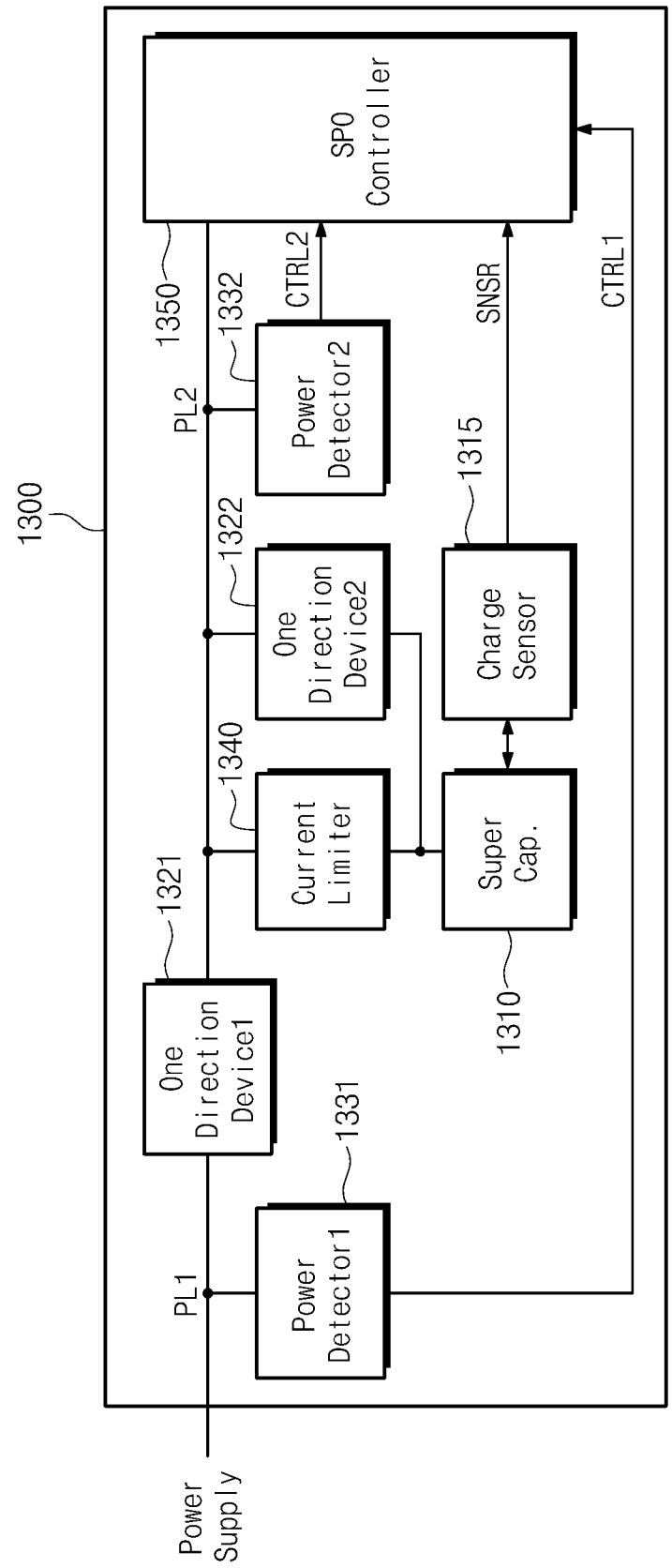
FIG. 5 is a block diagram illustrating an auxiliary power supply of FIG. 1 according to another embodiment.

FIG. 5 is a block diagram illustrating a user device having a plurality of one-direction devices according to a third embodiment. FIG. 5 shows another example of the auxiliary power supply in FIG. 1. Referring to FIG. 5, an auxiliary power supply 1300 includes a super capacitor 1310, a charge sensor 1315, one-direction devices 1321 and 1322, power detectors 1331 and 1332, a current limiter 1340, and a controller 1350. Descriptions of the super capacitor 1310, the one-direction devices 1321 and 1322, the power detectors 1331 and 1332, and the current limiter 1340 are identical to those described in FIG. 1.

The charge sensor 1315 measures the amount of an auxiliary power of the super capacitor 1310. The charge sensor 1315 may obtain the amount of charges stored in the super capacitor 1310 by measuring the capacitance and the voltage of the super capacitor 1310. The charge sensor 1315 provides a detection signal SNSR to the controller 1350. The controller 1350 informs a user of a charge state of the super capacitor 1310 in response to the detection signal SNSR.

The user device 1010 may check the capacitance of the super capacitor 1310 using the charge sensor 1315. The capacitance of the super capacitor 1310 will be reduced as time goes by.

Figure 6:
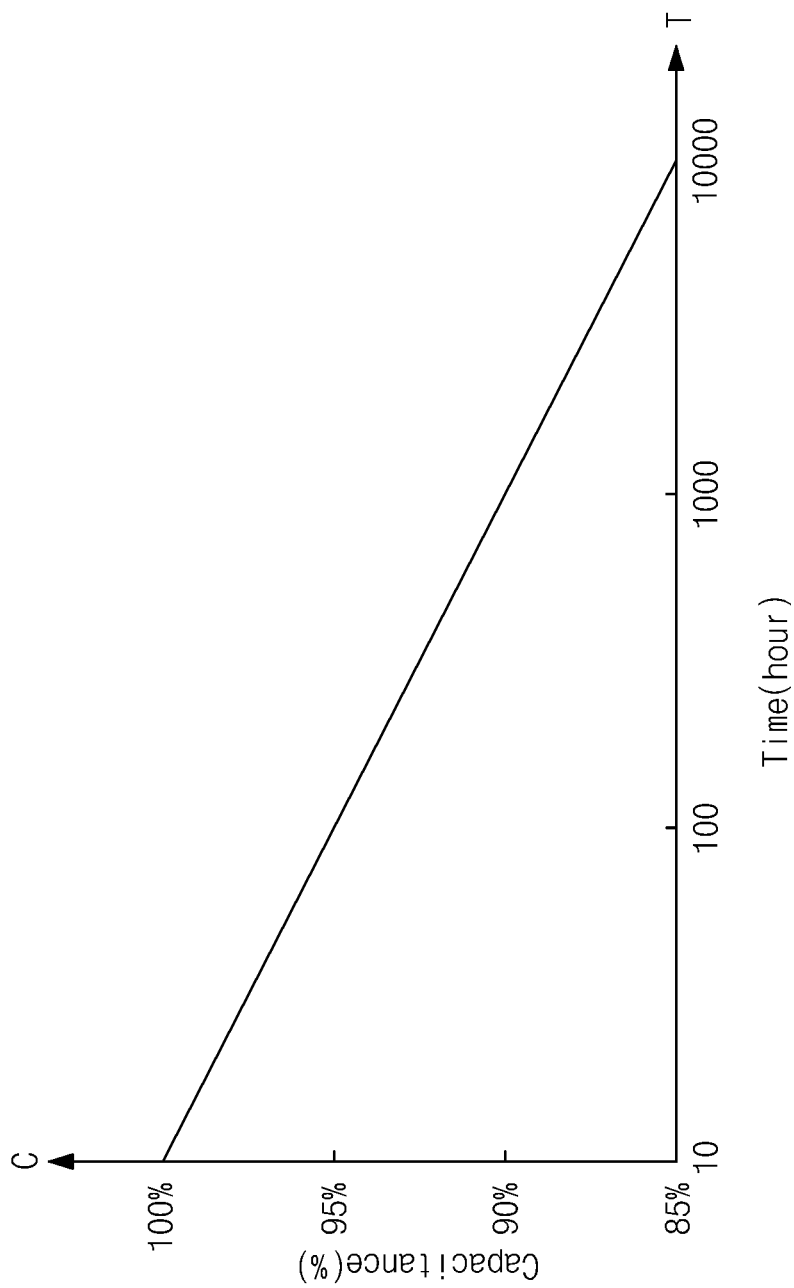
FIG. 6 is a graph illustrating a change of the capacitance according to the usage time of a super capacitor of FIG. 5.

FIG. 6 is a graph illustrating a change of a capacitance of the super capacitor 1310 according to time. The horizontal axis represents a usage time of the super capacitor 1310, and the vertical axis represents the capacitance of the super capacitor 1310.

Referring to FIG. 6, the capacitance of the super capacitor 1310 is reduced by about 15% after a lapse of about 10,000 hours. As described in FIG. 6, the capacitance of the super capacitor 1310 is reduced as time goes by. The amount of the auxiliary power from the auxiliary power supply 1300, or the power supply time may be reduced according to the capacitance change.

Referring again to FIG. 5, the auxiliary power supply 1300 includes the charge sensor 1315 to inform of a charging state of the super capacitor 1310. Also, the auxiliary power supply 1300 checks the capacitance of the super capacitor 1310 through the charge sensor 1315 to efficiently use the auxiliary power and forecast a replacement time of the super capacitor 1310.

Figure 7:
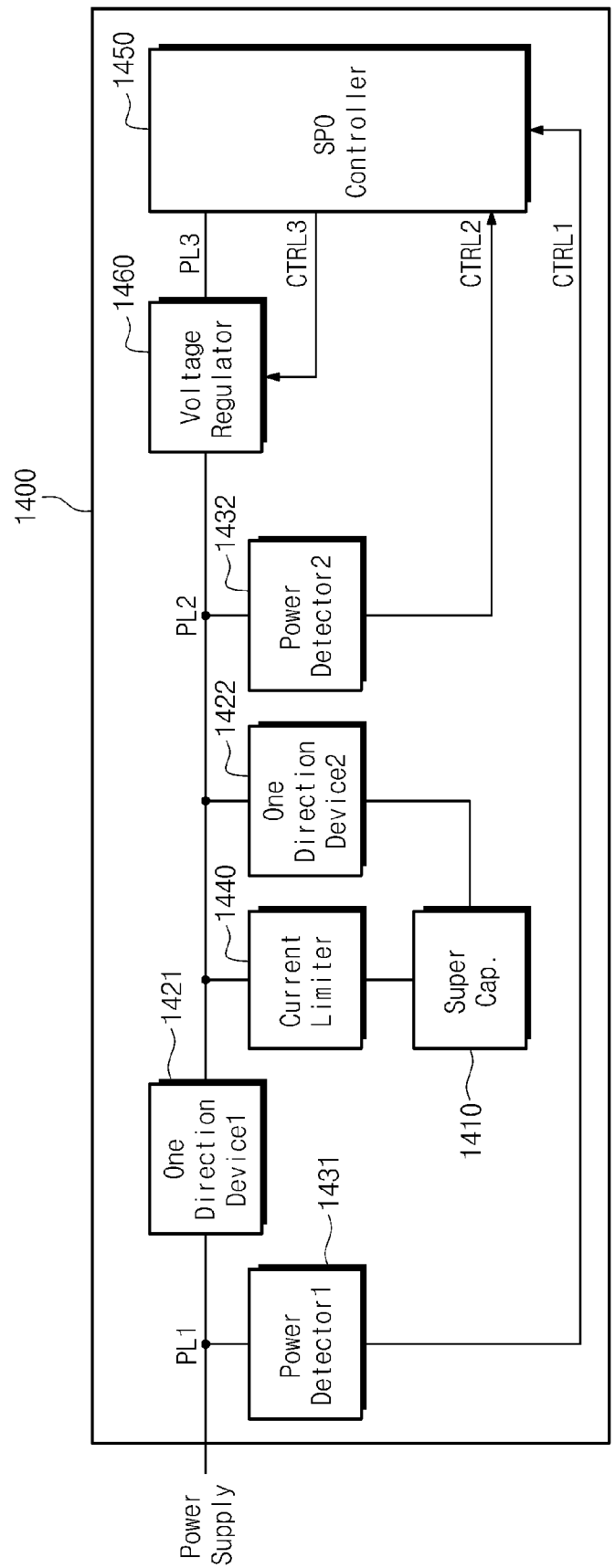
FIG. 7 is a block diagram illustrating an auxiliary power supply of FIG. 1 according to another embodiment.

FIG. 7 is a block diagram illustrating a user device having a plurality of one-direction devices according to a fourth embodiment. FIG. 7 shows another embodiment of the auxiliary power supply in FIG. 1. Referring to FIG. 7, an auxiliary power supply 1400 includes a super capacitor 1410, one-direction devices 1421 and 1422, power detectors 1431 and 1432, a current limiter 1440, a controller 1450, and a voltage regulator 1460. Descriptions of the super capacitor 1410, the one-direction devices 1421 and 1422, the power detectors 1431 and 1432, and the current limiter 1440 are identical to those described in FIG. 1.

The voltage regulator 1460 is connected between a second power line PL2 and a third power line PL3. The voltage regulator 1460 regulates a power level of the super capacitor 1410 upon SPO. The voltage regulator 1460 may provide a desired (or, alternatively a predetermined) level of auxiliary power to the controller 1450. On the other hand, the voltage regulator 1460 may cut off an auxiliary power supply in response to a third control signal CTRL3. The third control signal CTRL3 is provided from the controller 1450.

If a data backup operation is performed on SPO, the auxiliary power stored in the super capacitor 1410 may be reduced as time goes by. Then, the voltage regulator 1460 performs a boost function to raise a level of the auxiliary power of the super capacitor 1410 to a desired (or, alternatively a predetermined) level. Also, the voltage regulator 1460 may perform a buck function to lower the level of the auxiliary power to a desired (or, alternatively a predetermined) level when the level of the auxiliary power stored in the super capacitor 1410 is high.

The voltage regulator 1460 may provide an auxiliary power of a desired (or, alternatively a predetermined) level through the boost and buck functions. The user device 1010 may reduce the size of the super capacitor or make use of a low-capacity super capacitor, by using the voltage regulator 1460.

Figure 8:
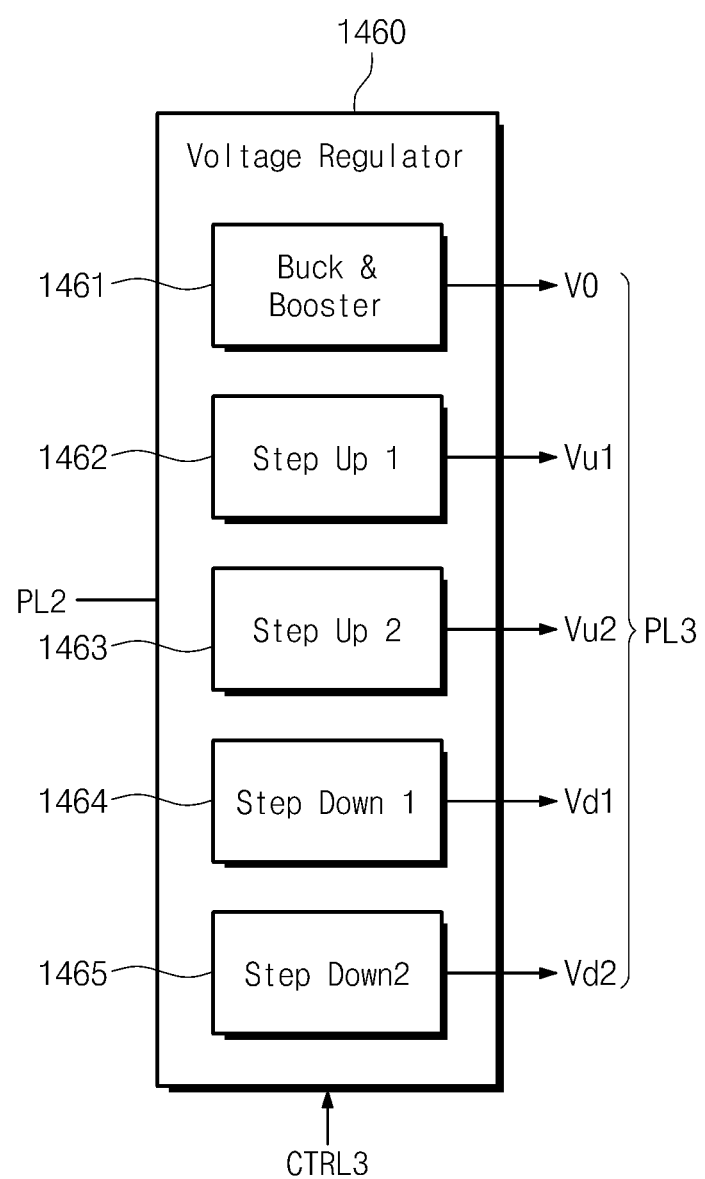
FIG. 8 is a block diagram illustrating a voltage regulator in FIG. 7.

FIG. 8 is a block diagram illustrating an exemplary voltage regulator in FIG. 7. Referring to FIG. 8, a voltage regulator 1460 includes a buck & boost circuit 1461, first and second step-up circuits 1462 and 1463, and first and second step-down circuits 1464 and 1465. The voltage regulator 1460 may include at least one of the above circuits.

Figure 9:
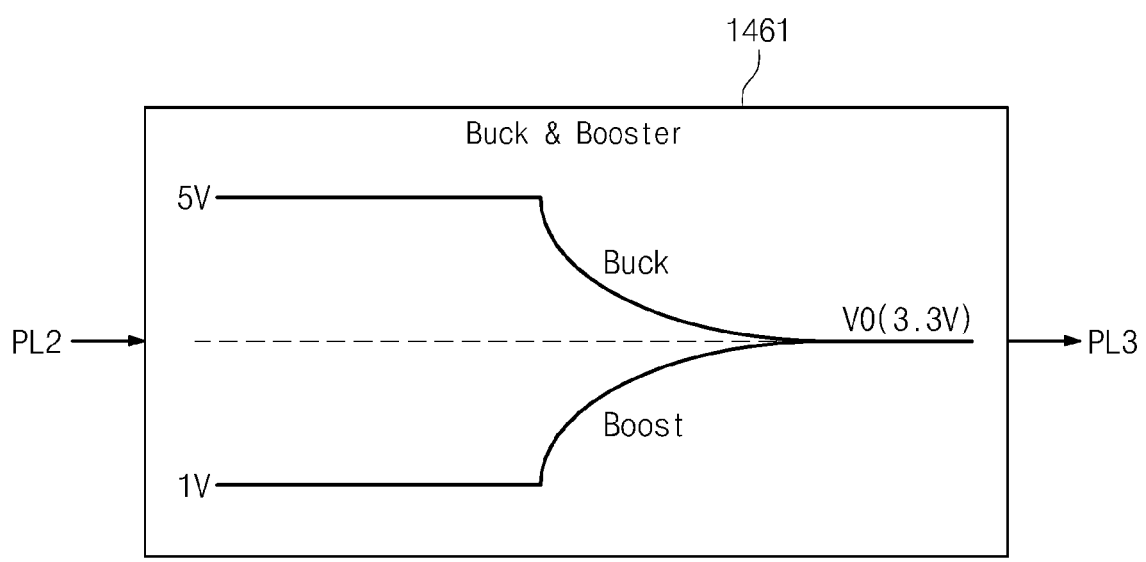
FIG. 9 is a diagram illustrating an operation of a buck-boost circuit in FIG. 8.

The buck & boost circuit 1461 may control an auxiliary power to a desired (or, alternatively a predetermined) level V0. Referring to FIG. 9, the buck & boost circuit 1461 may lower a level of a second power line PL2 from about 5 V to about 3.3 V through a buck function. Also, the buck & boost circuit 1461 may raise a level of the second power line PL2 of about 1 V to about 3.3 V. The buck & boost circuit 1461 provides a desired (or, alternatively a predetermined) level (for example, about 3.3 V) V0 to a controller 1450 through a third power line PL3.

The first step-up circuit 1462 raises the auxiliary power to a specific voltage $V_{u1}$, and the second step-up circuit 1463 raises the auxiliary power to a specific voltage $V_{u2}$. The first step-down circuit 1464 lowers the auxiliary power to a specific voltage $V_{d1}$, and the second step-down circuit 1465 the auxiliary power to a specific voltage $V_{d2}$. The voltage regulator 1460 may provide various levels of auxiliary power through the step-up and the step-down circuits.

An auxiliary power supply according to an embodiment may be implemented in various ways in addition to those described in FIGS. 1 through 9, and/or may include a combination of two or more of the above embodiments. For example, an auxiliary power supply may include all or some of n power detector 1231 in FIG. 3, a charge sensor 1315 in FIG. 5, and a voltage regulator in FIG. 7.

A user device according to an embodiment may be used in connection with the following current control user device or user device having a plurality of super capacitors. For example, the user device 1010 in FIG. 1 may include another super capacitor besides the super capacitor 1110, and a variable resistance circuit in the current limiter 1140. A user device according to an embodiment may stably perform a SPO protection operation by providing an auxiliary power in stages, controlling a current flowing into a super capacitor, or preventing a power ripple.

The auxiliary power supply may be applied to various products (for example, HDD, SSD, memory cards, computers, and portable electronic devices). In FIG. 1, the auxiliary power supply may be applied to the case where the non-volatile memory 1014 is a hard disk or solid state drive (SSD). That is, the auxiliary power supply may provide an auxiliary power for a data backup from a memory device to a hard disk device or SSD.

2. A current control user device

Figure 10:
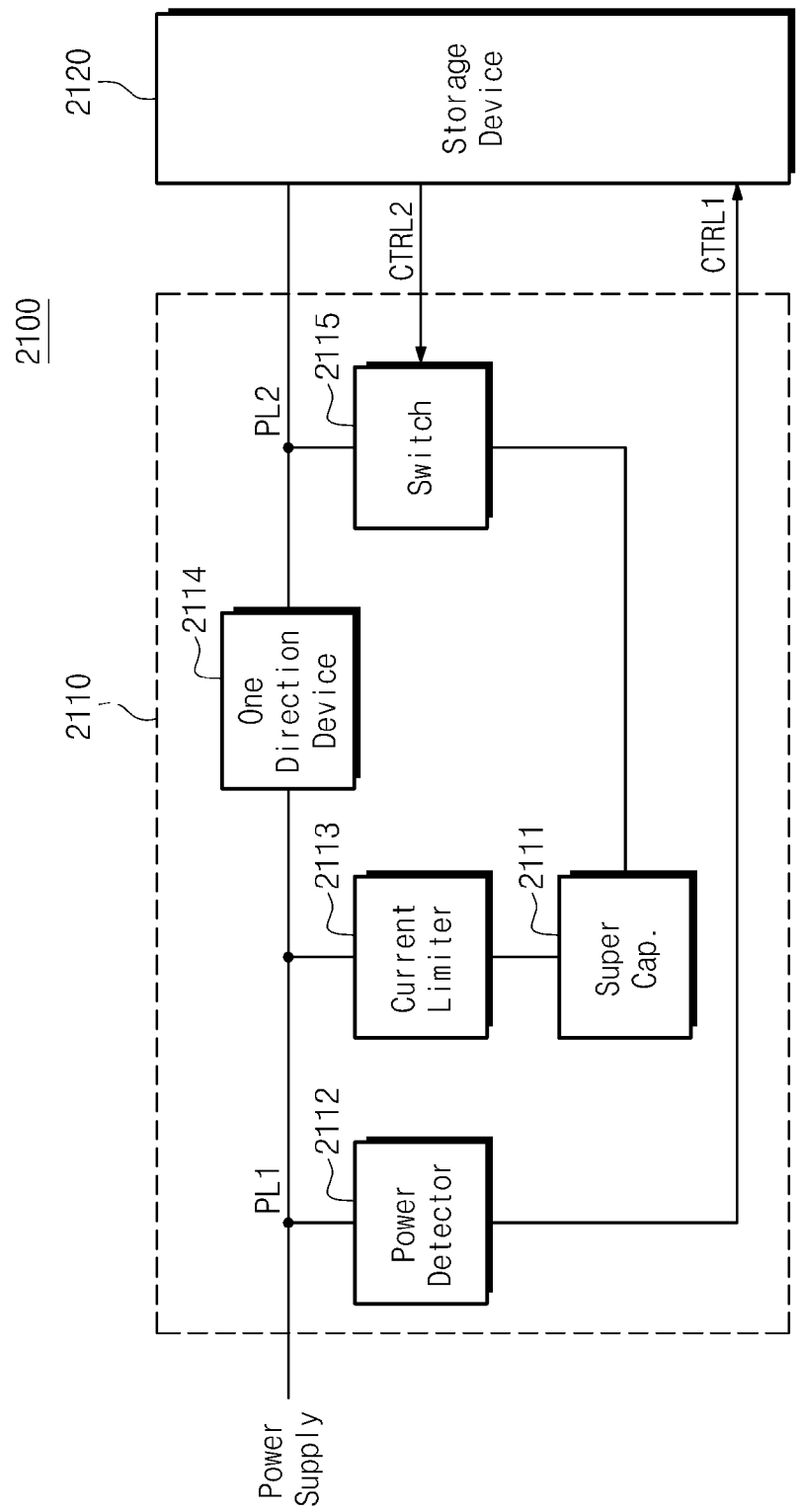
FIG. 10 is a block diagram illustrating a current control user device according to an embodiment.

FIG. 10 is a block diagram of a current control user device according to an embodiment. Referring to FIG. 10, a user device 2100 includes an auxiliary power supply 2110 and a storage device 2120. The user device 2100 receives a power necessary for operation from a main power supply. The user device may stably perform a SPO protection operation using the auxiliary power supply upon SPO.

The auxiliary power supply 2110 includes a super capacitor 2111, a power detector 2112, a current limiter 2113, a one-direction device 2114, and a switch 2115. The auxiliary power supply 2110 may control a current provided from the super capacitor 2111 or the storage device 2120, by using a variable resistance circuit (not shown) in the current limiter 2113.

The power detector 2112 is connected to a first power line PL1, and detects a power level of an external power supply. The power detector 2112 detects a power level of the first power line PL1 upon SPO, and generates a first control signal CTRL1 as a detection result.

The storage device 2120 receives the first control signal CTRL1, and performs a SPO protection operation. The storage device 2120 generates a second control signal CTRL2 to perform the SPO protection operation. The switch 2115 is turned on in response to the second control signal CTRL2 If the switch 2115 is turned on, the storage device 2120 performs the SPO protection operation using an auxiliary power of the super capacitor 2111. On the other hand, the user device 2100 may be implemented so that the switch 2115 may be turned on in response to the first control signal CTRL1.

The current limiter 2113 is connected between the super capacitor 2111 and the first power line PL1. The current limiter 2113 is a protection device for protecting the super capacitor 2111. The current limiter 2113 may restrict an overcurrent flowing into the super capacitor 2111 and an overvoltage applied to the super capacitor 2111. Also, the current limiter 2113 can prevent a countercurrent flowing from the super capacitor 2111 to the first power line PL1.

The current limiter 2113 may be implemented in a diode, a resistor, and a voltage clamp. The diode is used to prevent the countercurrent of the super capacitor 2111. The resistor is used to prevent the overcurrent flowing into the super capacitor 2111. The voltage clamp can prevent a damage cause by the overcurrent when the super capacitor 2111 is charged. FIG. 11 shows that a current limiter 2113a is implemented as a diode D. FIG. 12 shows that a current limiter 2113b is implemented in a resistor Rc.

Referring to FIG. 11, the diode (D) 2113a is connected between a first power line PL1 and a super capacitor 2111. The diode (D) 2113a is a one-direction device that is turned on if the super capacitor is charged, and is turned off if the super capacitor is discharged. The diode (D) 2113a cuts off a countercurrent that may flow from the super capacitor 2111 to the first power line PL1.

Referring to FIG. 12, the resistor (Rc) 2113b is connected between a first power line PL1 and a super capacitor 2111. The resistor (Rc) 2113b is a passive resistor having a constant resistance. The resistor (Rc) 2113b can prevent damage to the super capacitor 2111 by cutting off an overcurrent that may flow into the super capacitor 2111 upon power supply from the outside.

Referring again to FIG. 10, the one-direction device 2114 is connected to an external power supply through the first power line PL1, and is connected to the storage device 2120 through the second power line PL2. The one-direction device 2114 may be implemented in a diode.

The switch 2115 is connected between the super capacitor 2111 and the second power line PL2. The switch 2115 provides an auxiliary power of the super capacitor 2111 to the storage device 2120 through the second power line PL2 in response to the second control signal CTRL2.

On the other hand, the user device in FIG. 10 may use a one-direction device instead of the switch 2115. As described above, the one-direction device may automatically provide the auxiliary power of the super capacitor 2111 to the storage device 2120. That is, the auxiliary power supply 2110 may automatically provide an auxiliary power without an input of the second control signal CTRL2.

The storage device 2120 may include a volatile memory (not shown), a non-volatile memory (not shown), and a memory controller (not shown).

The user device 2100 in FIG. 10 can prevent a countercurrent by using a diode as the current limiter 2113. The user device 2100 can reduce a stress of the super capacitor that may occur due to an overcurrent by using a resistor as the current limiter 2113.

Figure 13:
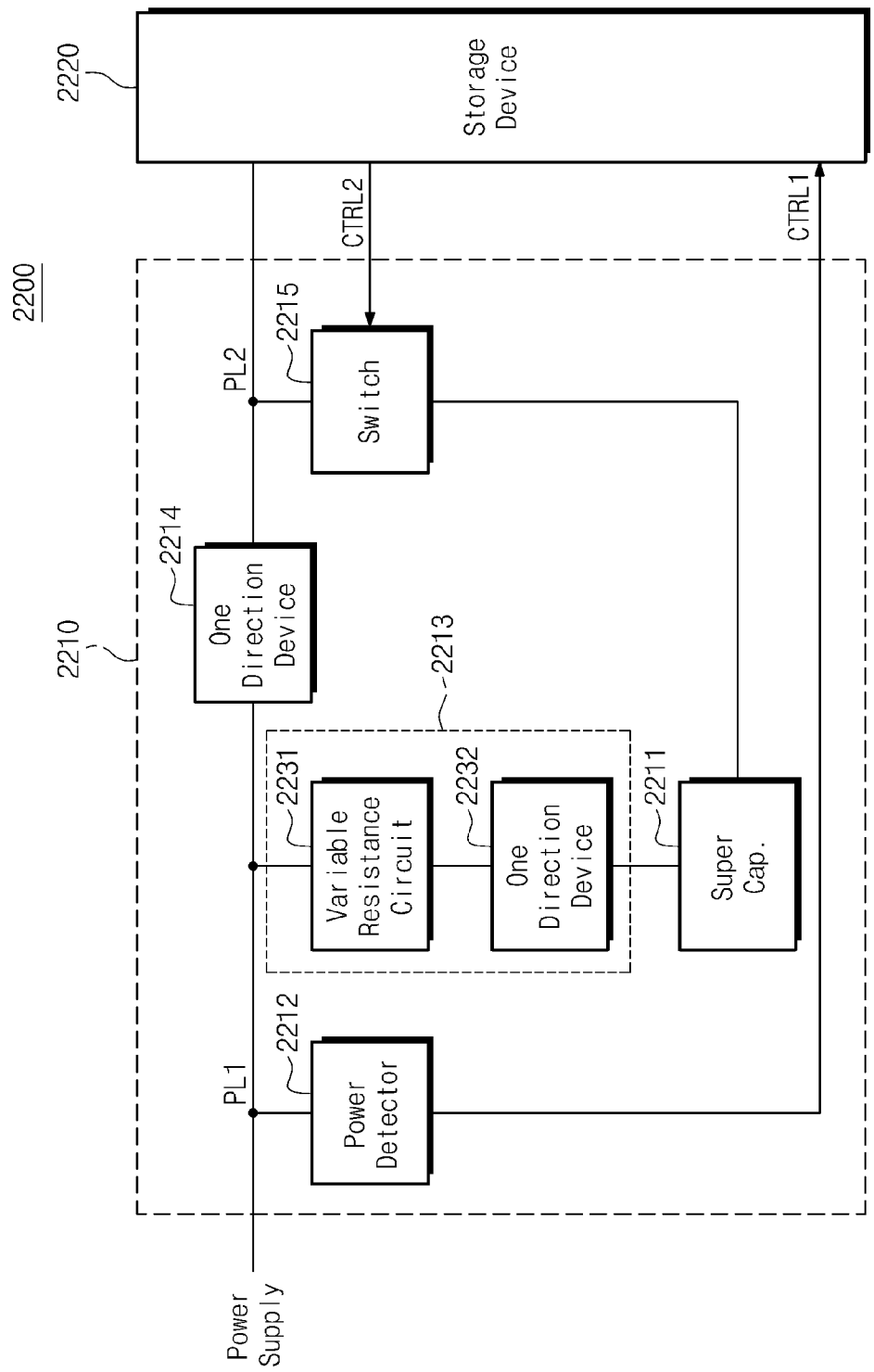
FIG. 13 is a block diagram illustrating a current control user device according to another embodiment.

FIG. 13 is a block diagram illustrating a current control user device according to a second embodiment. Referring to FIG. 13, a user device 2200 includes an auxiliary power supply 2210 and a storage device 2220. The auxiliary power supply 2210 includes a super capacitor 2211, a power detector 2212, a current limiter 2213, a one-direction device 2214, and a switch 2215. Here, descriptions of other elements except the current limiter 2213 are identical to those described in FIG. 10. Hereinafter, a configuration and an operation principle of the current limiter 2213 will be fully described.

Figure 14:
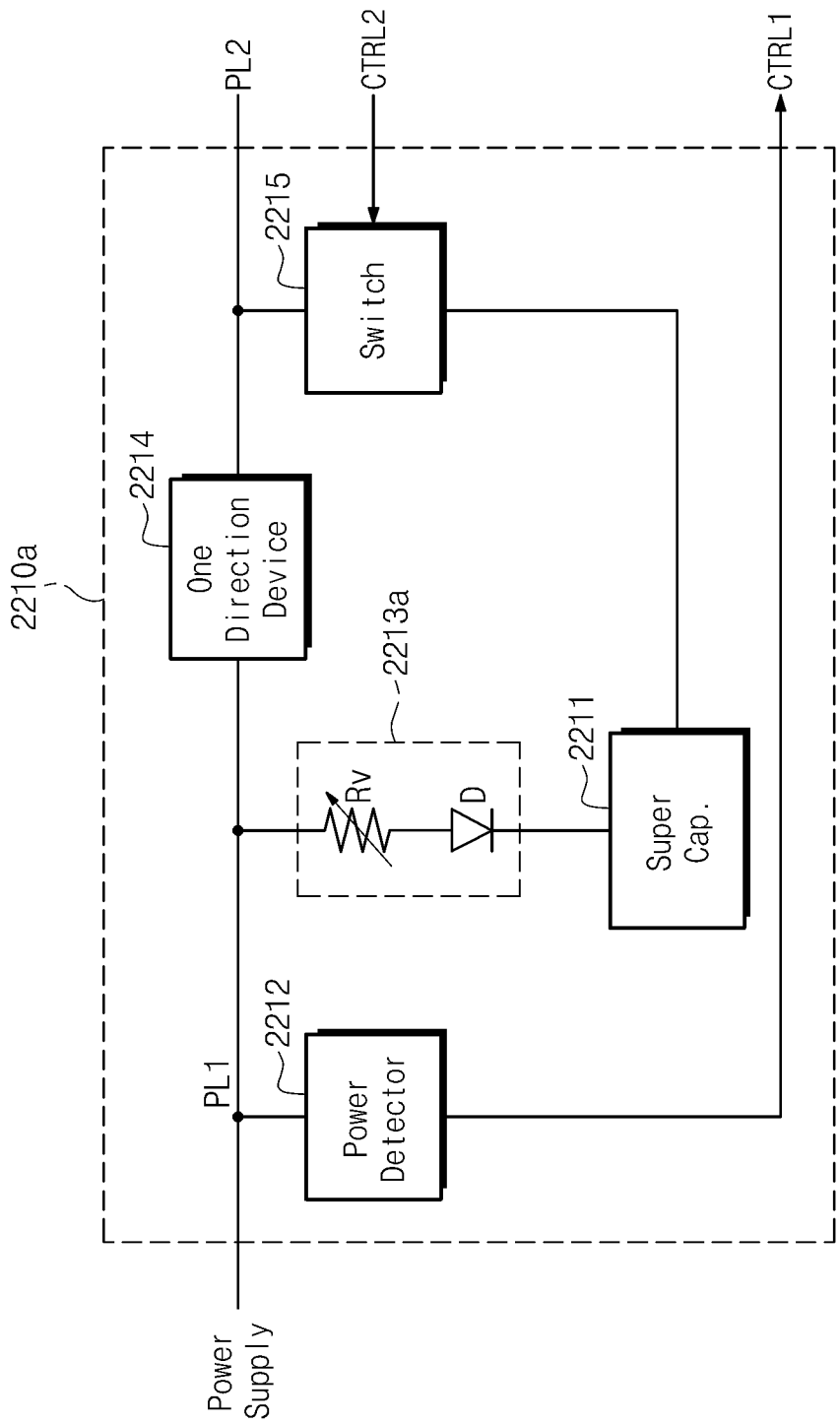
FIG. 14 is a block diagram illustrating a current limiter in FIG. 13.
Figure 16:
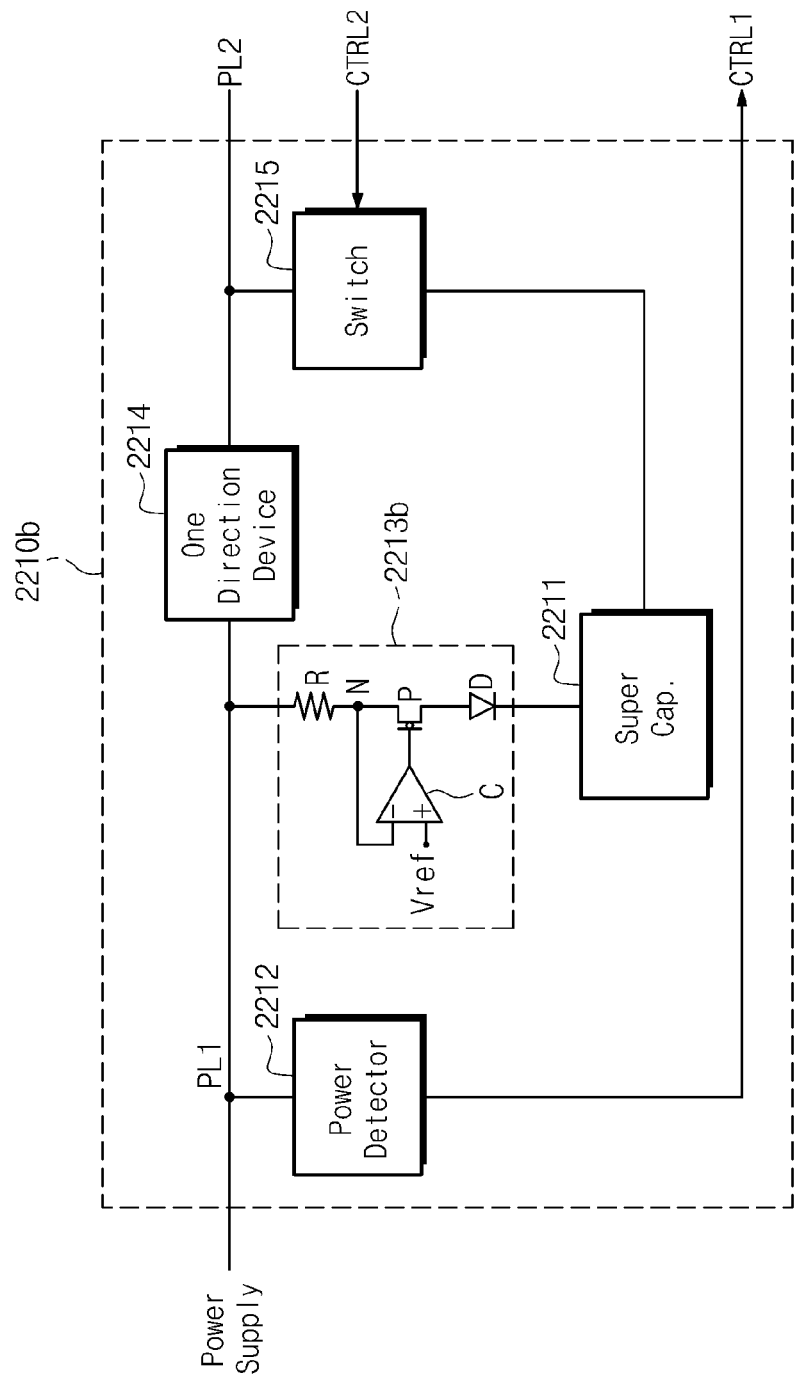
FIG. 16 is a block diagram illustrating a current limiter in FIG. 13.

The current limiter 2213 is connected between the super capacitor 2212 and a first power line PL1. Referring to FIG. 13, the current limiter 2213 includes a variable resistance circuit 2231 and a one-direction device 2232. The variable resistance circuit 2231 is used to prevent an overcurrent, and the one-direction device 2232 is used to prevent a countercurrent. The current limiter 2213 in FIG. 13 may be implemented using various devices. FIG. 14 shows that a current limiter 2213a is implemented using a variable resistor Rv and a diode D. FIG. 16 shows that a current limiter 2213b is implemented using a resistor R, a PMOS transistor P, a comparator C, and a diode D.

Figure 15:
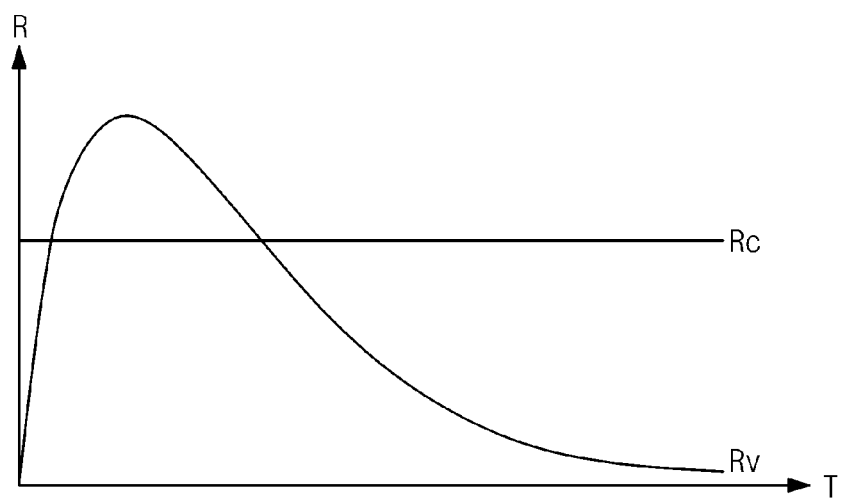
FIG. 15 is a graph illustrating a change of a resistance value of a variable resistor in FIG. 14 with respect to time.

Referring to FIG. 14, the current limiter 2213a is connected between a first power line PL1 and a super capacitor 2211, and includes a variable resistor Rv and a diode D. The variable resistor Rv has a resistance value varied with time. FIG. 15 is a graph illustrating a change of a resistance value of the variable resistor Rv according to time.

Referring to FIG. 15, the resistance value of the variable resistor Rv is high upon initial operation of the user device (2200 in FIG. 13), and is lowered as time goes by. Here, the initial operation is performed during a desired (or, alternatively a predetermined) time duration after the user device 2200 is powered on. The time (for example, about 13 seconds) necessary for the initial operation is a time spent in a booting operation or an ID command exchange operation. The initial operation time is generally preset in an instruction of the user device.

Unlike the variable resistor Rv, a common resistor Rc has a constant value regardless of time. If the common resistor Rc has a high resistance value, the super capacitor 2211 may experience less stress due to an overcurrent. However, a time taken to charge the super capacitor 2211 may be increased. On the contrary, if the common resistor Rc has a low resistance value, the charging time is reduced, but a stress due to an overcurrent may be increased.

The variable resistor Rv may mitigate drawbacks of the common resistor Rc. Since the variable resistor Rv has a high resistance value, an overcurrent is prevented from flowing into the super capacitor 2211. Also, since the variable resistor Rv sends most current supplied from an external power source to the storage 2220, the booting efficiency of the user device 2200 may be improved. Since the resistance value of the variable resistor is reduced with time, the charging time of the super capacitor 2211 may be reduced.

Referring again to FIG. 14, the diode D is turned on when the super capacitor 2211 is charged, but the diode D is turned off when the super capacitor 2211 is discharged. The diode D can prevent a counter current flowing from the super capacitor 2211 to the first power line PL1.

Referring to FIG. 16, a current limiter 2213b includes a resistor R, a PMOS transistor P, a comparator C, and a diode D. Here, the resistor R is connected between a first power line PL1 and a resistance node N. The resistor R has a constant resistance value. The resistor R has a lower resistance value than that of the common resistor (Rc in FIG. 12), and reduces an overcurrent during initial operation. The resistor R may not be used according to another embodiment.

The PMOS transistor is connected between the resistance node N and the diode D, and is controlled according to an output value of the comparator C. The comparator C includes a (+) terminal receiving a reference voltage $V_{ref}$, (−) terminal receiving a voltage of the resistance node N, and an output terminal providing an output voltage to a PMOS transistor P. The diode D is connected between the PMOS transistor P and the super capacitor 2211.

During initial operation, most current is provided to the storage device (2220 in FIG. 3), and a small trickle current is provided to the super capacitor 2211. The trickle current is generated in a section where a level of the resistance node N is smaller than the reference voltage $V_{ref}$. That is, when the level of the resistance node N is smaller than the reference voltage $V_{ref}$, the output voltage of the comparator C becomes a high level. In this case, a small trickle current flowing through the PMOS transistor P is charged into the super capacitor 2211.

After a certain time passes, charge builds up at the resistance node N such that the voltage of node N becomes higher than the reference voltage $V_{ref}$, the output voltage of the comparator becomes a low level. In this case, the PMOS transistor P is turned on. If the PMOS transistor P is turned on, a large amount of current flows into the super capacitor 2211. Thus, the current limiter 2213b in FIG. 16 can reduce an overcurrent, shorten a charging time, and enhance booting efficiency during the initial operation.

Figure 17:
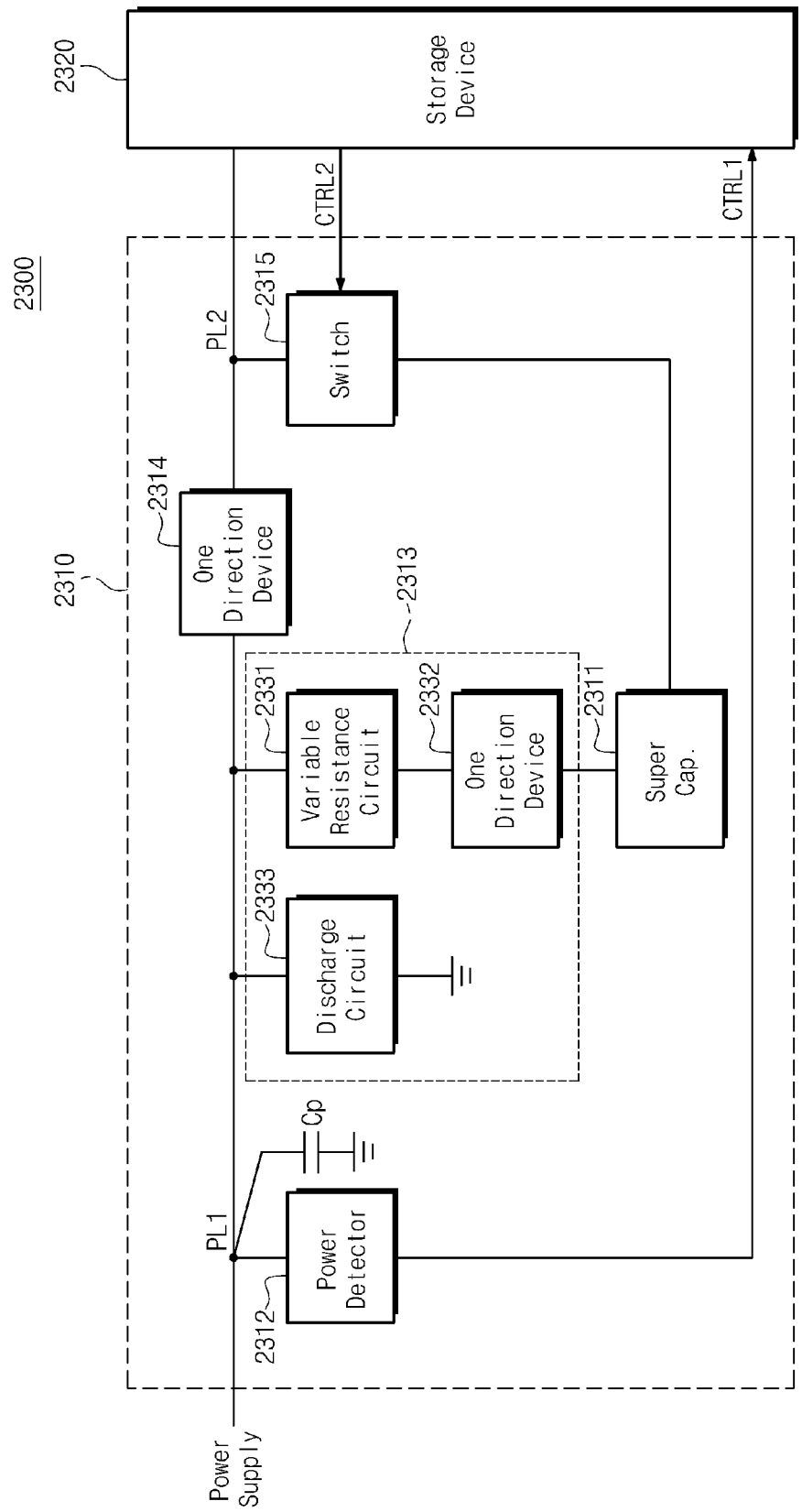
FIG. 17 is a block diagram illustrating a current control user device according to another embodiment.

FIG. 17 is a block diagram illustrating a current control user device according to a third embodiment. Referring to FIG. 17, the user device 2300 includes an auxiliary power supply 2310, and a storage device 2320. The auxiliary power supply 2310 includes a super capacitor 2311, a power detector 2312, a current limiter 2313, a one-direction device 2314, and a switch 2315. Here, descriptions of other elements except the current limiter 2313 are identical to those described in FIG. 10. Hereinafter, a configuration and an operation principle of the current limiter 2313 will be fully described.

Referring to FIG. 17, the current limiter 2313 further includes a discharge circuit 2333 besides a variable resistance circuit 2331 and a one-direction device 2332. The variable resistance circuit 2331 is used to prevent an overcurrent, and the one-direction device 2332 is used to prevent a countercurrent. Descriptions of the variable resistance circuit 2331 and the one-direction device 2332 are identical to those described in FIG. 13. Hereinafter, the discharge circuit 2333 will be fully described.

Upon SPO, the power detector 2312 detects a level of a first power line PL1, and provides a first control signal CTRL1 to the storage device 2320. When the power detector 2312 detects the level of the first power line PL1 in a short time, the storage device 2220 can normally perform an SPO protection operation.

However, a parasitic capacitance may exist in the first power line PL1 upon SPO. The parasitic capacitance may hinder the operation of the power detector 2312. If the parasitic capacitance exists in the first power line PL1, the power detector 2312 may not exactly detect a dropped power level when the level of the first power line PL1 is suddenly dropped. If this occurs, the power detector 2312 may not trigger the SPO protection operation.

Figure 18:
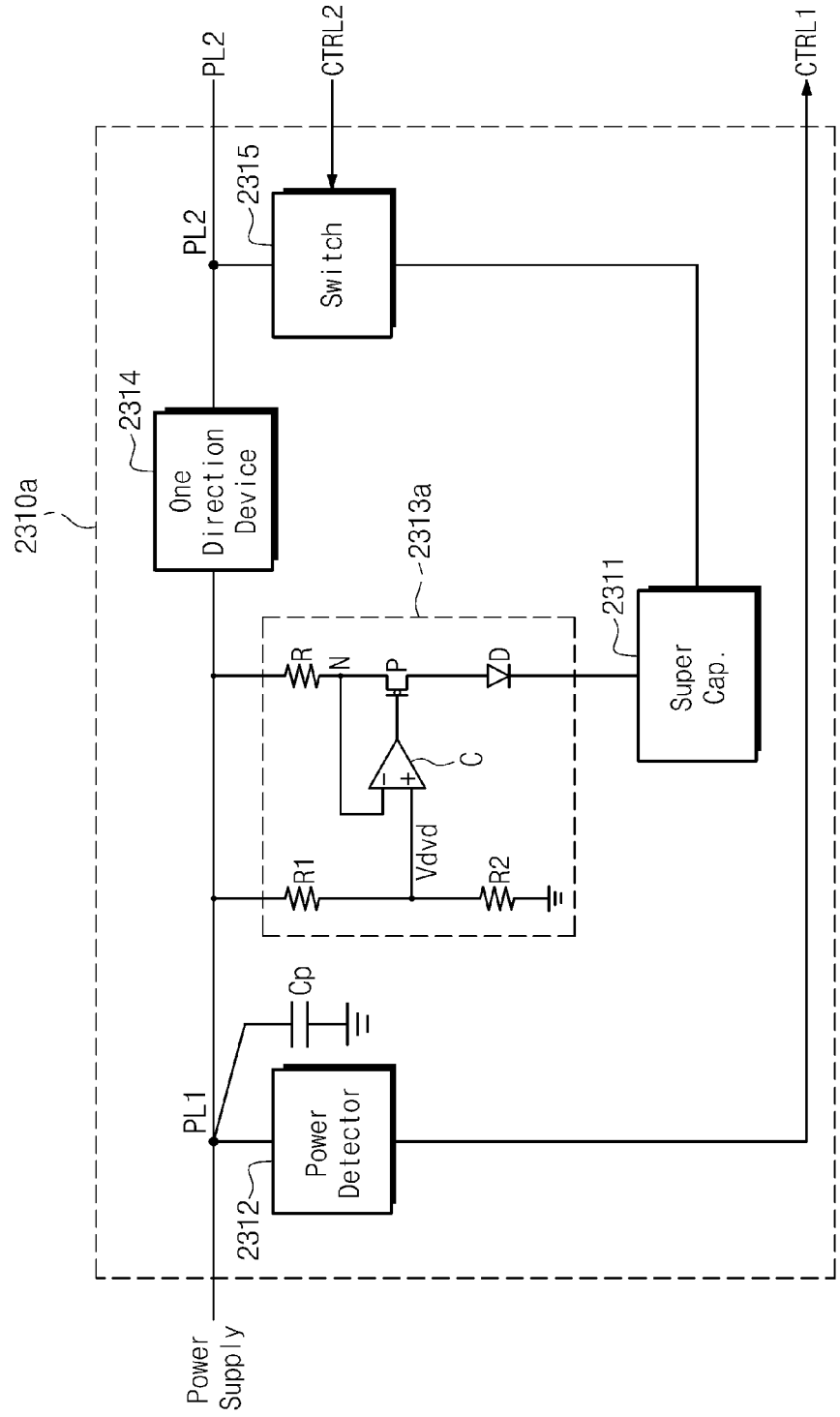
FIG. 18 is a block diagram illustrating a current limiter in FIG. 17.

The discharge circuit 2333 forms a discharging path between the first power line PL1 and the ground terminal. The discharge circuit 2333 may remove a parasitic capacitance through the discharging path. The discharge circuit 2333 may be implemented in various devices. FIG. 18 shows an example of configuring a discharge circuit using a voltage divider circuit.

Referring to FIG. 18, a current limiter 2313a includes a resistor R, a PMOS transistor P, a comparator C, a diode D, and voltage divider circuits R1 and R2. Here, the voltage divider circuits R1 and R2 provide a divider voltage $V_{dvd}$ to a (+) terminal of the comparator C.

During initial operation, most current is provided to the storage device (2320 in FIG. 17), and a small trickle current is provided to the super capacitor 2311. During the initial operation, the trickle current is generated in a section where a level of the resistance node N is smaller than the reference voltage $V_{dvd}$. That is, when the level of the resistance node N is smaller than the reference voltage $V_{dvd}$, the output voltage of the comparator C becomes a high level. In this case, a small trickle current flowing through the PMOS transistor P is charged into the super capacitor 2211.

After a certain time passes, the level of the resistance node N becomes higher than the reference voltage $V_{dvd}$, the output voltage of the comparator becomes a low level. In this case, the PMOS transistor P is turned on. If the PMOS transistor P is turned on, a large amount of current is flowed into the super capacitor 2211. Thus, the current limiter 2213a in FIG. 16 can reduce an overcurrent, shorten a charging time, and enhance booting efficiency during the initial operation.

A user device according to an embodiment includes a current limiter including a variable resistance circuit. The user device can protect a super capacitor and shorten a charging time by controlling a current flowing into the super capacitor and a storage device.

On the other hand, a current control user device may be used in connection with the user device having a plurality of super capacitors. That is, a user device according to an embodiment may use a plurality of super capacitors, and simultaneously include a current limiter between the plurality of super capacitors and a power line. A user device according to an embodiment may stably perform a SPO protection operation while protecting a super capacitor through a current control and shortening a charging time. Still further any of these embodiments may be combined and/or may be combined with any of the embodiments of section 1.

The auxiliary power supply may be applied to various products (e.g., HDD, SSD, memory cards, computers, and portable electronic devices). For example, in FIG. 13, the storage device 2220 may be SSD, HDD, include a volatile and non-volatile memory as in FIG. 1, etc.

3. A user device having a plurality of super capacitors

Figure 19:
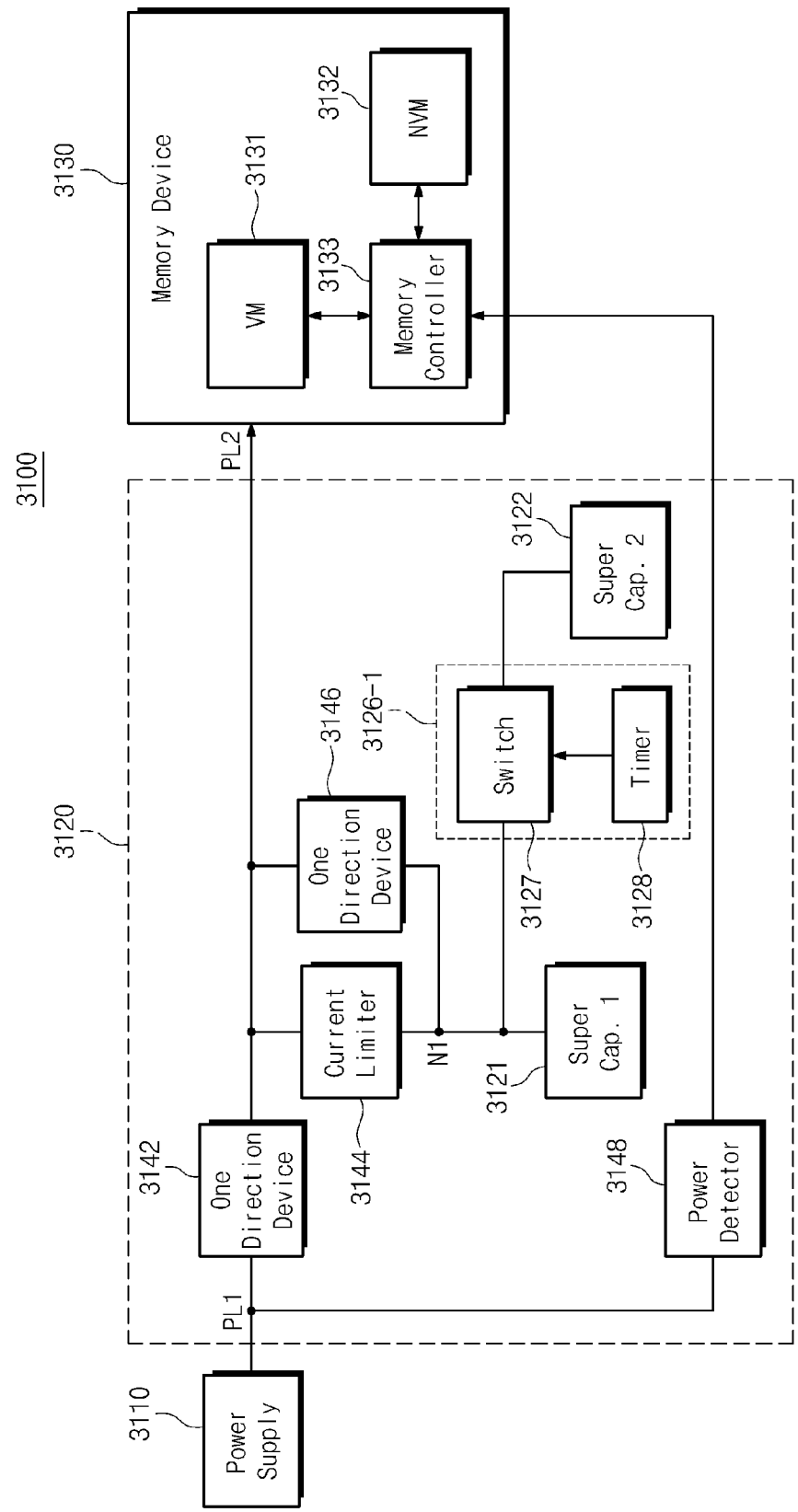
FIGS. 19 through 28 are block diagrams illustrating a user device having a plurality of super capacitors according to different embodiments.

FIG. 19 is a block diagram illustrating a user device having a plurality of super capacitors according to an embodiment. Referring to FIG. 19, a user device 3100 includes a power supply 3110, an auxiliary power supply 3120, and a memory system 3130. The power supply 3110 provides an operation power to the user device 3100. The power supply 3110 may be located inside or outside the user device 3100.

The user device includes an auxiliary power supply 3120 to stably perform a SPO protection operation. The auxiliary power supply 3120 includes a plurality of super capacitors. The auxiliary power supply 3120 stably performs the SPO protection operation using the plurality of super capacitors.

Referring to FIG. 19, the auxiliary power supply 3120 includes a power detector 3148, first and second super capacitors 3121 and 3122, one-direction devices 3142 and 3146, a current limiter 3144, and a control circuit 3126-1. The control circuit 3126-1 includes a switch 3127 and a timer 3128. The power detector 3148 is the same as the power detector 1131 in FIG. 1, and indicates to the memory device 3130 when SPO occurs. The first and the second super capacitors 3121 and 3122 are power storage devices for storing an auxiliary power. The one-direction devices 3142 and 3146, the switch 3127, and the timer 3128 are power control devices for controlling the power storage device.

The super capacitors 3121 and 3122 are power storage devices that may retain high-capacity charges, and are used to store an auxiliary power. The super capacitors 3121 and 3122 may be charged upon a power-up or normal operation. The super capacitors 3121 and 3122 may provide an auxiliary power to the user device 3100 using charges. The first and the second super capacitors 3121 and 3122 may provide an auxiliary power in stages. That is, an auxiliary power of the second super capacitor 3122 may be provided when a certain time lapses after an auxiliary power of the first super capacitor 3121 is provided.

The one-direction device 3142 is connected between a first power line PL1 and a second power line PL2. The one-direction device 3142 is a device such as a diode that allows a current to flow in only one direction. The one-direction device 3142 forms a current path from the first power line PL1 to the second power line PL2 according to a voltage difference between the first and the second power lines PL1 and PL2. The one-direction device 3142 is turned on while the first and/or second super capacitors 3121 and 3122 are charged, and is turned off while the super capacitors are discharged. The one-direction device 3142 may stop an auxiliary power of the first or second super capacitor 3121 and 3122 from being provided into the first power line PL1. Namely the one-direction device 3142 functions in the same manner as one-direction device 1121 described with respect to FIG. 1.

Similarly, the current limiter 3144 and the one-direction device 3146 are connected in parallel between the second power line PL2 and the first super capacitor 3121. The node connecting the current limiter 3144 and the one-direction device 3146 is labeled as node N1. The current limiter 3144 and the one-direction device 3146 are structured and operate in the same manner as the current limiter 1140 and the one-direction device 1122, respectively, described with respect to FIG. 1. Accordingly, a description of these elements will not be repeated for the sake of brevity.

The switch 3127 is connected between node N1 and the second super capacitor 3122. The switch 3127 provides the auxiliary power of the second super capacitor 3122 to the second power line PL2 via the one direction device 3146. The switch 3127 may be implemented in a device such as a MOS transistor and a pass gate.

In a one embodiment, the timer 3128 measures a total operation time of the user device, compares this total operation time to an expected lifetime of the first super capacitor 3121, and controls the switch 3127 based on the comparison. Over time the fully charged state of the first super capacitor 3121 decreases. Eventually, even though fully charged, the first super capacitor 3121 can no longer effectively serve as an auxiliary power source. This expected lifetime of the first super capacitor 3121 may be pre-set or programmed into the timer 3128. If the timer 3128 determines that the total operation time of the user drive exceeds this expected lifetime, the timer 3128 controls the switch to connect the second super capacitor 3122 to the first node N1. In this manner, the control circuit 3126-1 can now supplement the auxiliary power provided by the first super capacitor 3121 with power from the second super capacitor 3122 and extend the useful lifetime of the auxiliary power supply 3120. As will be appreciated, the time measured by timer 3128 will depend on the design of the first super capacitor 3121.

FIG. 19 shows a volatile memory (VM) 3131, a non-volatile memory (NVM) 3132, and a memory controller 3133 as an example of a memory system 3130. The memory system 3130 may receive a power from the main power supply 3110 or the auxiliary power supply 3120 using the power lines PL1 and PL2. The memory system 3130 may be a SSD, memory card, etc. The memory system may be a magnetic disk device, a hard disk device (HDD) and the like besides a semiconductor memory device.

The volatile memory 3131 is a device that may lose data when being powered off, and includes DRAM or SRAM. The non-volatile memory 3132 is a device that may retain data even when being powered off, and includes EEPROM, FRAM, PRAM, MRAM, and flash memory.

The memory controller 3133 may control read, write, and erase operations of the volatile memory 3131 and the non-volatile memory 3132. The memory controller 3133 may control a SPO protection operation upon SPO. That is, the memory controller 3133 may control a backup operation of meta data or cache data from the volatile memory 3131 to the non-volatile memory 3132 based on output from the power detector 3148. As will be appreciated, instead, SPO protection may be controlled by an SPO controller as in FIG. 1.

Figure 20:
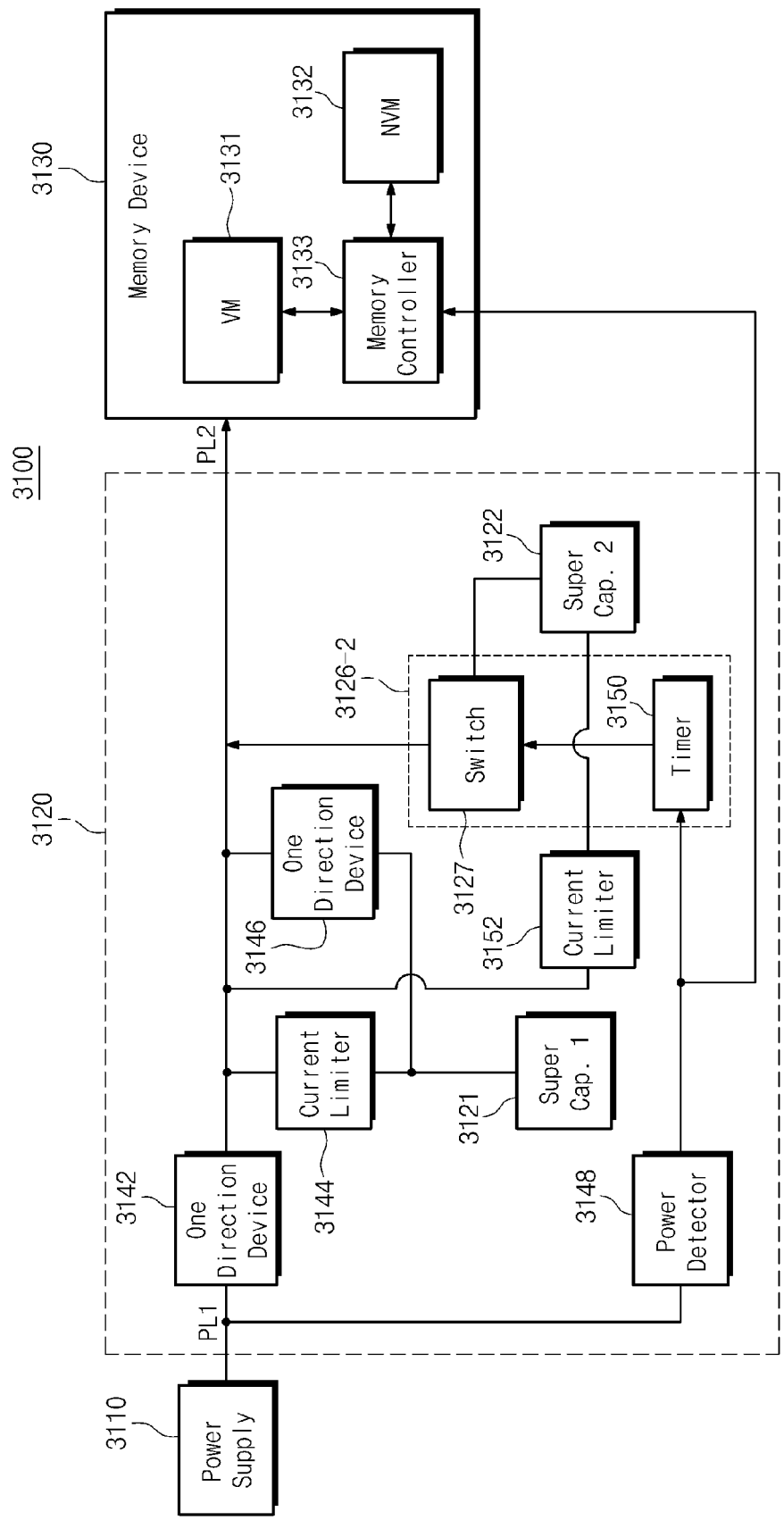

FIG. 20 is a block diagram illustrating a user device having a plurality of super capacitors according to another embodiment. The embodiment of FIG. 20 is the same as the embodiment of FIG. 19 except that timer 3150 has replaced timer 3128, the timer 3150 receives the output from the power detector 3148, a second current limiter 3152 connects the second power line PL2 to the second super capacitor 3122, and the switch 3127 connects the second super capacitor 3122 to the second power line PL2 instead of the node N1. Accordingly, only the differences from the embodiment of FIG. 19 will be described for the sake of brevity. In this embodiment, the second super capacitor 3122 is charged via the second current limiter 3152. Namely, the current limiter 3152 may have the same structure and function as the first current limiter 3144.

Here, the timer 3150 measures the expected amount of time the first super capacitor 3121 provides sufficient power for the SPO protection operation following SPO. Namely, the timer 3150 is triggered by the power detector 3148 detecting SPO, and once the time measured by timer 3150 expires, the timer 3150 causes the switch 3127 to connect the second super capacitor 3122 to the second power line PL2.

The timer 3150 prevents a phenomenon that an SPO protection operation is not normally performed due to a lack of the auxiliary power of the first super capacitor 3121. The SPO protection operation may include finishing jobs such as a garbage collection or a data backup.

Also, the auxiliary power of the super capacitors may be reduced according to the usage time. The user device 3100 may sufficiently perform the SPO protection operation if the auxiliary power becomes insufficient when a time lapses after the first super capacitor 3121 supplies power.

Upon SPO, the auxiliary power supply 3120 in FIG. 20 provides the auxiliary power of the first super capacitor 3121, and the control circuit 3126-2 provides the auxiliary power of the second super capacitor 3122 automatically after the measured time lapses. The memory device 3130 performs the SPO protection operation normally by using the auxiliary powers of the first and the second super capacitors in stages.

In one embodiment, the time measured by timer 3150 may be pre-set or programmed into the timer 3150. In another embodiment, the auxiliary power supply 3120 may include a calculation circuit (not shown) that calculates the time based on a charge stored by the first super capacitor 3121. In this manner, the time measured by the timer 3150 may be dynamically adjusted. As will be appreciated, the calculation of this time will depend on the design of the first super capacitor 3121.

As will be appreciated, the embodiment of FIG. 19 may be combined with the embodiment of FIG. 20.

Figure 21:
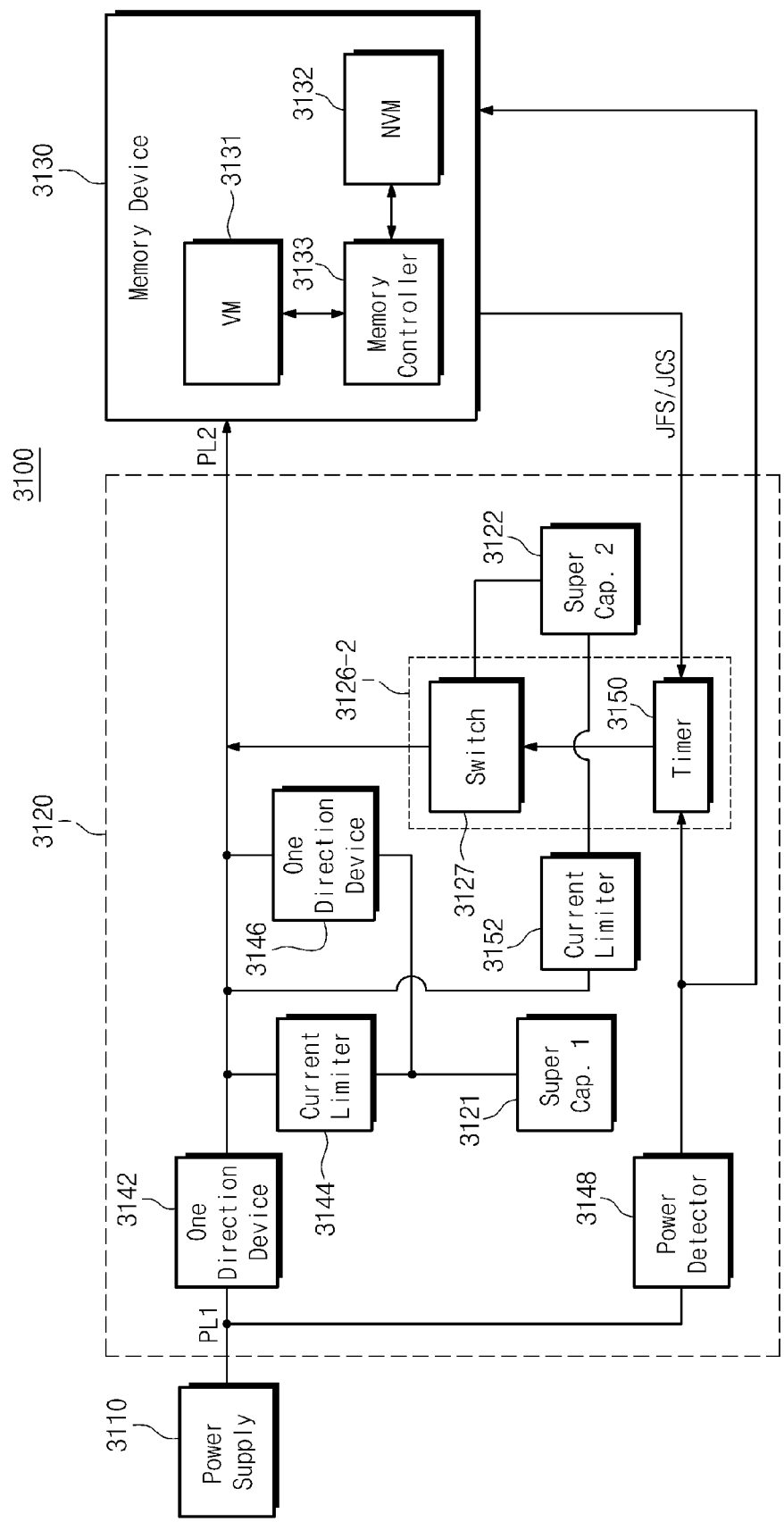

FIG. 21 is a block diagram illustrating a user device having a plurality of super capacitors according to another embodiment. The embodiment of FIG. 21 is the same as the embodiment of FIG. 20 except that the control circuit 3126-2, and more specifically, the timer 3150 also receives either a job finished signal (JFS) or a job continuing signal (JCS) from the memory controller 3133. Accordingly, only the differences from the embodiment of FIG. 20 will be described for the sake of brevity.

In one embodiment, the memory controller 3133 outputs the JFS to indicate whether the SPO protection operation has completed. In this embodiment, the timer 3150 prohibits the switch 3127 from connecting the second super capacitor 3122 to the second power line PL2 if the JFS indicates the SPO protection operation is finished. Even if the time measured by the timer 3150 has expired, the timer 3150 does not send a control signal causing the switch 3127 to connect the second super capacitor 3122. In this manner, the second super capacitor 3122 is not needlessly discharged.

In another embodiment, the memory controller 3133 outputs the JCS to indicate whether the SPO protection operation is continuing. In this embodiment, the timer 3150 prohibits the switch 3127 from connecting the second super capacitor 3122 to the second power line PL2 if the JCS indicates the SPO protection operation is no longer continuing. Even if the time measured by the timer 3150 has expired, the timer 3150 does not send a control signal causing the switch 3127 to connect the second super capacitor 3122. In this manner, the second super capacitor 3122 is not needlessly discharged.

Figure 22:
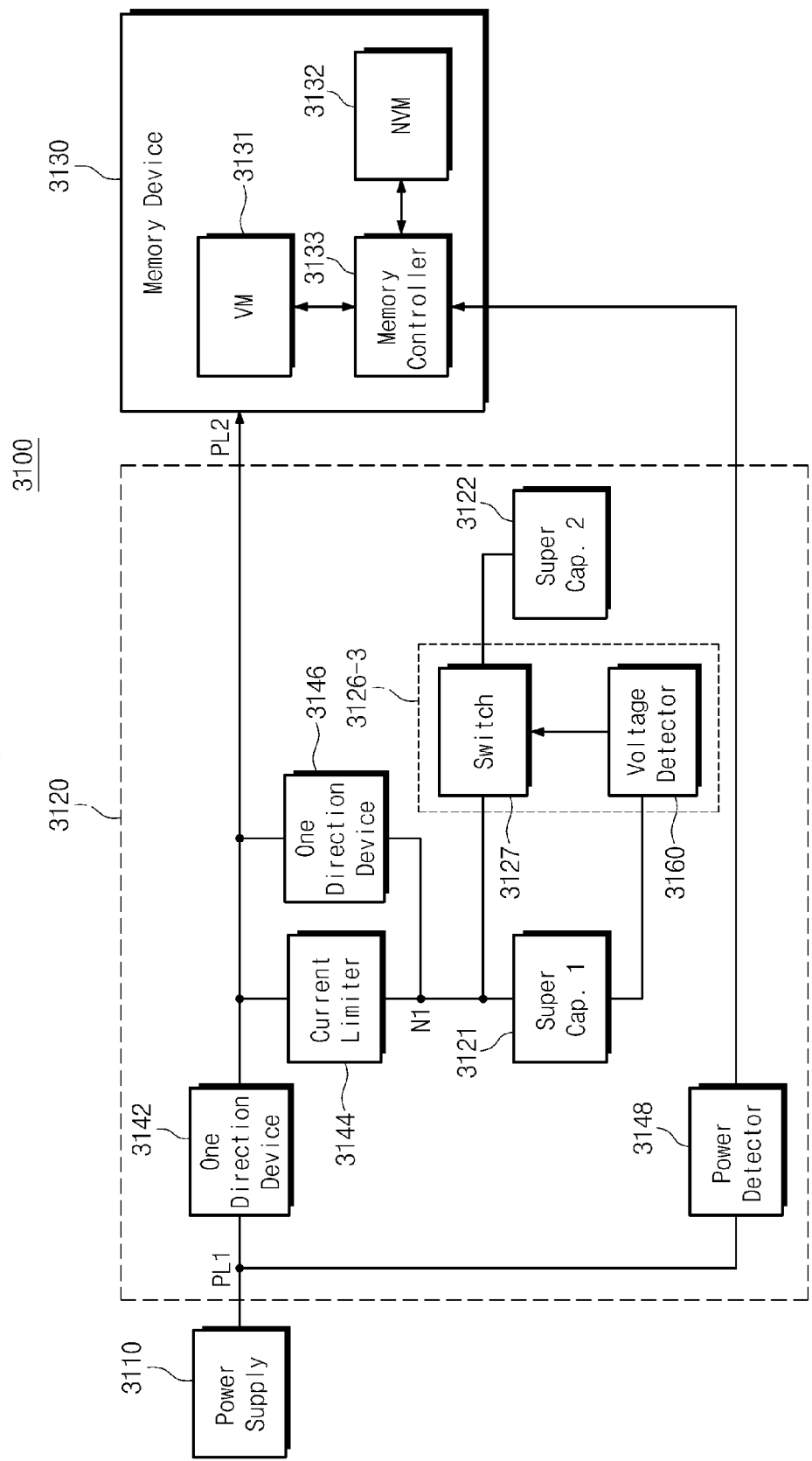

FIG. 22 is a block diagram illustrating a user device having a plurality of super capacitors according to another embodiment. As shown, this embodiment is the same as FIG. 19 except that control circuit 3126-3 has replaced the control circuit 3126-1, and in particular, the timer 3128 has been replaced by a voltage detector 3160. Accordingly, only the differences from the embodiment of FIG. 19 will be described for the sake of brevity.

Here, the voltage detector 3160 detects the fully charged state of the super capacitor 3121. This may be accomplished by calculating the average charge stored by the first super capacitor 3121 over a time window. Because the first super capacitor 3121 spends significantly more time in the fully charged state, as long as the time window is relatively large, the average will closely approximate the fully charged state of the first super capacitor 3121.

As discussed previously, over time the full charged state of the first super capacitor 3121 decreases over time. The voltage detector 3160 detects if the fully charged state falls below a threshold level. The threshold level is set such that below this threshold level the first super capacitor 3121 no longer acceptably functions as an auxiliary power source. As will be appreciated this threshold level will depend on the design of the user device.

If the voltage detector 3160 detects that the fully charged state has fallen below the threshold level, the voltage detector 3160 controls the switch 3127 to connect the second super capacitor 3122 to the first node N1. In this manner the second super capacitor 3122 can now supplement the auxiliary power provided by the first super capacitor 3121 and extend the useful lifetime of the auxiliary power supply 3120.

Figure 23:
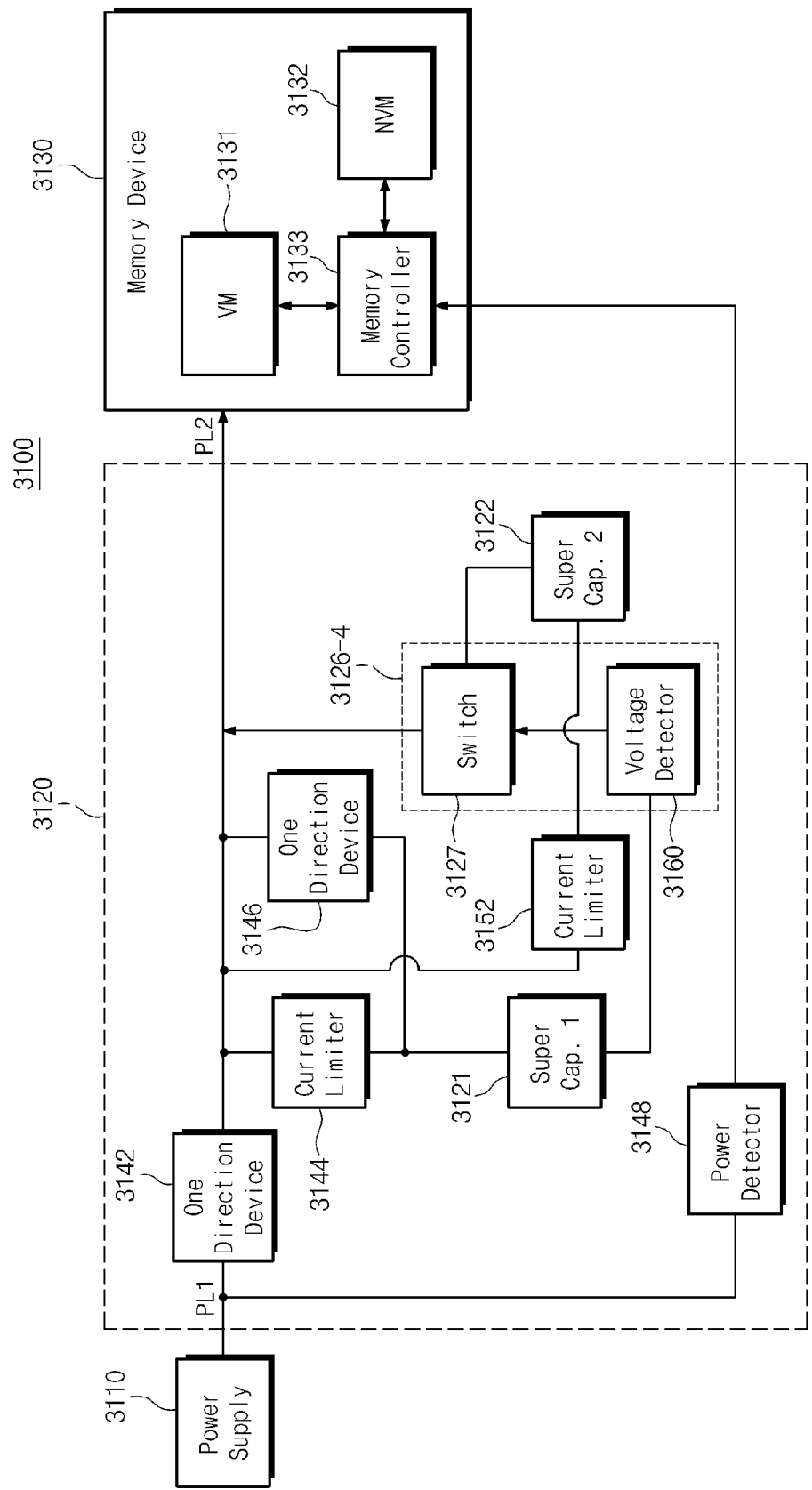

FIG. 23 is a block diagram illustrating a user device having a plurality of super capacitors according to another embodiment. The embodiment of FIG. 23 is the same as the embodiment of FIG. 22 except that control circuit 3126-4 has replaced the control circuit 3126-3, and in particular, voltage detector 3162 has replaced the voltage detector 3160. Also, a second current limiter 3152 connects the second power line PL2 to the second super capacitor 3122 and the switch 3127 connects to the second super capacitor 3122 to the second power supply line PL2 instead of the node N1. Accordingly, only the differences from the embodiment of FIG. 22 will be described for the sake of brevity. In this embodiment, the second super capacitor 3122 is charged via the second current limiter 3152. Namely, the current limiter 3152 may have the same structure and function as the first current limiter 3144.

Here, the voltage detector 3162 detects if a voltage or charge of the first super capacitor 3121 falls below a level providing sufficient power for the SPO protection operation. If so detected, the voltage detector 3162 causes the switch 3127 to connect the second super capacitor 3122 to the second power line PL2. Accordingly, if the first super capacitor 3121 discharges to provide power for an SPO protection operation and that power is insufficient to complete the SPO protection operation, the voltage detector 3162 causes the switch 3127 to supplement with the second super capacitor 3122. This extends the length of the SPO protection operation.

Accordingly, the control circuit 3126-4 prevents a phenomenon that an SPO protection operation is not normally performed due to a lack of the auxiliary power of the first super capacitor 3121. The SPO protection operation may include finishing jobs such as a garbage collection or a data backup.

Also, the auxiliary power of the super capacitors may be reduced according to the usage time. The user device 3100 may sufficiently perform the SPO protection operation if the auxiliary power becomes insufficient when a time lapses after the first super capacitor 3121 is operated.

As will be appreciated, the embodiment of FIG. 23 may be combined with the embodiment of FIG. 22.

Figure 24:
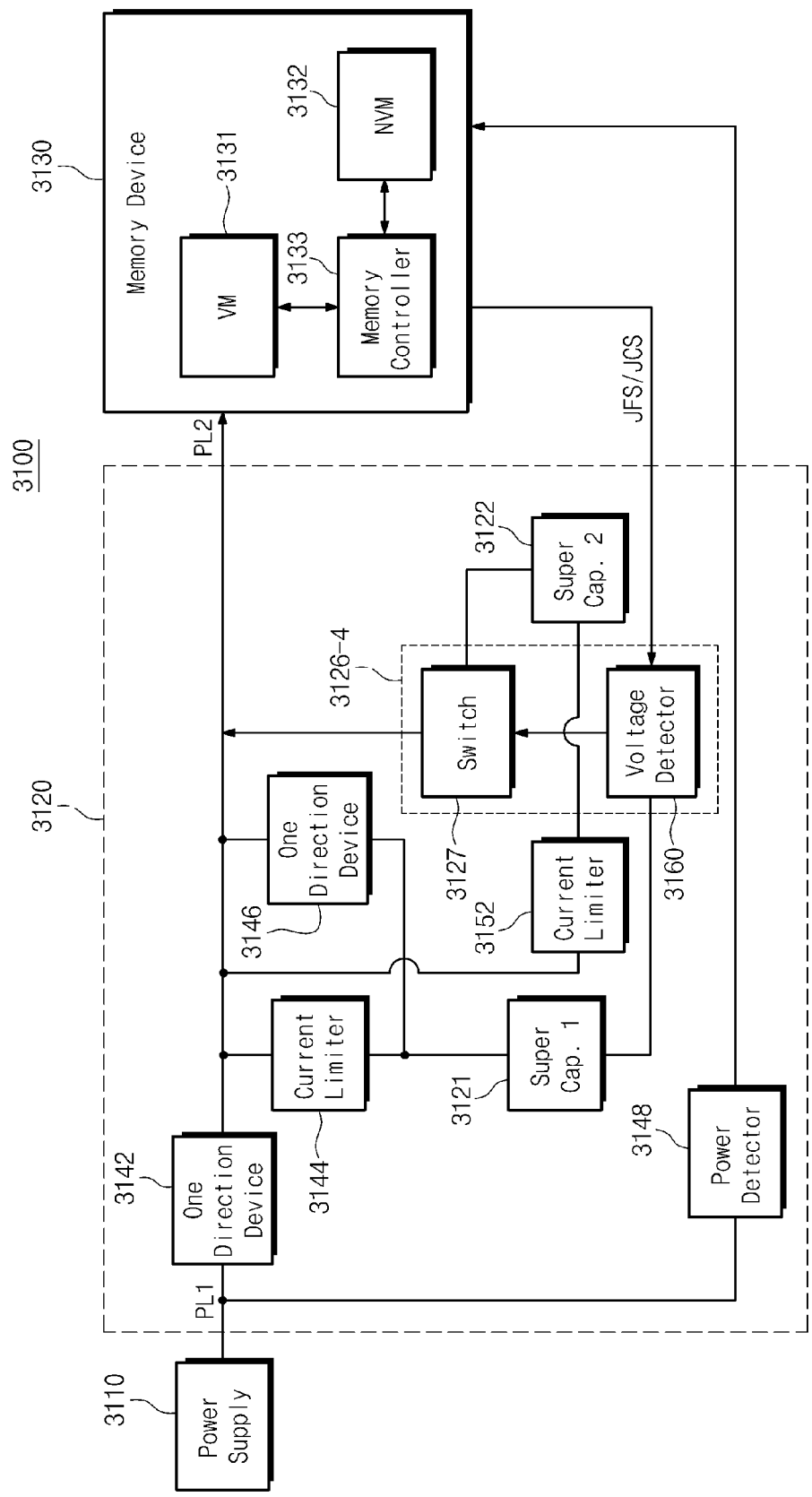

FIG. 24 is a block diagram illustrating a user device having a plurality of super capacitors according to another embodiment. The embodiment of FIG. 24 is the same as the embodiment of FIG. 23 except that the voltage detector 3162 in the control circuit 3126-4 also receives either a job finished signal (JFS) or a job continuing signal (JCS) from the memory controller 3133. Accordingly, only the differences from the embodiment of FIG. 23 will be described for the sake of brevity.

In one embodiment, the memory controller 3133 outputs the JFS to indicate whether the SPO protection operation has completed. In this embodiment, the voltage detector 3162 prohibits the switch 3127 from connecting the second super capacitor 3122 to the second power line PL2 if the JFS indicates the SPO protection operation is finished. Even if the voltage detector 3162 detects that the voltage of the first super capacitor 3121 falls below the threshold level, the voltage detector 3162 does not send a control signal causing the switch 3127 to connect the second super capacitor 3122. In this manner, the second super capacitor 3122 is not needlessly discharged.

In another embodiment, the memory controller 3133 outputs the JCS to indicate whether the SPO protection operation is continuing. In this embodiment, the voltage detector 3162 prohibits the switch 3127 from connecting the second super capacitor 3122 to the second power line PL2 if the JCS indicates the SPO protection operation is no longer continuing. Even if the voltage detector 3162 detects that the voltage of the first super capacitor 3121 falls below the threshold level, the voltage detector 3162 does not send a control signal causing the switch 3127 to connect the second super capacitor 3122. In this manner, the second super capacitor 3122 is not needlessly discharged.

Figure 25:
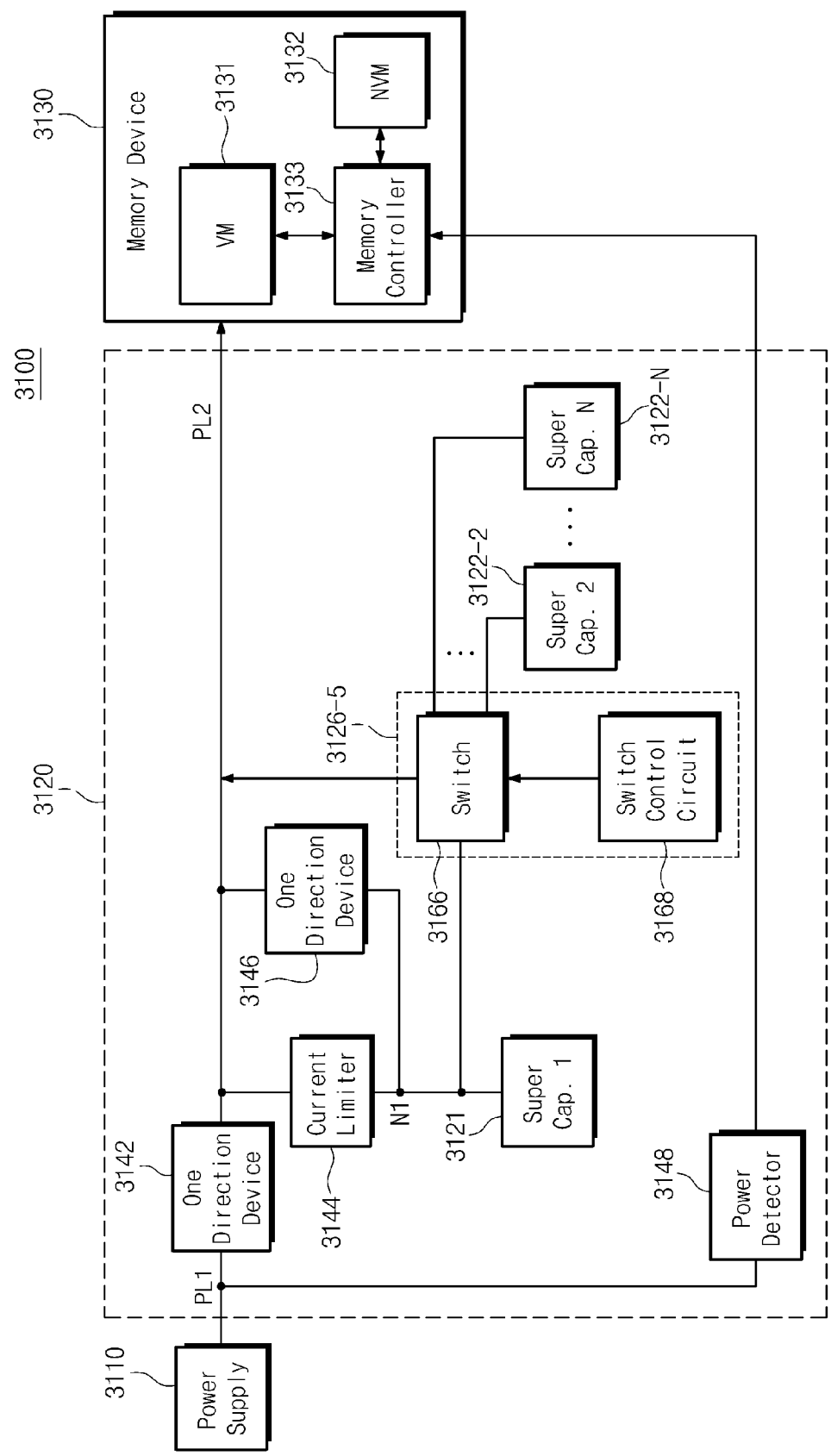

FIG. 25 is a block diagram illustrating a user device having a plurality of super capacitors according to another embodiment. The embodiment of FIG. 25 is the same as the embodiment of FIG. 19 except that the second through nth super capacitors 3122-2 to 3122-$n$ replace the second super capacitor 3122, the control circuit 3126-5 replaces the control circuit 3126-4 and in particular, the switch 3166 replaces the switch 3127, and the switch control circuit 3168 replaces the timer 3128. Accordingly, only the differences between this embodiment and the embodiment of FIG. 19 will be described in detail for the sake of brevity.

The switch 3166 connects none or one of the second through nth super capacitors 3122-2 to 3122-$n$ to the node N1 based on a control signal from the switch control circuit 3168. Initially, the switch control circuit 3168 controls the switch 3166 such that none of the second through nth super capacitors 3122-2 to 3122-$n$ are connected to the node N1. In one embodiment, the switch control circuit 3168 includes a single timer such as timer 3128. As discussed above, the timer measures a total operation time of the user device, compares this total operation time to an expected lifetime of a super capacitor, and controls the switch 3166 based on the comparison. In this embodiment, each of the first to (n−1)th super capacitors 3121, 3122-2 to 3122-($n$−1) are assumed to have a same lifetime. This expected lifetime may be pre-set or programmed into the switch control circuit 3168. If the switch control circuit 3168 determines that the total operation time exceeds this expected lifetime, the switch control circuit 3168 controls the switch to connect the second super capacitor 3122-2 to the first node N1. The switch control circuit 3168 then resets, and begins measuring the total operational lifetime again. Once this measured time exceeds the lifetime again, the switch control circuit 3168 connects the third super capacitor 3122-3 to the node N1. This processes continues up through the nth super capacitor 3122-$n$. In this manner the second through nth super capacitors 3122-2 to 3122-$n$ can now supplement the auxiliary power provided by the first super capacitor 3121 and extend the useful lifetime of the auxiliary power supply 3120. As will be appreciated, the time measured by switch control circuit 3168 will depend on the design of the super capacitors. Also it will be appreciated in this and the embodiment of FIG. 19, that instead of counting up, the switch control circuit 3168 or timer 3128 may count down from the expected lifetime.

In another embodiment, the switch control circuit 3168 includes a plurality of timers, each associated with one of the second through nth super capacitors 3122-2 to 3122-$n$. This embodiment permits using super capacitors having different useful lifetimes. In another embodiment, the switch control circuit 3168 includes more than one but less than (n−1) timers. In this embodiment, each timer is associated with a group of super conductors having a same lifetime. As with the previously described embodiments, the timers control when the lifetime of the associated super capacitors expire and the switch 3166 should connect another super capacitor to node N1.

Figure 26:
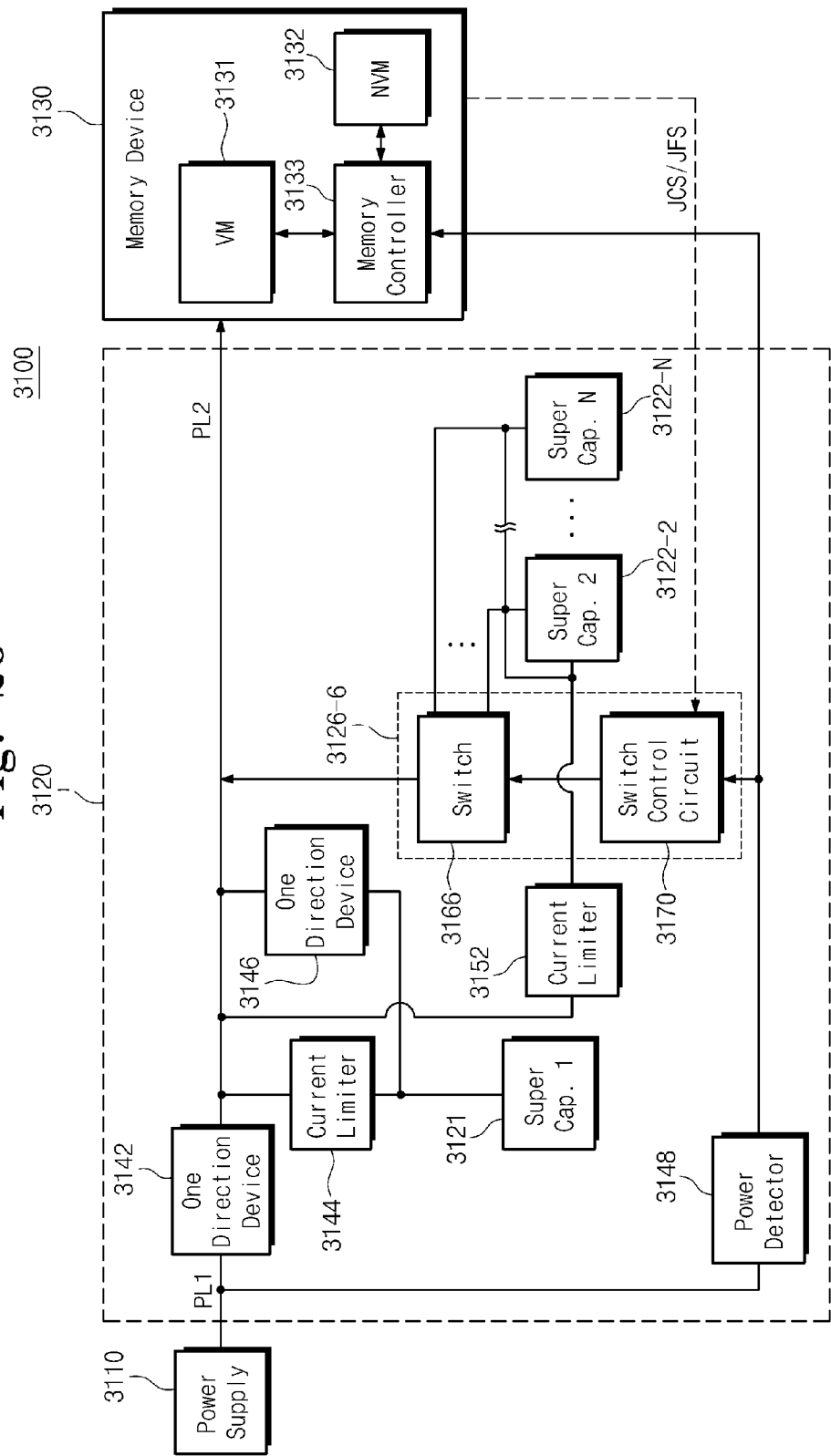

FIG. 26 is a block diagram illustrating a user device having a plurality of super capacitors according to another embodiment. The embodiment of FIG. 26 is the same as the embodiment of FIG. 25 except that switch control circuit 3170 has replaced switch control circuit 3168 such that a control circuit 3126-6 replaces control circuit 3126-5, switch control circuit 3170 receives the output from the power detector 3148, a second current limiter 3152 connects the second power line PL2 to the second to nth super capacitors 3122-2 to 3122-$n$, and the switch 3166 connects the second to nth super capacitors 3122-2 to 3122-$n$ to the second power supply line PL2 instead of the node N1. Accordingly, only the differences from the embodiment of FIG. 25 will be described for the sake of brevity. In this embodiment, the second through nth super capacitors 3122-2 to 3122-$n$ are charged via the second current limiter 3152.

Here, the switch control circuit 3170 measures the expected amount of time a super capacitor provides sufficient power for the SPO protection operation. Namely, the switch control circuit 3170 is triggered by the power detector 3148 detecting SPO, and once the time measured by the switch control circuit 3170 expires, the switch control circuit 3170 causes the switch 3170 to connect the second super capacitor 3122-2 to the second power line PL2. The switch control circuit 3170 then begins measuring the expected time again, and once this time expires the switch control circuit 3170 controls the switch 3166 to connect the third super capacitor 3122-3 to the second power line PL2. This processes continues up through the nth super capacitor 3122-$n$. In this manner the second through nth super capacitors 3122-2 to 3122-$n$ can now supplement the auxiliary power provided by the first super capacitor 3121 and extend length of the SPO protection operation. As will be appreciated, the time measured by switch control circuit 3170 will depend on the design of the super capacitors. Also it will be appreciated in this and the embodiment of FIG. 20, that instead of counting up, the switch control circuit 3170 or timer 3150 may count down from the expected time.

In another embodiment, the switch control circuit 3170 includes a plurality of timers, each associated with one of the second through nth super capacitors 3122-2 to 3122-$n$. This embodiment permits using super capacitors that provide power sufficient for the SPO protection operation for different lengths of time. In another embodiment, the switch control circuit 3170 includes more than one but less than (n−1) timers. In this embodiment, each timer is associated with a group of super conductors providing the same amount of SPO protection operation. As with the previously described embodiments, the timers control when the associated super capacitors expire and the switch 3166 should connect another super capacitor to node N1.

In one embodiment, the time measured by may be pre-set or programmed into the switch control circuit 3170. In another embodiment, the auxiliary power supply 3120 may include a calculation circuit (not shown) that calculates the time based on a charge stored by each associated super capacitor. In this manner, the time measured by the switch control circuit 3170 may be dynamically adjusted. As will be appreciated, the calculation of these times will depend on the design of the super capacitors.

As will be appreciated, the embodiment of FIG. 26 may be combined with the embodiment of FIG. 25.

As shown in FIG. 26, optionally, the switch control circuit 3170 may also receive either a job finished signal (JFS) or a job continuing signal (JCS) from the memory controller 3133.

In one embodiment, the memory controller 3133 outputs the JFS to indicate whether the SPO protection operation has completed. In this embodiment, the switch control circuit 3170 prohibits the switch 3166 from connecting any more of the second-nth super capacitors 3122-2 to 3122-n to the second power line PL2 if the JFS indicates the SPO protection operation is finished.

In another embodiment, the memory controller 3133 outputs the JCS to indicate whether the SPO protection operation is continuing. In this embodiment, the switch control circuit 3170 prohibits the switch 3166 from connecting any more of the second-nth super capacitors 3122-2 to 3122-n to the second power line PL2 if the JCS indicates the SPO protection operation is no longer continuing.

Figure 27:
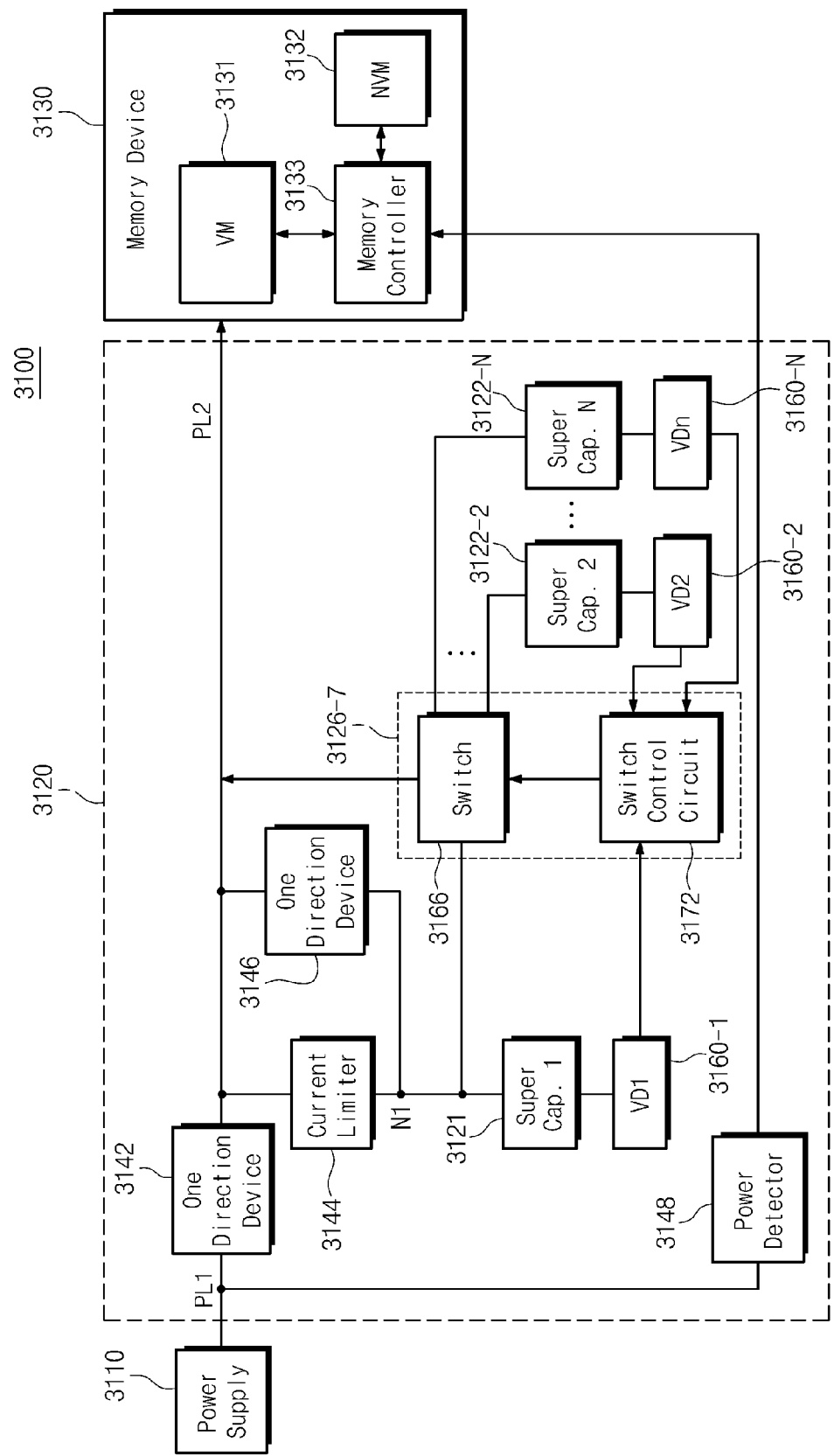

FIG. 27 is a block diagram illustrating a user device having a plurality of super capacitors according to another embodiment. The embodiment of FIG. 27 is the same as the embodiment of FIG. 22 except that the switch 3166 replaces the switch 3127, the switch control circuit 3172 has been added, first-nth voltage detectors 3160-1 to 3160-n replace the voltage detector 3160 and the second through nth super capacitors 3122-2 to 3122-n replace the second super capacitor 3122. Accordingly, the control circuit 3126-7 replaces control circuit 3126-3. Furthermore, it will be appreciated that the voltage detectors 3160-1 to 3160-n may be part of the control circuit 3126-7. Only the differences between this embodiment and the embodiment of FIG. 22 will be described in detail for the sake of brevity.

The switch 3166 connects none or one of the second through nth super capacitors 3122-2 to 3122-n to the node N1 based on a control signal from the switch control circuit 3172. Initially, the switch control circuit 3172 controls the switch 3166 such that none of the second through nth super capacitors 3122-2 to 3122-n are connected to the node N1.

Here, the voltage detectors 3160-1 to 3160-n detect the fully charged state of the first-nth super capacitors 3121, 3122-2 to 3122-n, respectively. This may be accomplished by calculating the average charge stored by the associated super capacitor over a time window as discussed above with respect to FIG. 22.

As discussed previously, over time the fully charged state of a super capacitor decreases. Each voltage detector 3160-1 to 3160-n detects if the fully charged state of the associated super capacitor falls below a threshold level. The threshold level is set such that below this threshold level the super capacitor no longer acceptably functions as an auxiliary power source. As will be appreciated this threshold level will depend on the design of the user device.

If a voltage detector 3160 detects that the fully charged state has fallen below the threshold level, the voltage detector 3160 informs the switch control circuit 3172. Initially, the switch control circuit 3172 ignores the output of the second to nth voltage detectors 3160-2 to 3160-n, and none of the second to nth super capacitors 3122-3122-n are connected to the node N1. If the first voltage detector 3160-1 indicates the useful lifetime of the first super capacitor 3121 has expired, the switch control circuit 3172 connects the second super capacitor 3122-2 to the node N1. After a buffer time period to permit full charging of the second super capacitor 3122-2 and determination of the fully charged state, the switch control circuit 3172 ignores all but the output from the second voltage detector 3160-2. If the second voltage detector 3160-2 indicates the useful lifetime of the second super capacitor 3122-2 has expired, the switch control circuit 3172 connects the third super capacitor 3122-3 to the node N1. After a buffer time period to permit full charging of the third super capacitor 3122-3 and determination of the fully charged state, the switch control circuit 3172 ignores all but the output from the second voltage detector 3160-3. This process then continues to repeat for each subsequent voltage detector and super capacitor pair.

Figure 28:
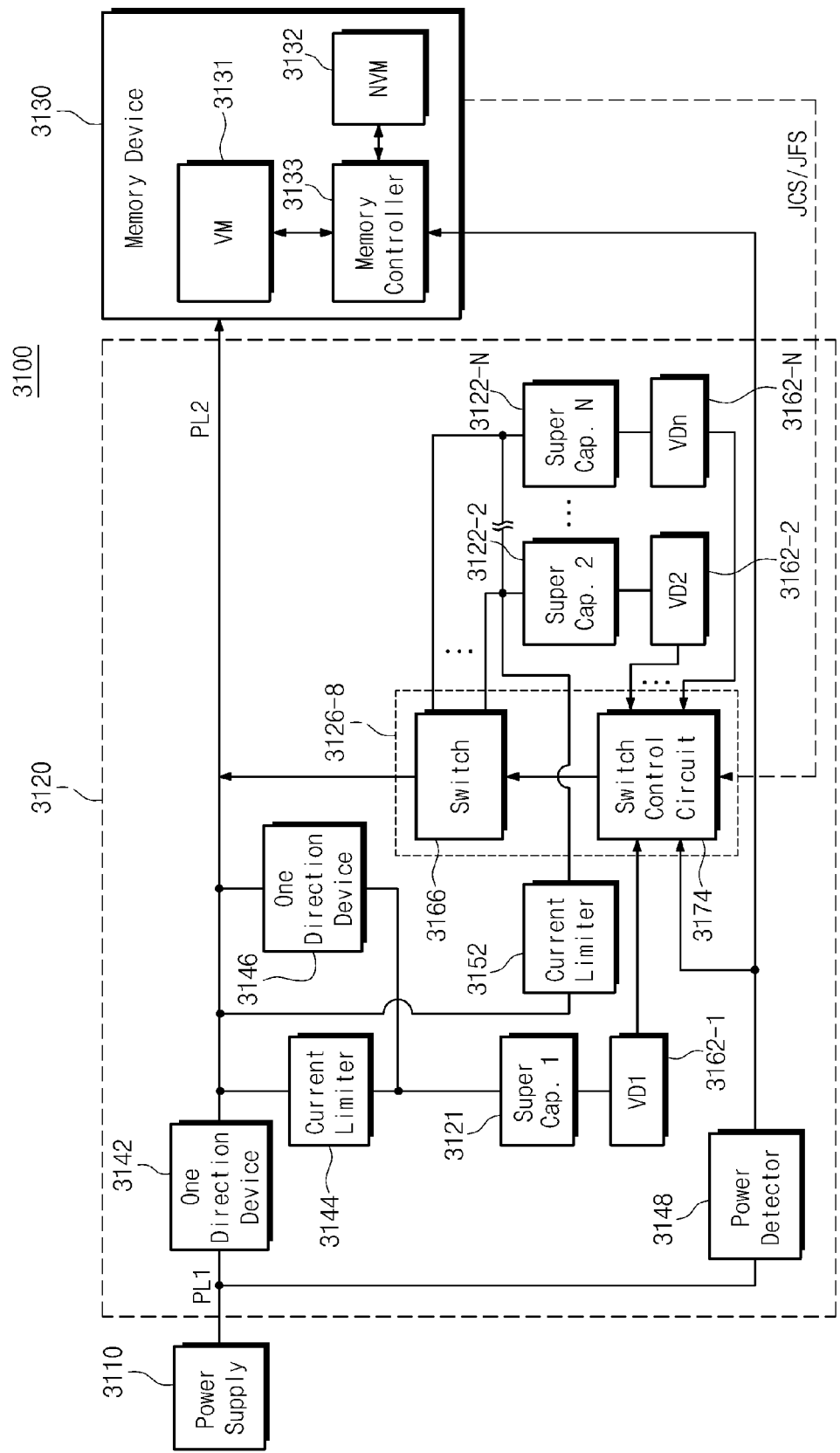

FIG. 28 is a block diagram illustrating a user device having a plurality of super capacitors according to another embodiment. The embodiment of FIG. 28 is the same as the embodiment of FIG. 27 except that the first-nth voltage detectors 3162-1 to 3162-n have replaced the voltage detectors 3160-1 to 3160-n, a switch control circuit 3174 replaces the switch control circuit 3172, a second current limiter 3152 connects the second power line PL2 to the second to nth super capacitors 3122-2 to 3122-n, and the switch 3166 connects the second to nth super capacitors 3122-2 to 3122-n to the second power supply line PL2 instead of the node N1. Accordingly, the control circuit 3128-8 replaces the control circuit 3126-7. Furthermore, it will be appreciated that the voltage detectors 3162-1 to 3162-n may be part of the control circuit 3126-8. Only the differences from the embodiment of FIG. 27 will be described for the sake of brevity. In this embodiment, the second to nth super capacitors 3122-2 to 3122-n are charged via the second current limiter 3152.

Here, the voltage detectors 3162-1 to 3162-n are respectively associated with first to nth super capacitors 3121, 3122-2 to 3122-n, and each detects if voltage or charge of the associated super capacitor falls below a level providing sufficient power for the SPO protection operation. The voltage detectors 3162-1 to 3162-n inform the switch control circuit 3174 of the detection result. Initially, the switch control circuit 3174 ignores the output of the second to nth voltage detectors 3162-2 to 3162-n, and none of the second to nth super capacitors 3122-3122-n are connected to the second power line PL2. If the first voltage detector 3162-1 indicates the first super capacitor 3121 has discharged to a level unacceptable for continuing the SPO protection operation, the switch control circuit 3174 connects the second super capacitor 3122-2 to the second power line PL2. The switch control circuit 3174 now ignores all but the output from the second voltage detector 3162-2. If the second voltage detector 3162-2 indicates the second super capacitor 3122-2 has discharged to a level unacceptable for continuing the SPO protection operation, the switch control circuit 3174 connects the third super capacitor 3122-3 to the second power line PL2. The switch control circuit 3174 now ignores all but the output from the second voltage detector 3162-3. This process then continues to repeat for each subsequent voltage detector and super capacitor pair.

As will be appreciated, the embodiment of FIG. 28 may be combined with the embodiment of FIG. 27.

As shown in FIG. 28, optionally, the switch control circuit 3170 may also receive either a job finished signal (JFS) or a job continuing signal (JCS) from the memory controller 3133.

In one embodiment, the memory controller 3133 outputs the JFS to indicate whether the SPO protection operation has completed. In this embodiment, the switch control circuit 3174 prohibits the switch 3166 from connecting any more of the second-nth super capacitors 3122-2 to 3122-n to the second power line PL2 if the JFS indicates the SPO protection operation is finished.

In another embodiment, the memory controller 3133 outputs the JCS to indicate whether the SPO protection operation is continuing. In this embodiment, the switch control circuit 3174 prohibits the switch 3166 from connecting any more of the second-nth super capacitors 3122-2 to 3122-n to the second power line PL2 if the JCS indicates the SPO protection operation is no longer continuing.

Figure 29:
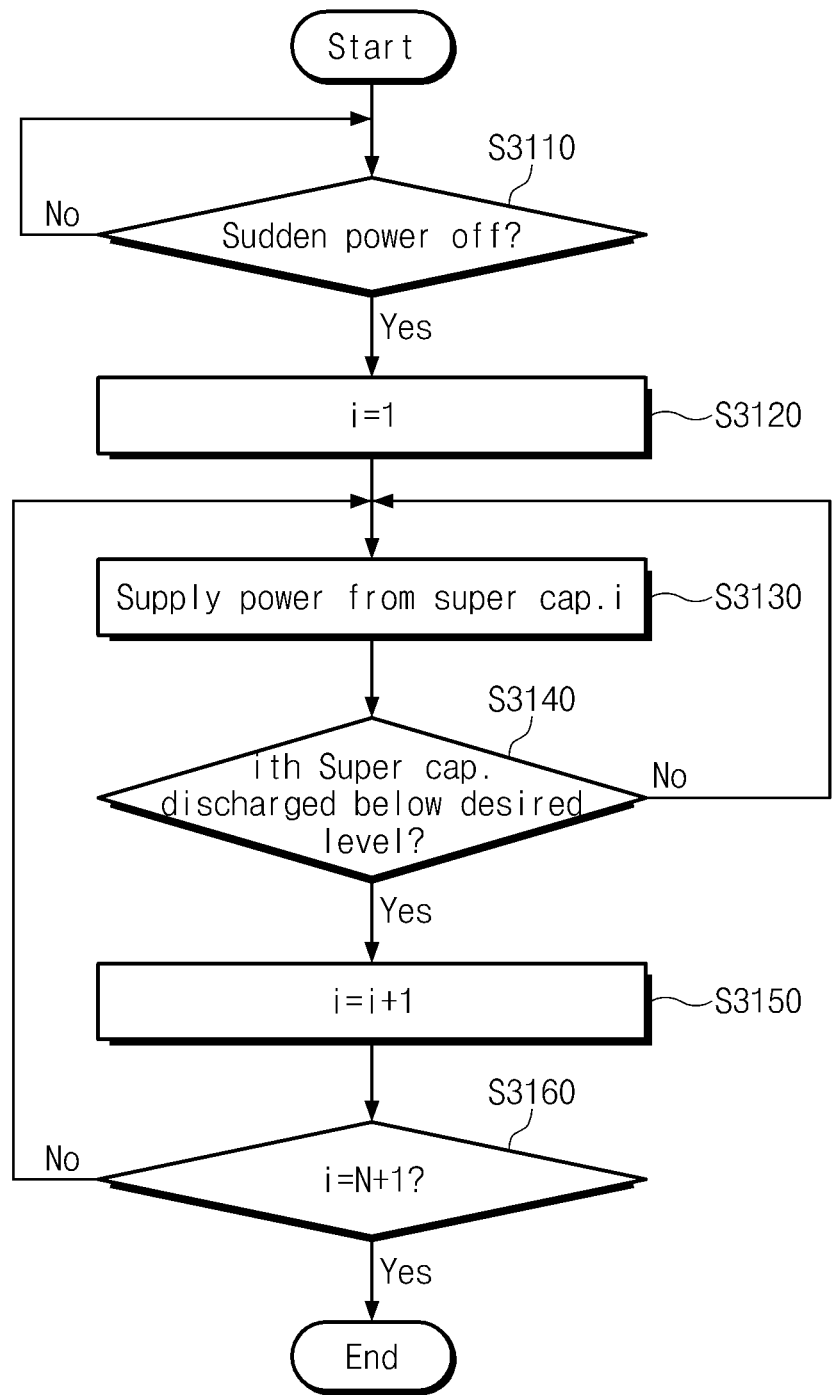
FIG. 29 is a flowchart illustrating an operation of a user device having a plurality of super capacitors according to an embodiment.

FIG. 29 illustrates a flow chart describing the operational concept behind the embodiments of FIGS. 20, 23, 26 and 28. As shown, in step S3110 the power detector 3148 determines whether sudden power off has occurred. If not, processing returns to step S3110. However, if sudden power off is detected, then in step S3120, auxiliary power source 3120 conceptually initializes a counter value i to one and in step S3130 supplies power from the ith super capacitor. Then, the auxiliary power source 3120 determines whether the output from the ith super capacitor falls below a desired level (e.g., a level acceptable to power the SPO protection operation) in step S3140. If not, processing returns to step S3130. However, if the output from the ith super capacitor does fall below the desired level, then the counter i is increased by one in step S3150. Next, the auxiliary power supply 3120 determines if the counter i equals n+1. If so, processing ends, and if not, processing returns to step S3130.

Accordingly, a user device may provide an auxiliary power in stages, by using a control circuit operating based on a timer and/or voltage detector. As such, a SPO protection operation such as a data backup upon SPO may be stably finished.

The embodiments of section 3 may be combined and/or, as is readily apparent, may be combined with embodiments of section 1 and/or 2.

4. A user device having a mode configuration function

Figure 30:
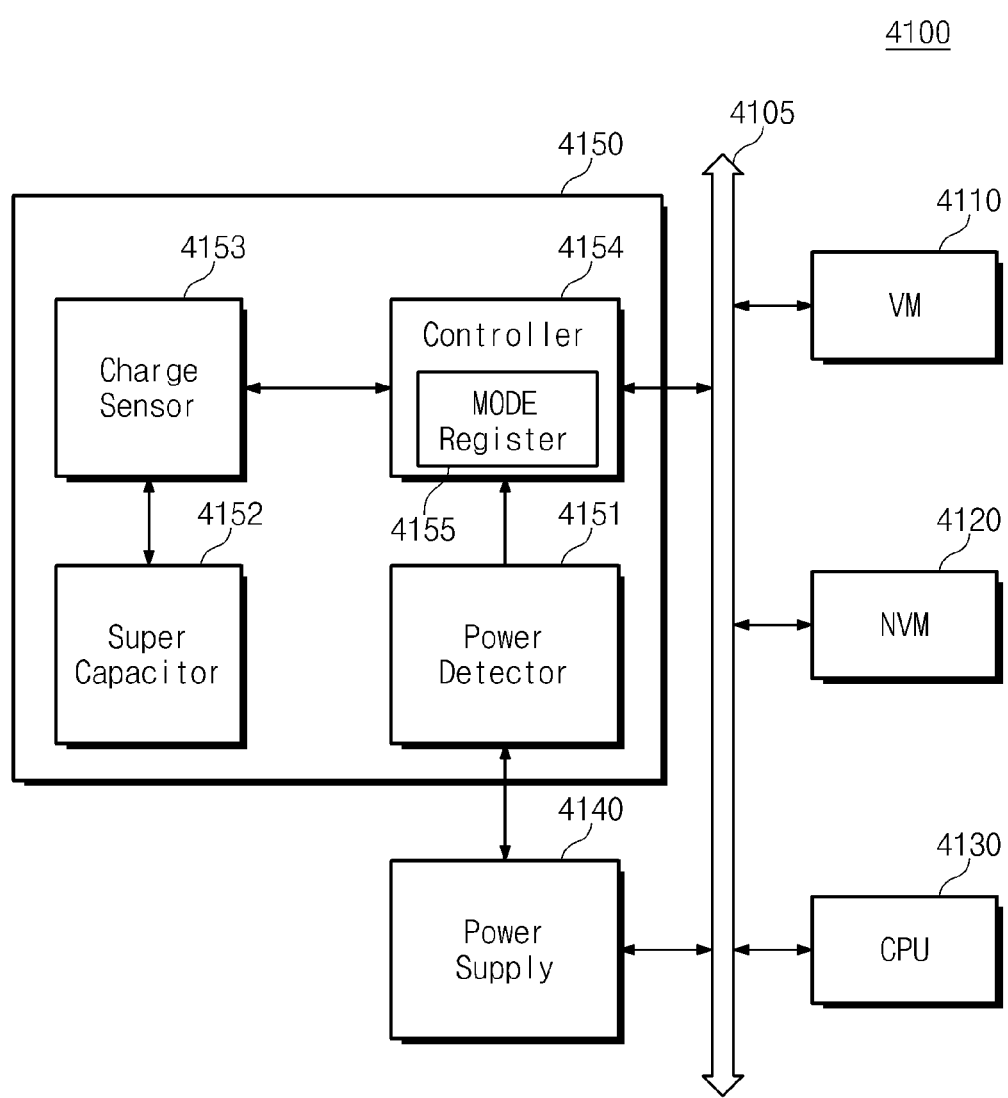
FIG. 30 is a block diagram illustrating a user device having a mode configuration function according to an embodiment.

FIG. 30 is a block diagram illustrating a user device having a mode configuration function according to an embodiment. Referring to FIG. 30, a user device 4100 includes a data bus and power line 4105, a volatile memory (VM) 4110, a non-volatile memory (NVM) 4120, a central processing unit (CPU) 4130, a main power supply 4140, and an auxiliary power supply 4150.

The user device 4100 receives a power from the auxiliary power supply 4150 if the main power supply 4140 is suddenly powered off. The user device 4100 may reduce a loss of data due to SPO by using the auxiliary power supply 4150.

Referring to FIG. 30, the auxiliary power supply 4150 includes a power detector 4151, a super capacitor 4152, a charge detector 4153, and a controller 4154. The auxiliary power supply 4150 includes a mode register 4155 to perform a mode configuration according to the amount of power supply. The mode register 4155 is included in the controller 4154 in FIG. 30, but may be located outside the controller 4154.

The power detector 4151 detects a power level of the main power supply 4140. The power detector 4151 detects the power level to find whether the main power supply 4140 is in a normal power status or in a SPO detect status. The power detector 4151 provides a detection result to the controller 4154. For example, if the detected power falls below a threshold, the power detector 4151 output a SPO detect status.

Figure 31:
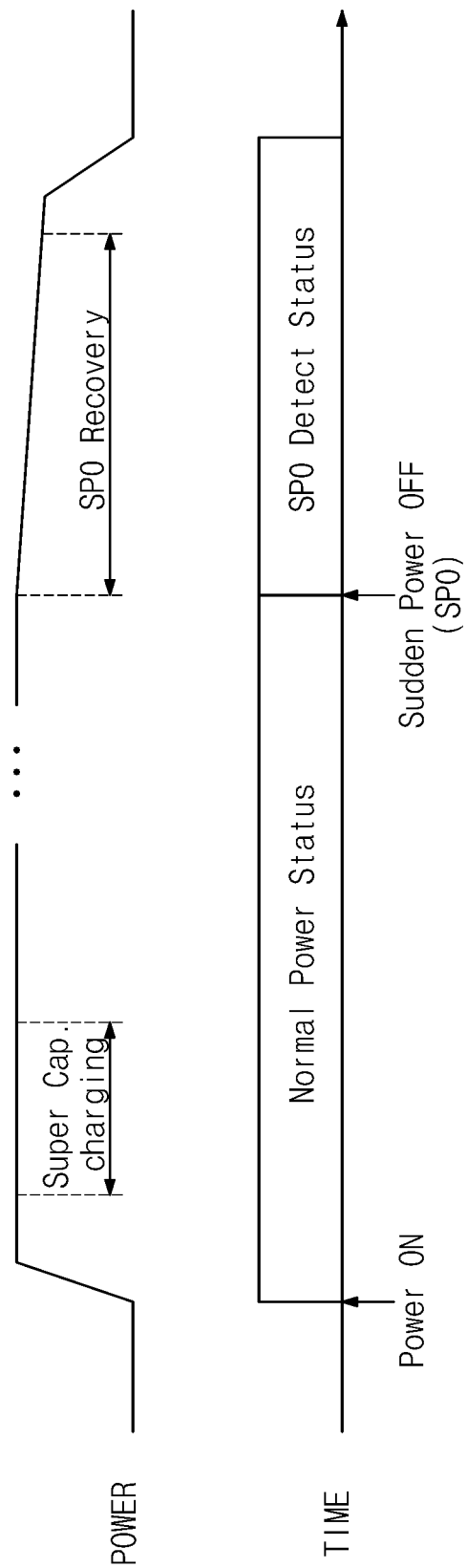
FIG. 31 is a timing diagram illustrating a detection result of a power detector in FIG. 30.

FIG. 31 is a timing diagram illustrating a detection result of the power detector 4151 in FIG. 30. Referring to FIG. 31, if a user device 4100 is powered on, the power detector 4151 informs the controller 4154 that the main power supply 4140 is in the normal power status. If the main power supply 4140 is suddenly powered off, the power detector 4151 informs the controller 4154 that the main power supply 4140 is in the SPO detect status.

In the normal status, the user device 4100 performs an operation of charging the super capacitor 4152, and, in the SPO detect status, performs a SPO protection operation or a SPO recovery operation. The operations of the user device 4100 performed in the normal power status or the SPO detect status will be described in detail with reference to FIGS. 33 and 34.

Referring again to FIG. 30, the auxiliary power supply 4150 includes the super capacitor 4152. The super capacitor 4152, which is a device capable of retaining high-capacity charges, is used to store an auxiliary power. It will be understood that multiple super capacitors may be included. The super capacitor 4152 provides an auxiliary power to the user device 4100 using retained charges for a certain time when the main power supply 4140 is cut off. The super capacitor 4152 may be charged upon power-up of the user device 4100 as well as normal operation of the main power supply 4140.

Figure 32:
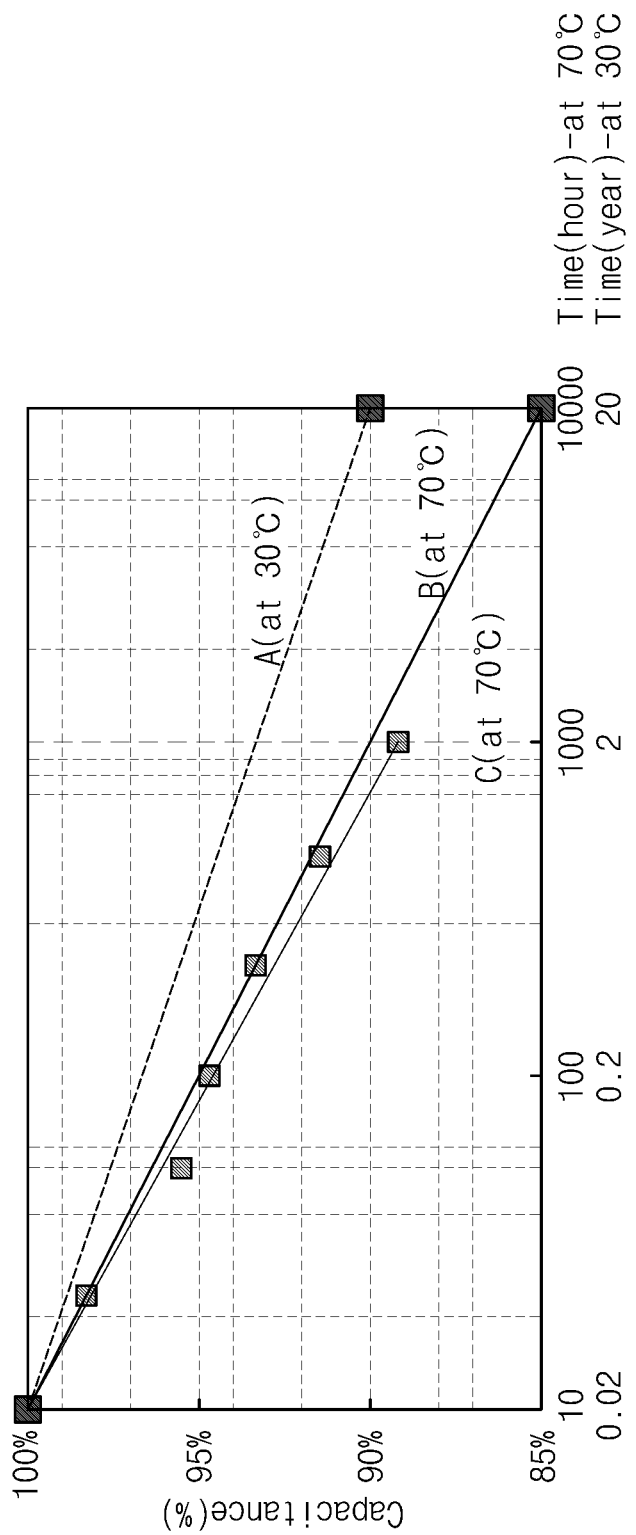
FIG. 32 is a graph illustrating a change of the capacitance of a super capacitor in FIG. 30.

The capacitance of the super capacitor 4152 is reduced as time goes by. FIG. 32 is a graph illustrating a change of the capacitance with the usage time of the super capacitor 4152. The horizontal axis represents the usage time of the super capacitor 4152, and the vertical axis represents the capacitance. On the other hand, the super capacitor 4152 has a rate of the capacitance change that varies with temperature.

Referring to FIG. 32, a line A and a line B show results of forecasting the changes of the capacitance of the super capacitor 4152 at temperatures of about 30° C. and about 70° C., respectively. According to the line A, the capacitance of the super capacitor 4152 is reduced by about 10% after a time of 20 years lapses. According to the line B, the capacitance of the super capacitor 4152 is reduced by about 15% after a time of 10,000 hours lapses.

On the other hand, a line C shows a result of measuring the change of the capacitance of the super capacitor 4152 for about 1,000 hours at a temperature of about 70° C. When comparing the line B and the line C, a measuring result and a forecasting result of the changes of the capacitance at a temperature of about 70° C. are similar to each other. According to the line C, the capacitance of the super capacitor 4152 is reduced by about 11% after a time of about 1,000 hours lapses.

As described in FIG. 32, the capacitance of the super capacitor 4152 is reduced according to the usage time and the temperature. The amount of the auxiliary power of auxiliary power supply 4150 may be reduced according to the change of the capacitance, and the power supply time may be reduced. According to an embodiment, by performing a mode configuration according to the amount of the power supply of the super capacitor 4152 and a data management according to the mode configuration, a loss of data upon SPO may be prevented, and the auxiliary power may be efficiently used.

Referring again to FIG. 30, the charge detector 4153 measures the amount of the auxiliary power of the super capacitor 4152. The charge detector 4153 may obtain the amount of charges stored in the super capacitor 4153, by measuring the capacitance and the voltage of the super capacitor 4152. The amount of the auxiliary power of the super capacitor 4152 may be obtained by other detecting means besides the charge detector 4153.

The controller 4154 is operated in response to the detection result of the power detector 4151. Here, the detection result of the power detector 4151 includes a normal power status and a SPO detect status. The controller 4154 performs a mode configuration according to the amount of the auxiliary power measured in the charge detector 4153.

Figure 34A:
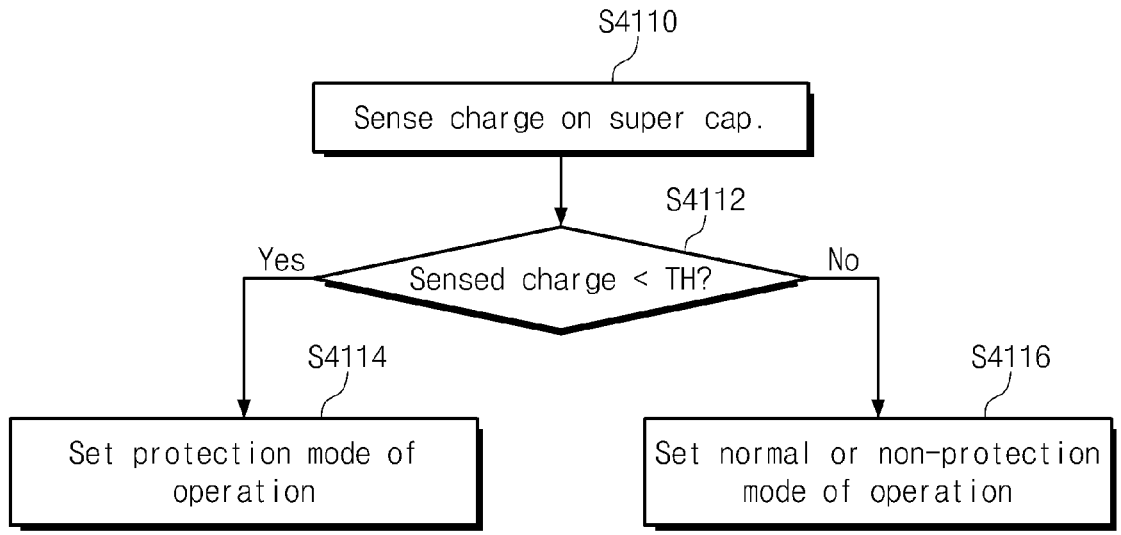
FIGS. 34A and 34B are flowcharts illustrating an operation of a user device in FIG. 30 according to the tables of FIGS. 33A and 33B, respectively.

A first operational embodiment of the embodiment of FIG. 30 will be described with respect to FIGS. 33A and 34A. As shown in FIG. 33A, this first operational embodiment includes a protection mode and a non-protection or normal mode. During operation, as shown in FIG. 34A the controller 4154 receives the sensed charge of the super capacitor 4152 from the charge sensor 4153 in step S4110. In step S4112, the controller 4154 determines a full charge capacity of the super capacitor 4152 in the same manner as described with respect to previous embodiments; namely, averaging the charge indicated by the charge sensor 4153 over a time window. The controller 4154 compares the current charge of the super capacitor 4152 to a threshold value, which is a percentage p of the determined full charge capacity F. For example, the percentage p may be 90%.

If the current charge is less than the threshold value, then in step S4114 the controller 4154 determines that the super capacitor 4152 is not sufficiently charged to permit a SPO protection operation. As a result, the controller 4154 sets the mode in the mode register 4155 to a protection mode. This may occur, for example, when the user device is first powered on and the super capacitor 4152 is just being charged.

If the mode register indicates the protection mode, the controller 4154 controls the operation of the non-volatile memory 4120 and the volatile memory 4110 such that any cache data or meta data stored in the volatile memory 4110 is also stored or mirrored in the non-volatile memory 4120. This is known as a write through operation, and ensures that should SPO occur, the non-volatile memory stores the cache data and meta data in the volatile memory 4110 such that an SPO protection operation is not necessary.

Returning to step S4112, if the currently measured charge is greater than or equal to the threshold value, then in step S4116 the controller 4154 determines that the super capacitor is sufficiently charged to permit a SPO protection operation. As such the controller 4154 sets the mode in the mode register 4155 to a non-protection or normal mode. In the normal mode, the write through operation is not conducted. Namely, cache data and/or meta data is buffered in the volatile memory 4110 such that this data may not exist in the non-volatile memory 4120. Accordingly, the volatile memory 4110 may be considered a buffer memory or a cache memory. If the power detector 4151 detects SPO, the controller 4154 conducts an SPO protection operation based on power supplied by the super capacitor 4152. In particular, the controller 4154 copies the cache data and then the meta data from the volatile memory 4110 to the non-volatile memory 4120.

Figure 34B:
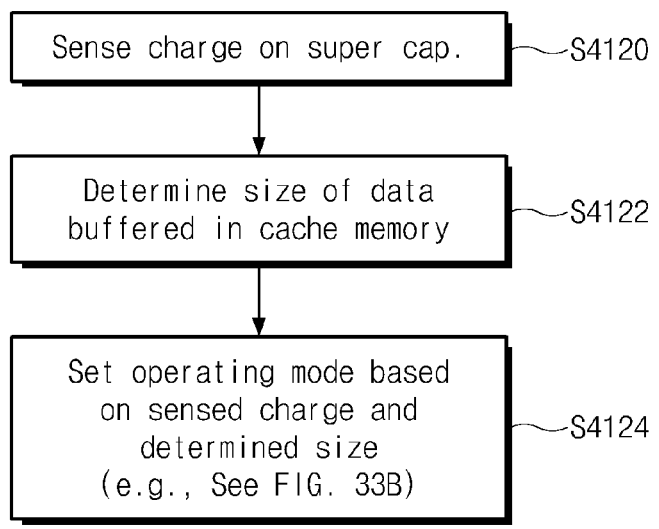

A second operational embodiment of the embodiment of FIG. 30 will be described with respect to FIGS. 33B and 34B. As shown in FIG. 33B, this operational embodiment includes the protection mode discussed above with respect to FIG. 33A as well as several additional modes, which will be described in detail below. During operation, as shown in FIG. 34B the controller 4154 receives the sensed charge of the super capacitor 4152 from the charge sensor 4153 in step S4120. Next, the controller 4154 determines the size of the cache data buffered in the volatile memory 4110, also referred to as a buffer or cache memory. The controller 4154, in step S4124, sets the operating mode based on the sensed charge of the super capacitor 4152 and the determined size of the buffered cache data. More specifically, in step S4124, the controller 4154 determines a full charge capacity of the super capacitor 4152 in the same manner as described with respect to previous embodiments; namely, averaging the charge indicated by the charge sensor 4153 over a time window. The controller 4154 compares the currently sensed charge of the super capacitor 4152 to a first threshold value TH1, which is a first percentage p1 of the determined full charge capacity F. For example, the first percentage p1 may be 90%.

If the sensed charge is less than the first threshold value, the controller 4154 determines that the super capacitor 4152 is not sufficiently charged to permit a SPO protection operation. As a result, the controller 4154 sets the mode in the mode register 4155 to a protection mode. This may occur, for example, when the user device is first powered on and the super capacitor 4152 is just being charged. As shown in FIG. 33B, the protection mode is set regardless of the amount of cache data stored in the volatile memory 4110.

If the mode register indicates the protection mode, the controller 4154 controls the operation of the non-volatile memory 4120 and the volatile memory 4110 such that any cache data or meta data stored in the volatile memory 4110 is also stored or mirrored in the non-volatile memory 4120. This is known as a write through operation, and ensures that should SPO occur, the non-volatile memory stores the cache data and meta data that is in the volatile memory 4110 such that an SPO protection operation is not necessary. As will be appreciated, having to conduct the write through operation reduces the operating efficiency of the non-volatile memory.

If the sensed charge is greater than or equal to the first threshold value TH1 but less than a second threshold value TH2, the controller 4154 determines that the super capacitor is sufficiently charged to permit a SPO protection operation. The second threshold value may also be a second percentage p2 of the determined full charge capacity F of the super capacitor 4152. The second percentage p2 is greater than the first percentage p1. For example, the second percentage may be 95% when the first percentage is 90%.

Accordingly, the controller 4154 sets the mode in the mode register 4155 to a one of a success mode and a fail mode based on a size of cache data stored in the volatile memory 4110. In this embodiment, the controller 4154 monitors the amount of cache data stored in the volatile memory 4110. It will be recalled that this is data that has not been copied to the non-volatile memory 4120.

In either of the success or fail modes, the write through operation is not continuously conducted. Namely, cache data and/or meta data is buffered in the volatile memory 4110 such that this data may not exist in the non-volatile memory 4120. Accordingly, if the power detector 4151 detects SPO, the controller 4154 conducts an SPO protection operation based on power supplied by the super capacitor 4152 and the mode indicated by the mode register 4155. In particular, in the success mode, the controller 4154 copies the cache data and then the meta data from the volatile memory 4110 to the non-volatile memory 4120. In the fail mode, only the cache data is copied from the volatile memory 4110 to the nonvolatile memory 4120; but during non-SPO protection operation, the meta data is periodically copied to from the volatile memory 4110 to the non-volatile memory 4120.

If the sensed charge is greater than or equal to the second threshold value, the controller 4154 determines that the super capacitor is sufficiently charged to permit a SPO protection operation. The controller 4154 sets the mode in the mode register 4155 to a one of a success mode and an extra support mode based on a size of cache data stored in the volatile memory 4110. In either of the success or extra support modes, the write through operation is not conducted. Namely, cache data and/or meta data is buffered in the volatile memory 4110 such that this data may not exist in the non-volatile memory 4120. Accordingly, if the power detector 4151 detects SPO, the controller 4154 conducts an SPO protection operation based on power supplied by the super capacitor 4152 and the mode indicated by the mode register 4155. In particular, in the success mode, the controller 4154 copies the cache data and then the meta data from the volatile memory 4110 to the non-volatile memory 4120. In the extra support mode, in addition to the operations performed during the success mode, extra operations such as meta operations (e.g., garbage collection) are performed.

Referring again to FIG. 30, the user device 4100 according to an embodiment performs a mode configuration according to the amount of the auxiliary power stored in the super capacitor 4152 and/or the size of cache data, and performs the data management according to the mode configuration. According to an embodiment, a loss of data can be prevented upon SPO, and the performance of the user device 4100 can be enhanced by efficiently using the auxiliary power.

A user device according to an embodiment may be used in connection with a user device having a plurality of super capacitors, a current control user device, and/or a user device having a plurality of one-direction devices as described previously in section 1, 2 and 3. For example, a mode register may be included inside or outside the memory controller (1133 in FIG. 1), a memory device (2120 in FIG. 12), or a SPO controller (3150 in FIG. 21). Alternatively, as a further example, the auxiliary power supply 4150 may include the one directional devices of FIG. 1, the current limiter of FIG. 10, and/or the plurality of super capacitors and control circuit of FIG. 26. It will be appreciated that these are just examples and any combination of embodiments from section 1-4 are possible. A user device according to an embodiment can stably perform a SPO protection operation using a mode register.

The embodiments of various user devices as described above may be applied to various products (for example, HDD, SSD, memory cards, computers, potable electronic devices).

5. SSD including an auxiliary power supply

Figure 35:
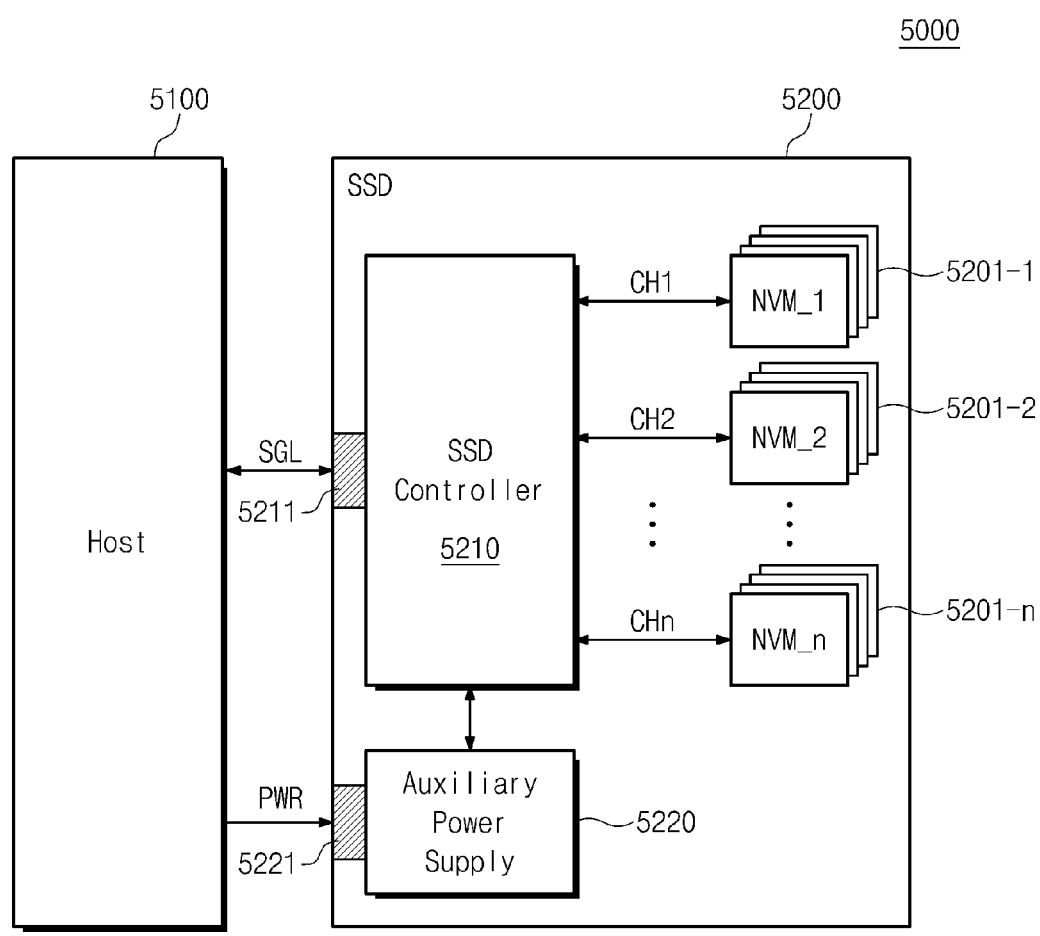
FIG. 35 is a block diagram illustrating an example of applying an auxiliary power supply to a Solid State Drive (SSD)

FIG. 35 is a block diagram illustrating an example of applying an auxiliary power supply to an SSD, according to an embodiment of the present invention.

Referring to FIG. 35, an SSD system 5000 includes a host 5100 and an SSD 5200. The SSD 5200 transfers/receives a signal to/from the host 5100 through a signal connector 5211, and receives a power source through a power connector 5221. The SSD 5200 includes a plurality of memory devices 5201-1 to 5201-n, an SSD controller 5210, and an auxiliary power supply 5220.

The plurality of memory devices 5201-1 to 5201-n are used as a storage medium of the SSD 5200. The memory devices 5201-1 to 5201-n may be implemented with a nonvolatile memory device (NVM) having large-capacity storage capability. The SSD 5200 mainly uses a flash memory, but a nonvolatile memory device such as PRAM, MRAM, ReRAM or FRAM may be used as the SSD 5200. In addition, the SSD 5200 may be implemented with a volatile memory device such a DRAM or SRAM.

The memory devices 5201-1 to 5201-n may be connected to the SSD controller 5210 through a plurality of channels CH1 to CHn. One or more memory devices may be connected to one channel. The memory devices which are connected to the one channel may be connected to the same data bus.

The SSD controller 5210 transfers/receives a signal SGL to/from the host 5100 through the signal connector 5211. Herein, the signal SGL may include a command, an address and data. The SSD controller 5210 writes data in a corresponding memory device or reads data from a corresponding memory device according to the command of the host 5100. The internal configuration of the SSD controller 5210 will be described in detail with reference to FIG. 36.

The auxiliary power supply 5220 is connected to the host 5100 through the power connector 5221. The auxiliary power supply 5220 may receive a power source PWR from the host 5100 and charge a super capacitor (not shown). The internal configuration and operation principle of the auxiliary power supply 5220 is as described above. The auxiliary power supply 5220 may be disposed inside the SSD 5200, and may be disposed outside the SSD 5200. For example, the auxiliary power supply 5220 is disposed in a main board, and can stably supply an auxiliary power source to the SSD 5200.

Figure 36:
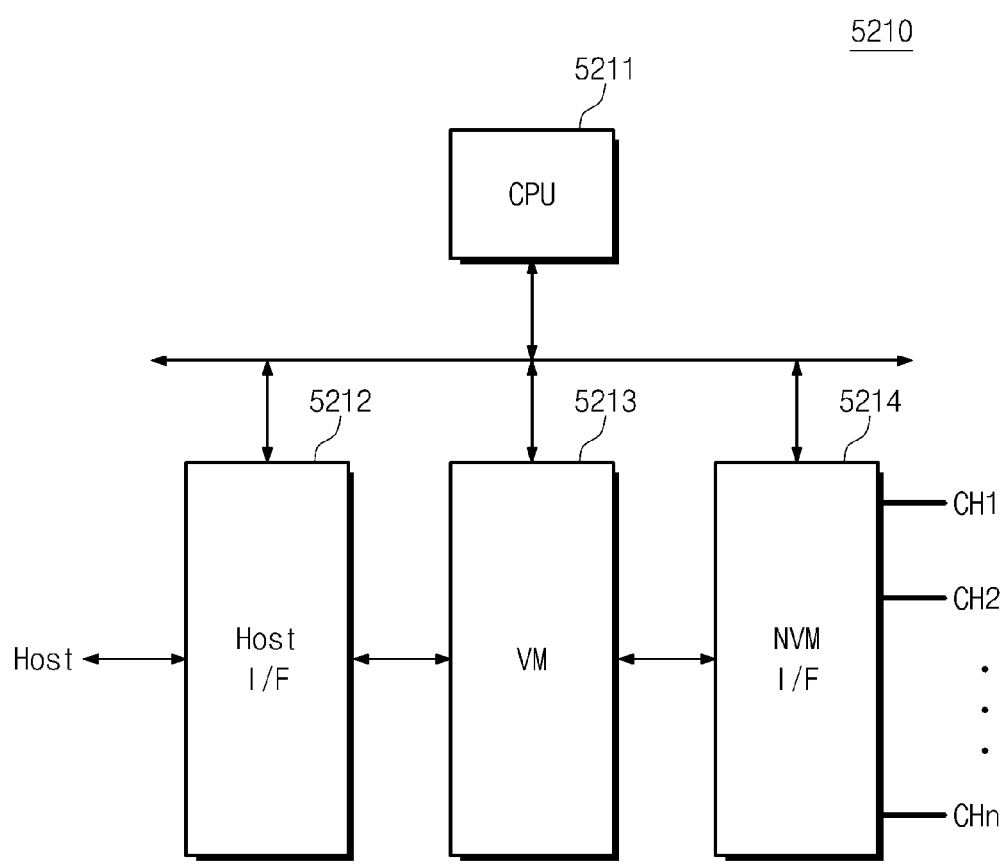
FIG. 36 is a block diagram illustrating a SSD controller in FIG. 35.

FIG. 36 is a block diagram illustrating the configuration of the SSD controller 5210 in FIG. 35.

Referring to FIG. 36, the SSD controller 5210 includes a CPU 5211, a host interface 5212, a volatile memory 5213, and an NVM interface 5214.

The CPU 5211 analyzes and processes a signal SGL that is inputted from the host 5100 (see FIG. 35). The CPU 5211 communicates with the host 5100 or the nonvolatile memories 5201-1 to 5201-n through the host interface 5212 or the NVM interface 5214. The CPU 5211 controls the operations of the nonvolatile memories 5201-1 to 5201-n according to a firmware for driving the SSD 5200.

The host interface 5212 provides interfacing with the SSD 5220 according to the protocol of the host 5100. The host interface 5212 may communicate with the host 5100 by using Universal Serial Bus (USB), Small Computer System Interface (SCSI), PCI express, ATA, Parallel ATA (PATA), Serial ATA (SATA), or Serial Attached SCSI (SAS). Moreover, the host interface 5212 may perform a disk emulation function that provides support in order for the host 5100 to recognize the SSD 5200 as a hard disk drive (HDD).

The volatile memory (VM) 5213 temporarily stores write data that is provided from the host 5100 or data that are read from the nonvolatile memory. The volatile memory 5213 may store a meta data or a cache data to be stored in the nonvolatile memories 5201-1 to 5201-n. Upon a SPO protection operation, the meta data or the cache data (which is stored in the volatile memory 5213) is stored in the nonvolatile memories 5201-1 to 5201-n. The volatile memory (VM) 5213 may include DRAM and SRAM.

The NVM interface 5214 scatters data, which are transferred from the volatile memory 5213, to each of the channels CH1 to CHn. Furthermore, the NVM interface 5214 transfers data, which are read from the nonvolatile memories 5201-1 to 5201-n, to the volatile memory 5213. Herein, the NVM interface 5214 may use the interface scheme of a NAND flash memory. That is, the SSD controller 5210 may operate according to the interface scheme of the NAND flash memory. The SSD in FIG. 35 can stably perform the SPO protection operation by using the auxiliary power supply 5220.

As will be appreciated, the auxiliary power supply 5220 may be any of the previously described embodiments or a combination of embodiments. For example, the auxiliary power supply may be embodied by the auxiliary power supply 1100 of FIG. 1, the auxiliary power supply 2210 of FIG. 13, the auxiliary supply 3120 of FIG. 19, and/or the auxiliary power supply 4150 of FIG. 30 (albeit with the controller and mode register implemented as the SSD controller 5120.)

6. A portable storage device including an auxiliary power supply

Figure 37:
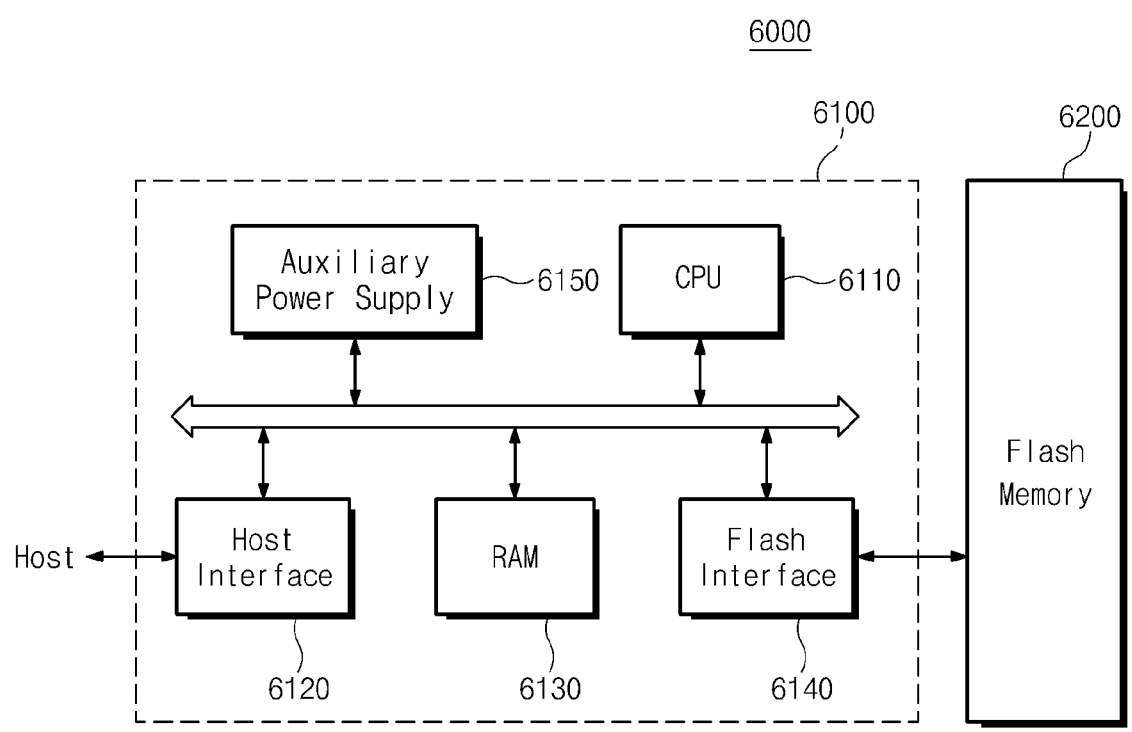
FIG. 37 is a block diagram illustrating an example of applying an auxiliary power supply to a semiconductor memory device.

FIG. 37 is a block diagram illustrating an example of applying an auxiliary power supply to a semiconductor memory device. A portable storage device 6000 includes a memory controller 6100 and a flash memory 6200. The portable storage device 6000 includes a semiconductor memory device including a volatile memory or a nonvolatile memory, like a memory card (for example, SD, MMC and xD) and a USB memory.

Referring to FIG. 37, the memory controller 6100 includes a CPU 6110, a host interface 6120, a RAM 6130, a flash interface 6140, and an auxiliary power supply 6150. The auxiliary power supply 6150 may be disposed inside/outside the memory controller 6100. The auxiliary power supply 6150 has the same configuration and operation principle as any of the above-described embodiments.

The portable storage device 6000 is connected to a host and thereby is used. The portable storage device 6000 transfers/receives data to/from the host through the host interface 6120, and transfers/receives data to/from the flash memory 6200 through the flash interface 6140. The portable storage device 6000 receives a power source from the host to perform an internal operation. The auxiliary power supply 6150 can stably supply an auxiliary power source to the portable storage device 6000.

As will be appreciated, the auxiliary power supply 6150 may be any of the previously described embodiments or a combination of embodiments. For example, the auxiliary power supply may be embodied by the auxiliary power supply 1100 of FIG. 1, the auxiliary power supply 2210 of FIG. 13, the auxiliary supply 3120 of FIG. 19, and/or the auxiliary power supply 4150 of FIG. 30.

7. An electronic device including an auxiliary power supply

Figure 38:
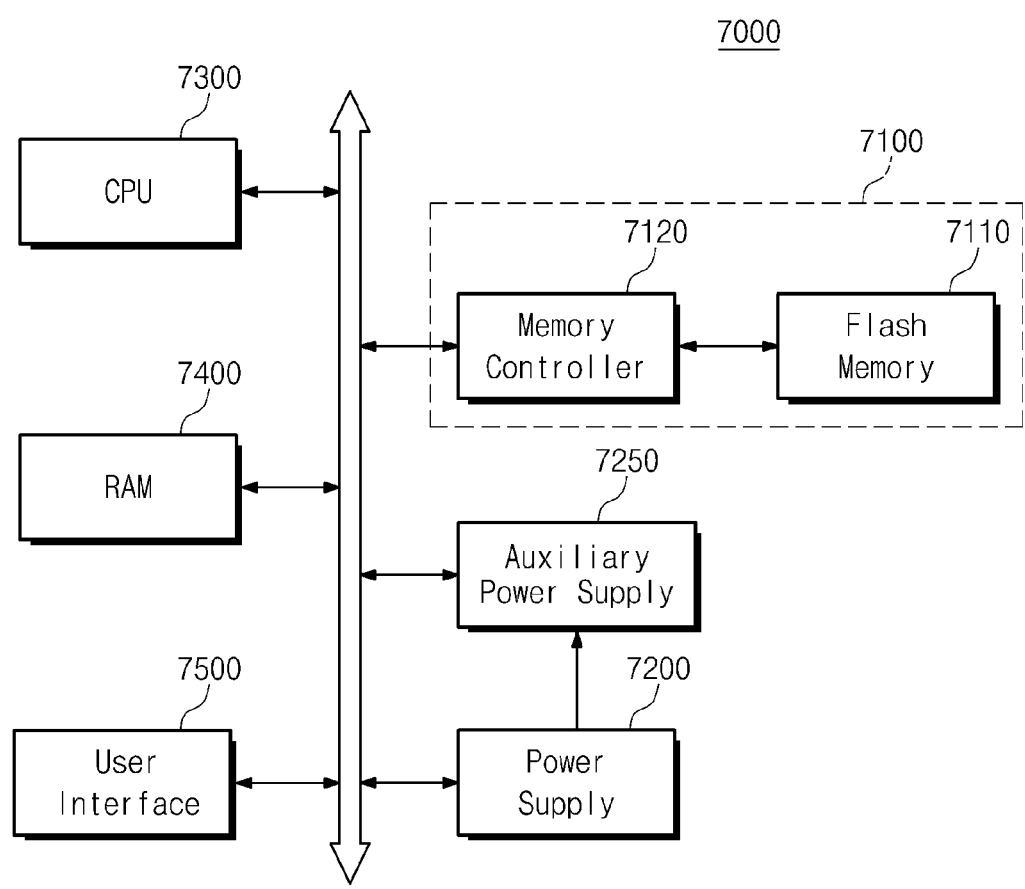
FIG. 38 is a block diagram illustrating an example of applying an auxiliary power supply to a user device.

FIG. 38 is a block diagram illustrating an example of applying an auxiliary power supply to a user device. An electronic device 7000 includes a personal computer (PC) and a portable electronic device (for example, a notebook computer, a mobile phone, a Personal Digital Assistant (PDA) and a camera).

Referring to FIG. 38, a user device 7000 includes a semiconductor memory device 7100, a power supply 7200, an auxiliary power supply 7250, a CPU 7300, a RAM 7400, and a user interface 7500. The semiconductor memory device 7100 includes a flash memory 7110 and a memory controller 7120. The auxiliary power supply 7250 can stably supply an auxiliary power source to the user device 7000, and may be any of the previously described embodiments or a combination of embodiments. For example, the auxiliary power supply may be embodied by the auxiliary power supply 1100 of FIG. 1, the auxiliary power supply 2210 of FIG. 13, the auxiliary supply 3120 of FIG. 19, and/or the auxiliary power supply 4150 of FIG. 30.

8. A power management system in a user device

Figure 39:
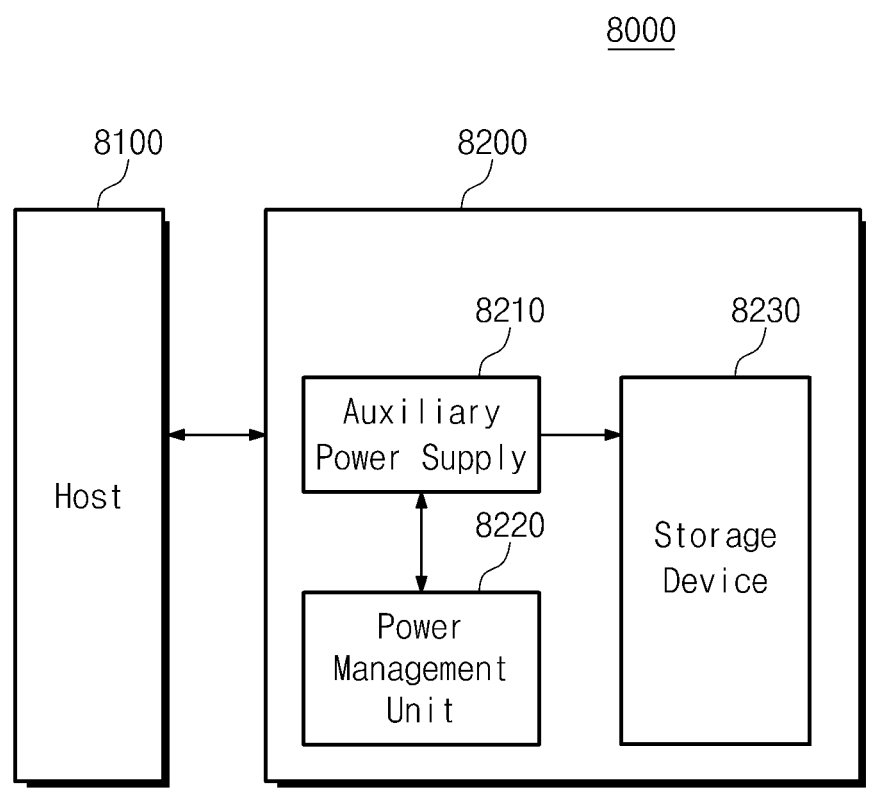
FIG. 39 is a block diagram illustrating a power management system including a power management unit and an auxiliary power supply.

FIG. 39 is a block diagram illustrating a power management system including a power management unit and an auxiliary power supply.

Referring to FIG. 39, a power management system 8000 includes a host 8100 and a user device 8200. The user device 8200 includes an auxiliary power device 8210, a power management unit 8220, and a storage device 8230.

The power management unit 8220 is a device for managing the power consumption of the user device 8200. The power management unit 8220 may control the charge amount of a super capacitor according to the operation modes (for example, an active mode, an idle mode, a standby mode and a sleep mode) of the host 8100 or user device associated with the memory system. The power management unit 8220 controls the charge amount of the super capacitor according to the operation modes, and thus can reduce the voltage stress of the super capacitor and increase the life of the super capacitor.

The power management unit 8220 may receive a command (for example, a power management command) from the host 8100 to control the charge amount of the super capacitor. Moreover, the power management unit 8220 may autonomously generates a power management command or receives a command from an internal controller without the command of the host 8100, thereby controlling the charge amount of the super capacitor. The operation method of the power management unit 8220 will be described in detail with reference to FIG. 40B.

Figure 40A:
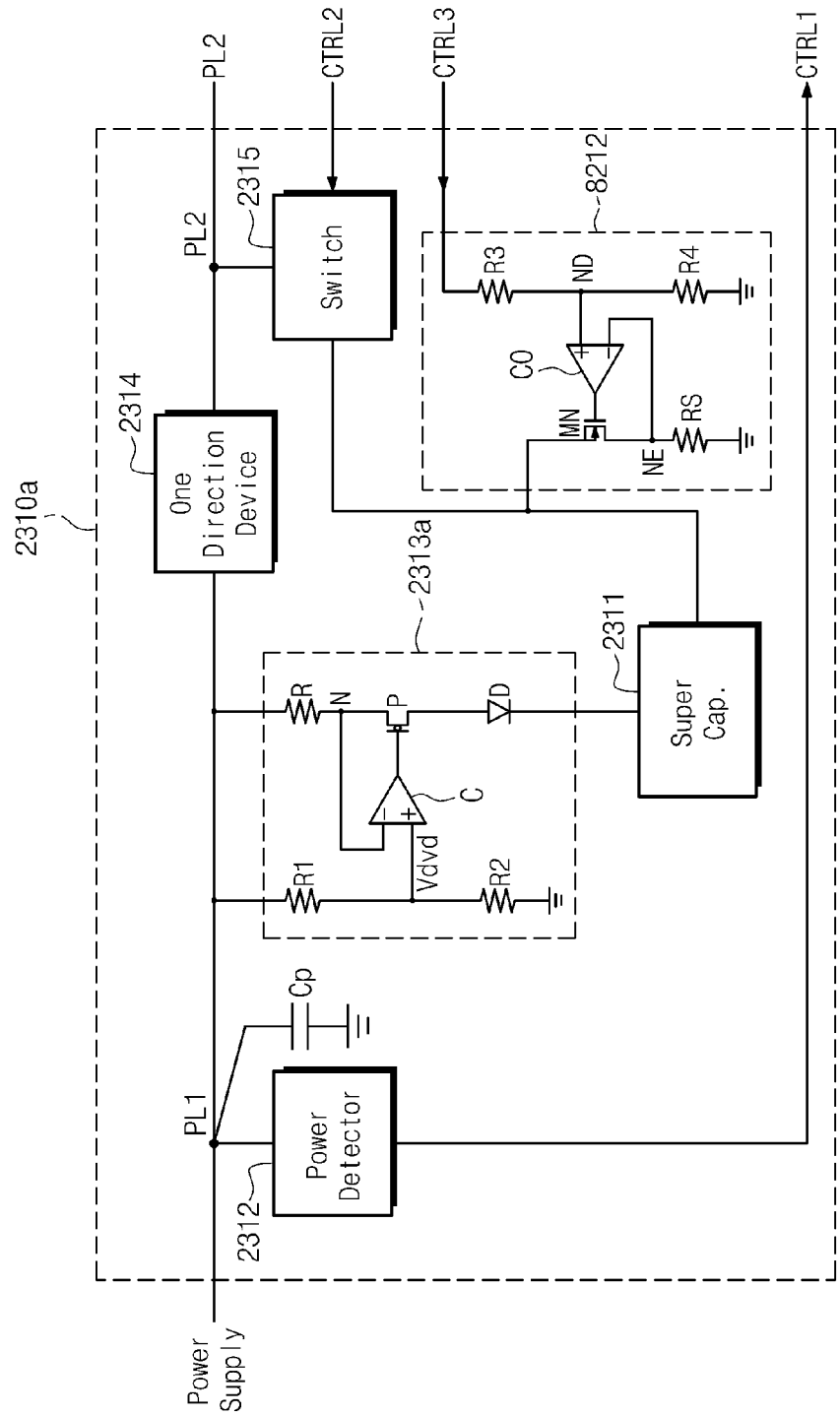
FIG. 40A illustrates an example of an auxiliary power supply in FIG. 39.

FIG. 40A illustrates an example embodiment of the auxiliary power supply 8210. This embodiment is the same as the embodiment of FIG. 18 except that the embodiment of FIG. 40A also includes a discharge circuit 8212. For the sake of brevity only the differences between the embodiments will be discussed.

The discharge circuit 8212 includes an NMOS transistor MN1 connected between the super capacitor 2311 and a resistor RS. The resistor RS is connected between the NMOS transistor MN1 and ground. The gate if the NMOS transistor MN1 receives the output from a comparator CO. The comparator CO compares a voltage at a node ND to a voltage at a node NE. The node ND is between the NMOS transistor MN1 and the resistor RS. The resistors R3 and R4 are connected between a third control signal TRL3 and ground.

The discharge 8212 selectively discharges the super capacitor 2311 to a level established by the voltage of the third signal CTRL3. As discussed in more detail below, the third control signal CTRL3 may be supplied by the power management unit 8220.

It will be appreciated that the embodiment of FIG. 40A is not limited to the current limiter 2313*a*. Instead, the current limiter may be the current limiter in the embodiments of FIG. 14 or FIG. 16. In these embodiments, the power management unit 8220 controls the variable resistor Rc of FIG. 14 or supplies the reference voltage Vref of FIG. 16 to control the current limiter.

Figure 40B:
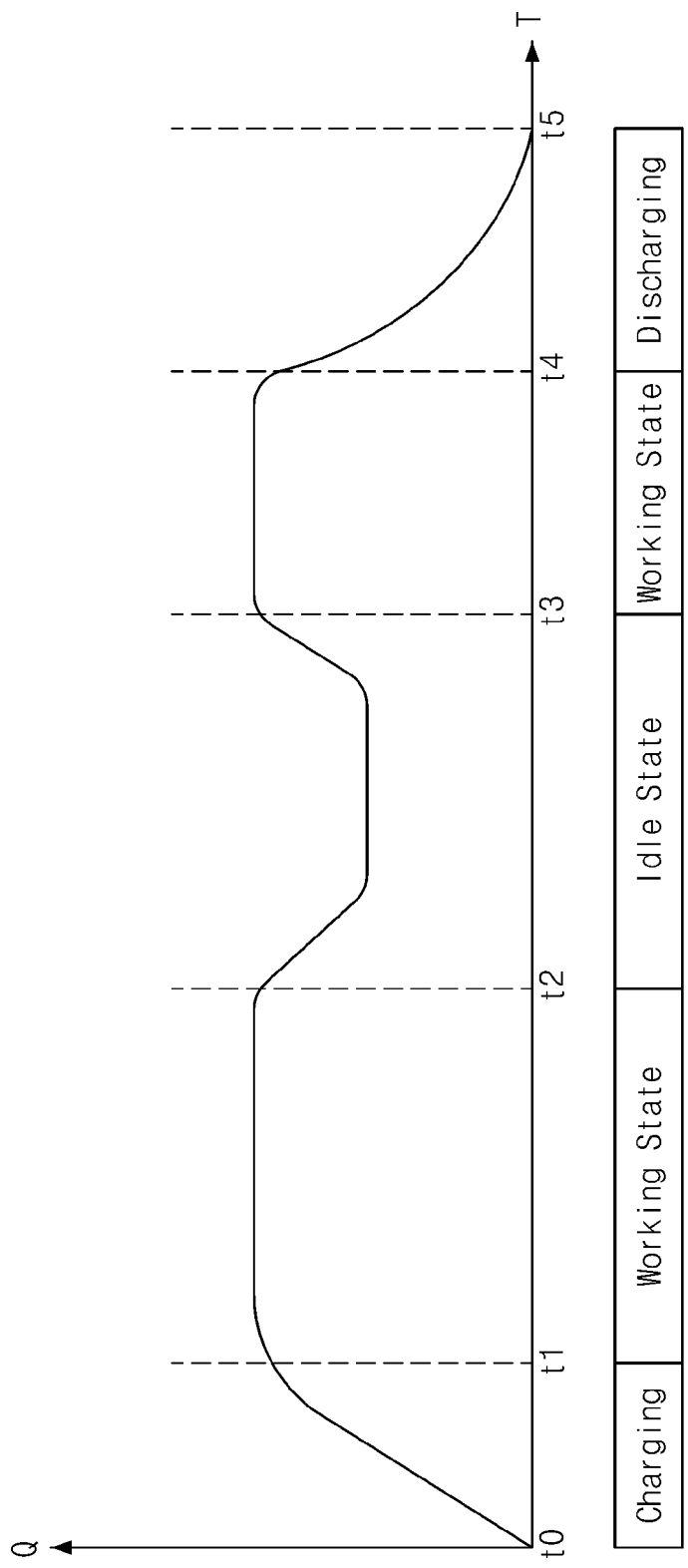
FIG. 40B is a graph illustrating an operation method of a power management unit in FIG. 39.

Also, the auxiliary power supply of FIG. 40B may be combined with or include elements from any of the previously discussed embodiments. For example, the auxiliary power supply may include multiple super capacitors and associated circuitry such as described in section 3.

The storage device 8230 may include a controller (not shown) and a storage unit (not shown). The storage unit may include an SSD, a HDD and/or a flash memory. The storage device 8230 uses the auxiliary power source of the auxiliary power supply 8210 upon SPO, to stably perform the SPO protection operation.

FIG. 40B is a graph illustrating the operation method of the power management unit in FIG. 39. In FIG. 40, an abscissa axis represents a time T, and an ordinate axis represents the charge amount of the super capacitor.

In an interval t0-t1, when the power management system 8000 is powered on, the auxiliary power device 8210 charges the super capacitor. An interval t1-t2 represents a working state or an active working state in which the user device 8200 normally operates. In the working state, the super capacitor is charged enough to perform the SPO protection operation. Here, the power management unit 8220 controls the charging by controlling the current limiter 2313a.

An interval t2-t3 represents an idle state in which the user device 8200 does not normally operate. By discharging a portion of the electric charge of the super capacitor in the idle state, the power management unit 8220 controls a charge amount. The power management unit 8220 controls the charge amount of the super capacitor even in a standby state or a sleep state other than the idle state. The power management unit 820 may alter a charge amount according to each of the states by controlling the voltage of the third control signal CTRL3.

An interval t3-t4 represents that the user device 8200 again is in the working state. The power management unit 8220 again charges the super capacitor, and thus prepares the SPO protection operation. In an interval t4-t5, when the power management system 8000 is powered off, the auxiliary power supply 8210 discharges the super capacitor.

9. A type and disposition structure of a super capacitor

FIGS. 41 through 50 are diagrams illustrating the shape and arrangement structure of an auxiliary power supply. The super capacitor may be implemented in various types, for example, a planar type, a can type, a coil type and a slot type.

Figure 41:
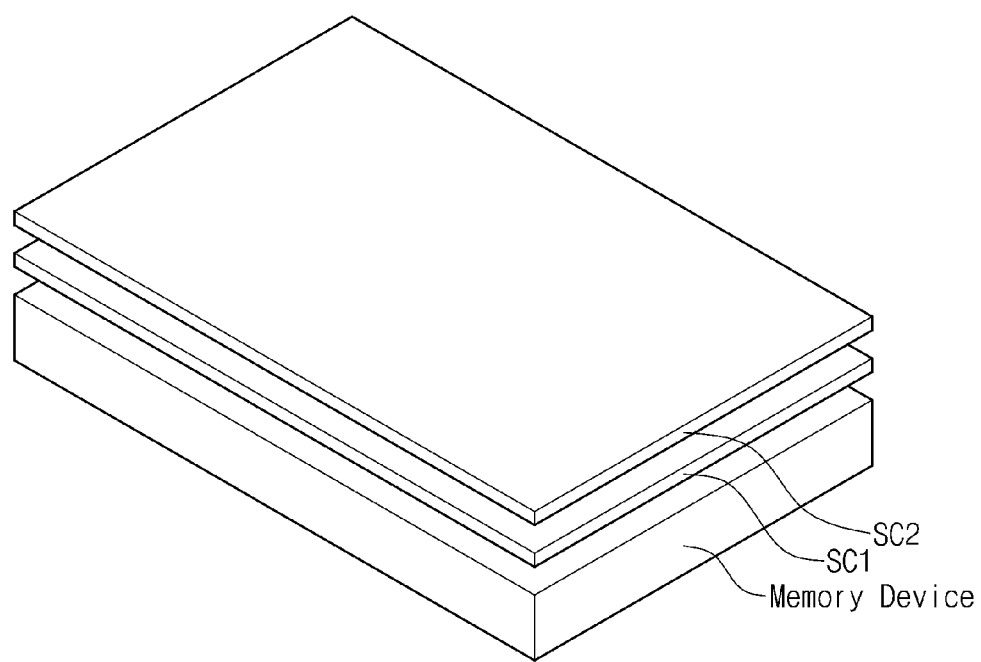
FIGS. 41 through 50 are diagrams illustrating the shape and arrangement structure of an auxiliary power supply.
Figure 42:
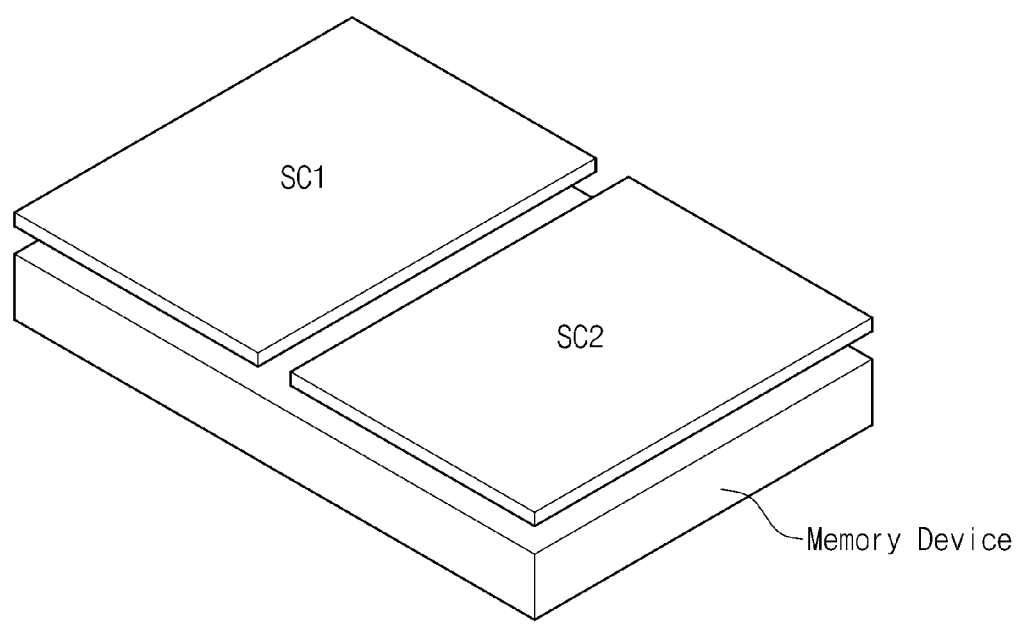
Figure 43:
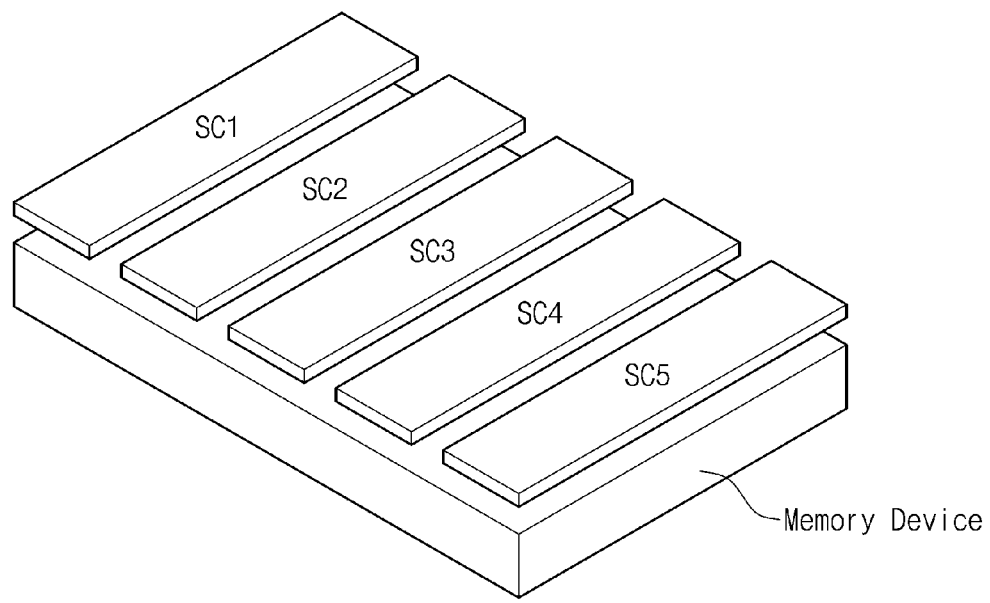
Figure 44:
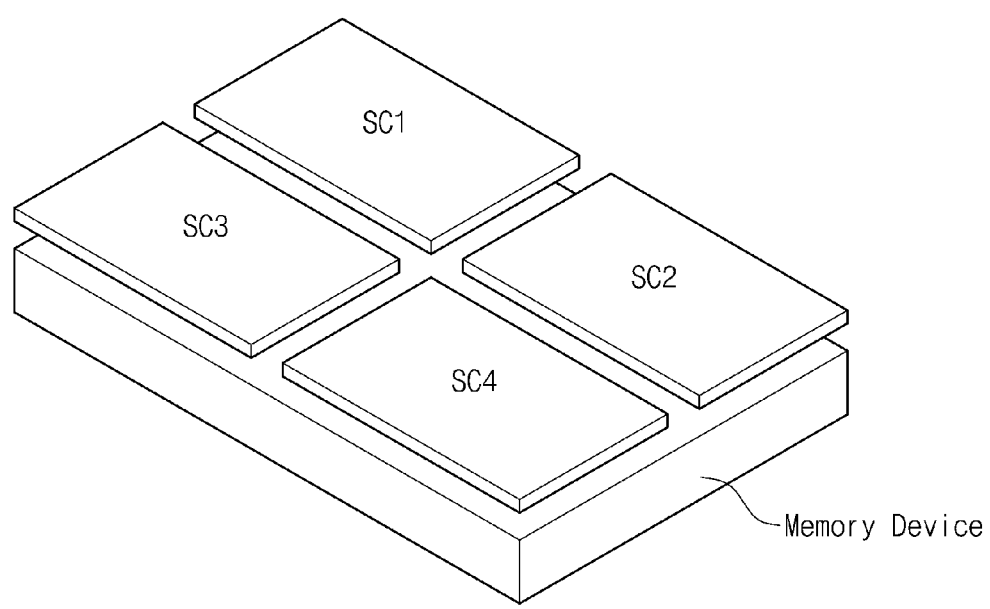
Figure 45:
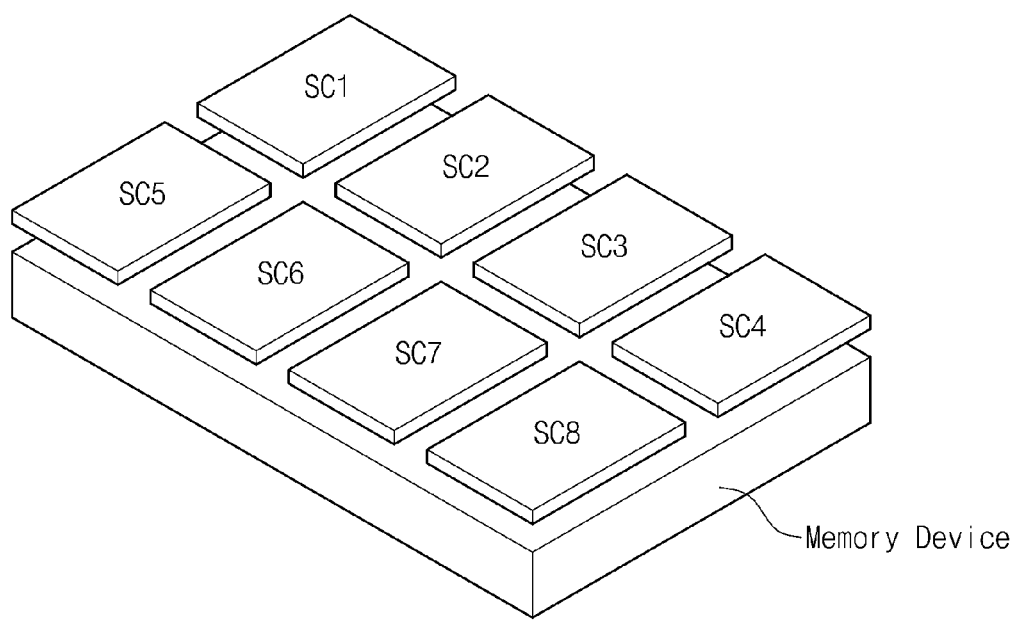
Figure 46:
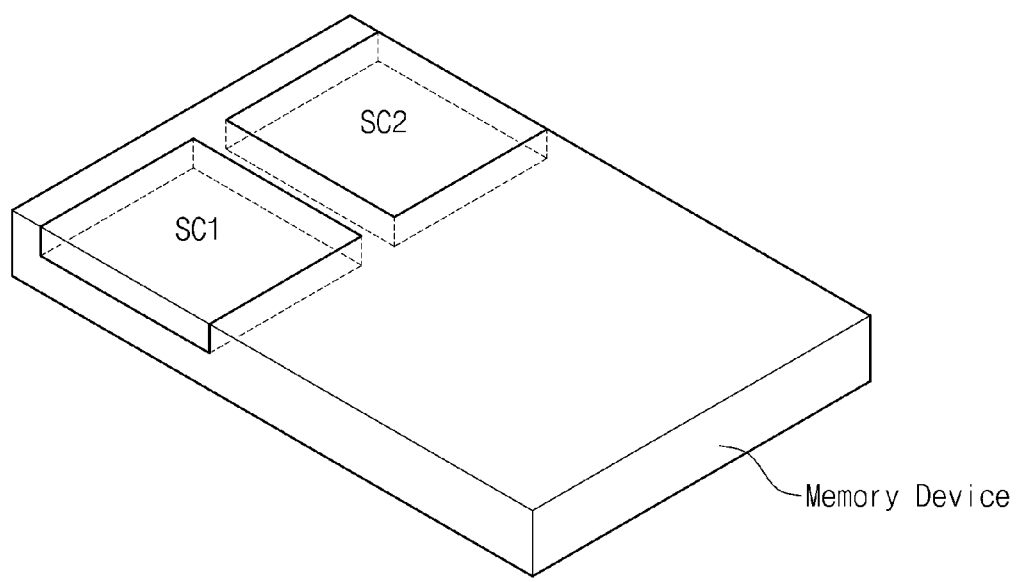

A planar type super capacitor is illustrated in FIGS. 41 through 50. Referring to FIG. 41, a first super capacitor SC1 is stacked in parallel on a memory device. A second super capacitor SC2 is stacked in parallel on the first super capacitor SC1. FIGS. 42 through 45 illustrate where a plurality of super capacitors are disposed in parallel at the same plane on the memory device. The planar type super capacitor may be disposed at the upper side, lower side, left side or right side of the memory device. Moreover, as illustrated in FIG. 46, the planar type super capacitor may be disposed in grooves or recessed into the memory device.

Figure 47:
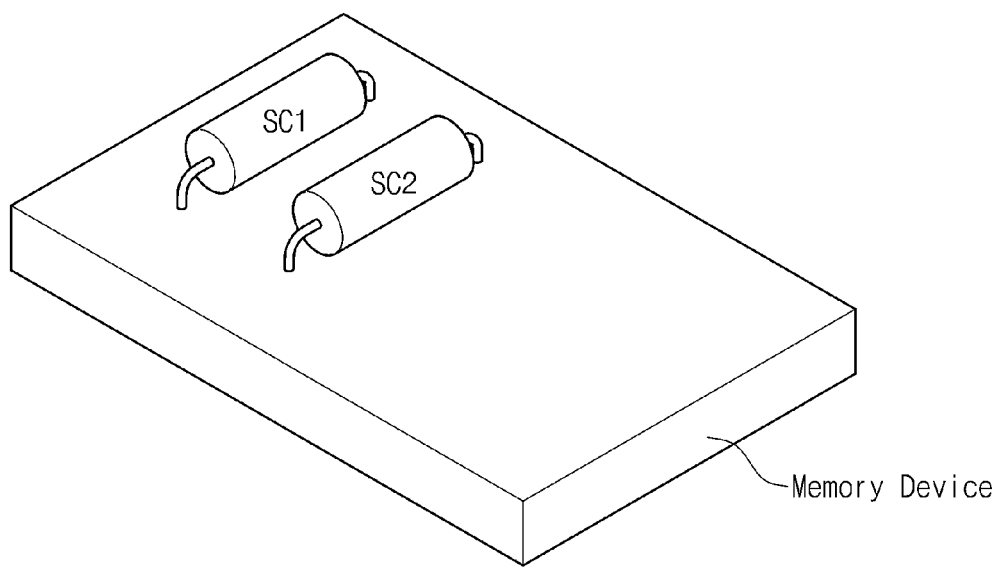
Figure 48:
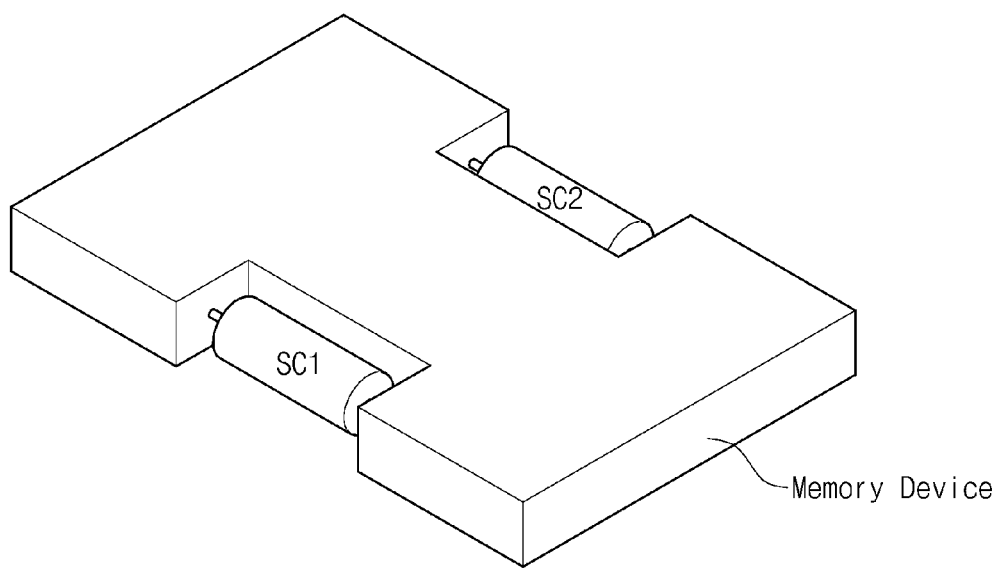

A can type super capacitor is illustrated in FIGS. 47 and 48. Referring to FIG. 47, first and second super capacitors SC1 and SC2 are disposed in parallel on the memory device. Referring to FIG. 48, first and second super capacitors SC1 and SC2 are disposed in grooves or recesses of both side surfaces of the memory device. The can type super capacitor may be disposed in various other forms as well.

Figure 49:
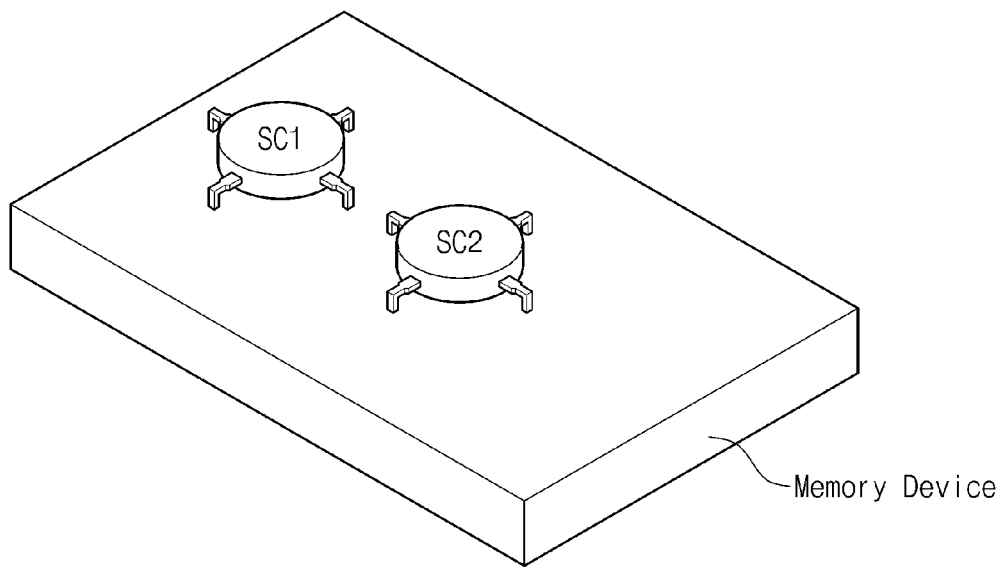

A coil type super capacitor is illustrated in FIG. 49. Referring to FIG. 49, first and second super capacitors SC1 and SC2 are disposed in parallel on the memory device.

Figure 50:
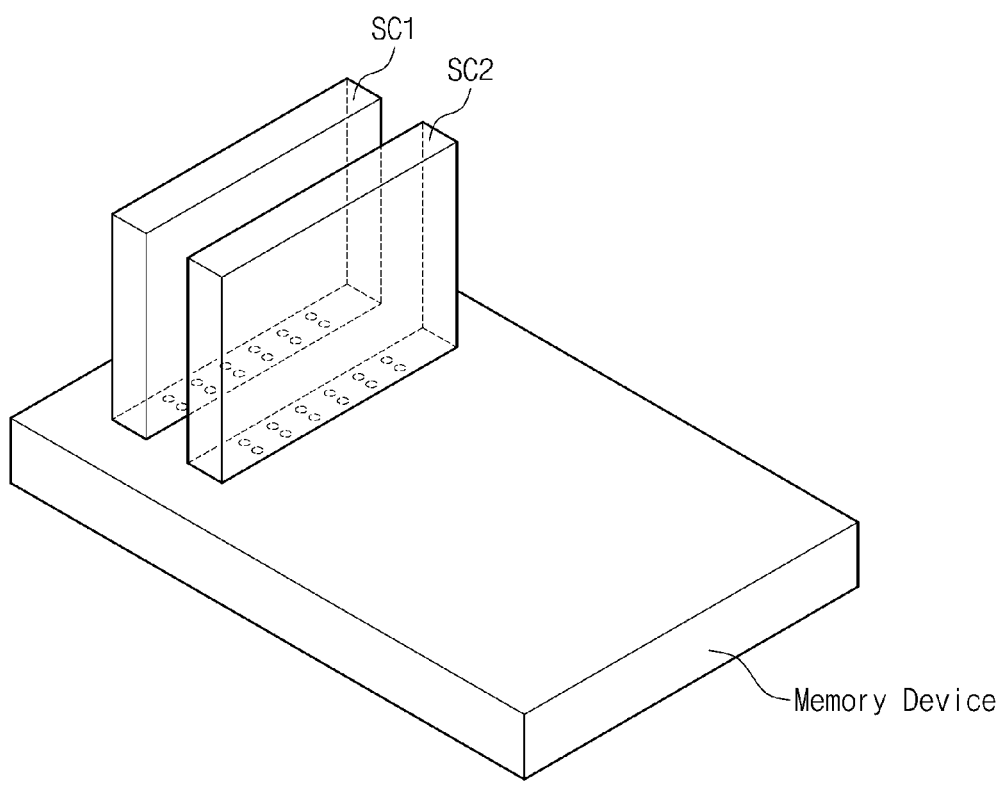

A slot type super capacitor is illustrated in FIG. 50. Slot type super capacitors SC1 and SC2 may be detachable.

A user device according to an embodiment can reduce unstable situations such as a power ripple and a switching delay, and stably perform a backup data operation, by cutting off a power of a main power supply and automatically providing an auxiliary power upon a SPO.

A user device according to an embodiment can reduce an overcurrent and enhance booting efficiency during initial operation. The user device can reduce a charging time of a super capacitor by lowering a resistance after a desired (or, alternatively a predetermined) time lapses. Also, the user device can effectively deal with a SPO protection operation by additionally including a discharge circuit.

A user device according to an embodiment can provide for defects of a super capacitor, and stably perform a SPO protection operation by providing an auxiliary power in stages upon SPO.

A user device according to an embodiment can prevent a data loss upon SPO, and efficiently make use of an auxiliary power by performing a mode configuration according to the amount of power supply of a super capacitor and performing a data management according to the mode configuration.

The above-disclosed subject matter is to be considered illustrative, and not restrictive, and the appended claims are intended to cover all such modifications, enhancements, and other embodiments, which fall within the true spirit and scope of the present invention. Furthermore, it will be appreciated that the embodiments of the present invention may be combined. For example, the embodiments within a section such as section 1 may be combined and/or any of the embodiments of section 1-4 may be combined. Thus, to the maximum extent allowed by law, the scope of the present invention is to be determined by the broadest permissible interpretation of the following claims and their equivalents, and shall not be restricted or limited by the foregoing detailed description.

What is claimed is:

1. A solid state drive, comprising:
   at least one memory;
   a controller configured to control the at least one memory; and
   an auxiliary power system configured to provide auxiliary power to the at least one memory,
      the auxiliary power system including,
         a first one directional device disposed in a sole power path connecting a main power supply to the controller, the first one directional device configured to permit current to flow only in a first direction, the first direction being from the main power supply to the controller,
         an auxiliary power source configured to be charged by supplying a power of the main power supply through a charging current path from the main power supply to the auxiliary power source, and
         a second one directional device configured to permit current to flow in a second direction along a discharging current path, the second direction being from the auxiliary power source to the controller, and wherein
      the charging current path is different from the discharging current path, and
      the first one directional device is disposed on the sole power path before the charging current path splits off of the sole power path.

2. The solid state drive of claim 1, wherein the auxiliary power system further includes a current limiter for controlling current flowing from the main power supply to the auxiliary power source through the charging current path.

3. The solid state drive of claim 2, wherein the current limiter is configured to supply a portion of main power output from the first one directional device to charge the auxiliary power source.

4. The solid state drive of claim 1, further comprising:
a power supply line; and wherein
the first one directional device is connected between the power supply line and the main power supply;
the second one directional device is connected between the power supply line and the auxiliary power source.

5. The solid state drive of claim 4, further comprising:
a first detector configured to detect a sudden power off of the main power supply; and
a second detector configured to detect a power level of the auxiliary power source, wherein the controller is configured to perform at least one memory protection operation using power from the auxiliary power source if the first detector detects the sudden power off, and configured to perform the memory protection operation until the second detector indicates the power level of the auxiliary power source drops below a threshold.

6. A solid state drive, comprising:
a memory system, the memory system including at least one memory;
a first controller configured to control the memory system;
an auxiliary power system configured to provide auxiliary power to at least the memory system, the auxiliary power system including,
  a first detector configured to detect a sudden main power off of a main power supply;
  an auxiliary power source configured to be charged by supplying a power of the main power supply through a current path from the main power supply to the auxiliary power source;
  a second detector configured to detect a power level of the auxiliary power source;
  a second controller configured to perform at least one memory protection operation using power from the auxiliary power source if the first detector detects the sudden main power off, and configured to perform the memory protection operation until the second detector indicates the power level of the auxiliary power source drops below a threshold; and
wherein the auxiliary power source is configured to provide auxiliary power before and after the second detector indicates the power level of the auxiliary power source drops below the threshold.

7. The solid state drive of claim 6, wherein the memory protection operation includes copying data from a volatile memory to a non-volatile memory.

8. An auxiliary power system associated with a memory system, comprising:
a first one directional device disposed in a sole power path connecting a main power supply to the memory system, the first one directional device configured to only permit current to flow there through in a first direction, the first direction being from a main power supply to the memory system;
an auxiliary power source configured to be charged by supplying a power of the main power supply through a charging current path from the main power supply to the auxiliary power source; and
a second one directional device configured to only permit current to flow in a second direction through a discharging current path, the second direction being from the auxiliary power source to the memory system, and wherein
the charging current path is different from the discharging current path and
the first one directional device is disposed on the sole power path before the charging current path splits off of the sole power path.

9. The system of claim 8, wherein the first one directional device and the second one directional device include first and second switches, respectively for permitting current to flow in the first and second directions, respectively.

10. The system of claim 9, wherein each of the first and second switches includes at least one diode.

11. The system of claim 10, further comprising:
a current limiter configured to supply a portion of main power output from the first one directional device to charge the auxiliary power source.

12. The system of claim 8, further comprising:
a controller configured to supply main power output from the first one directional device and configured to supply auxiliary power output from the second directional device.

13. The system of claim 8, further comprising:
a power supply line; and wherein
the first one directional device is connected between the power supply line and the main power supply;
the second one directional device is connected between the power supply line and the auxiliary power source.

14. The system of claim 8, further comprising:
a first detector configured to detect a sudden power off of the main power supply;
a second detector configured to detect a power level of the auxiliary power source;
a controller configured to perform at least one memory protection operation using power from the auxiliary power source if the first detector detects the sudden power off, and configured to perform the memory protection operation until the second detector indicates the power level of the auxiliary power source drops below a threshold.

15. The system of claim 8, further comprising:
a sensor configured to sense a power level of the auxiliary power source; and
a controller configured to perform a memory protection operation based on power from the auxiliary power source during a sudden power off of the main power supply, and configured to indicate a power level of the auxiliary power source based on output from the sensor.

16. The system of claim 8, further comprising:
a regulator configured to regulate output from the auxiliary power source.

17. The system of claim 8, further comprising:
a first detector configured to detect a sudden power off of the main power supply;
a second detector configured to detect a power level of the auxiliary power source;
a controller configured to perform at least one memory protection operation using power from the auxiliary power source if the first detector detects the sudden power off, configured to perform the memory protection operation until the second detector indicates the power level of the auxiliary power source drops below a threshold, and configured to indicate a power level of the auxiliary power source during the sudden power off; and
a regulator configured to regulate output from the auxiliary power source.

18. The system of claim 8, further comprising:

a first detector configured to detect a sudden power off of the main power supply;

a second detector configured to detect a power level of the auxiliary power source;

a sensor configured to sense a power level of the auxiliary power source; and a controller configured to perform at least one memory protection operation using power from the auxiliary power source if the first detector detects the sudden power off, configured to perform the memory protection operation until the second detector indicates the power level of the auxiliary power source drops below a threshold, and configured to indicate a power level of the auxiliary power source during the sudden power off based on output of the sensor; and a regulator configured to regulate output from the auxiliary power source.

19. A solid state drive, comprising:

at least one memory;

a controller configured to control the at least one memory; and an auxiliary power system configured to charge an auxiliary power through a first power line and a second power line, and provide the auxiliary power to the at least one memory through the second power line, the auxiliary power system including, a first one directional device configured to electrically disconnect the first power line with the second power line according to a level of the first power line, the first power line and the second power line forming part of a sole power path from a main power supply to the controller; and a second one directional device configured to provide the auxiliary power to the second power line according to a level of the second power line.

\* \* \* \* \*